United States Patent
Foxworthy et al.

(10) Patent No.: US 10,218,432 B2
(45) Date of Patent: Feb. 26, 2019

(54) LAYER-2 CONNECTIVITY FROM SWITCH TO ACCESS NODE/GATEWAY

(71) Applicant: ViaSat, Inc., Carlsbad, CA (US)

(72) Inventors: Michael Foxworthy, Carlsbad, CA (US); Girish Chandran, Carlsbad, CA (US); Jason Lau, Lafayette, LA (US)

(73) Assignee: Viasat, Inc., Carlsbad, CA (US)

( * ) Notice: Subject to any disclaimer, the term of this patent is extended or adjusted under 35 U.S.C. 154(b) by 0 days.

(21) Appl. No.: 15/715,004

(22) Filed: Sep. 25, 2017

(65) Prior Publication Data

US 2018/0138969 A1 May 17, 2018

Related U.S. Application Data

(63) Continuation of application No. 14/990,702, filed on Jan. 7, 2016, now Pat. No. 9,774,385, which is a
(Continued)

(51) Int. Cl.
*H04B 7/185* (2006.01)
*H04L 12/46* (2006.01)
(Continued)

(52) U.S. Cl.
CPC ..... *H04B 7/18571* (2013.01); *H04B 7/18513* (2013.01); *H04B 7/18582* (2013.01);
(Continued)

(58) Field of Classification Search
CPC ............ H04B 7/18584; H04B 7/18513; H04B 7/18591; H04B 7/18541; H04B 7/18595;
(Continued)

(56) References Cited

U.S. PATENT DOCUMENTS

| | | |
|---|---|---|
| 5,717,686 A | 2/1998 | Schiavoni |
| 5,875,461 A | 2/1999 | Lindholm |
| 5,899,980 A | 5/1999 | Wilf et al. |
| 5,940,394 A | 8/1999 | Killian |
| 6,018,659 A | 1/2000 | Ayyagari et al. |
| 6,038,594 A | 3/2000 | Puente et al. |

(Continued)

FOREIGN PATENT DOCUMENTS

| | | |
|---|---|---|
| GB | 2374494 A | 10/2002 |
| WO | WO-2003/021866 A | 3/2003 |

(Continued)

OTHER PUBLICATIONS

PCT International Search Report and Written Opinion dated Jul. 23, 2010, Int'l App. No. PCT/US2010/031509, 10 pgs.
(Continued)

*Primary Examiner* — Mohamed A Kamara
(74) *Attorney, Agent, or Firm* — Holland & Hart LLP

(57) ABSTRACT

Methods, systems, and apparatuses for providing layer-2 connectivity through a non-routed ground segment network, are described. A system includes a non-autonomous gateway in communication with a satellite configured to relay data packets. The non-autonomous gateway is configured to receive the data packets from the satellite at layer-1 (L1) of the OSI-model, generate a plurality of virtual tagging tuples within the layer-2 packet headers of the plurality of data packets. The non-autonomous gateway is further configured to transmit, at layer-2 (L2) of the OSI-model, the virtually tagged data packets. Each of the packets may include a virtual tagging tuple and an entity destination. The system further includes a L2 switch in communication with the non-autonomous gateway. The L2 switch may be configured to receive the data packets and transmit the data packets to the entity based on the virtual tuples associated with each of the data packets.

18 Claims, 30 Drawing Sheets

Related U.S. Application Data continuation of application No. 13/739,173, filed on Jan. 11, 2013, now Pat. No. 9,276,663, and a continuation-in-part of application No. 12/761,882, filed on Apr. 16, 2010, now Pat. No. 8,804,730, and a continuation-in-part of application No. 12/761,904, filed on Apr. 16, 2010, now Pat. No. 8,457,035, and a continuation-in-part of application No. 12/761,941, filed on Apr. 16, 2010, now Pat. No. 8,427,999, which is a continuation-in-part of application No. 12/761,834, filed on Apr. 16, 2010, now Pat. No. 8,379,613.

(60) Provisional application No. 61/170,359, filed on Apr. 17, 2009, provisional application No. 61/254,551, filed on Oct. 23, 2009, provisional application No. 61/254,554, filed on Oct. 23, 2009, provisional application No. 61/316,776, filed on Mar. 23, 2010, provisional application No. 61/316,782, filed on Mar. 23, 2010.

(51) Int. Cl.
*H04L 29/12* (2006.01)
*H04L 29/08* (2006.01)

(52) U.S. Cl.
CPC ...... *H04L 12/4645* (2013.01); *H04L 61/2007* (2013.01); *H04L 67/12* (2013.01)

(58) Field of Classification Search
CPC .... H04B 7/18571; H04L 67/12; H04W 36/14; H04W 36/0016; H04W 84/06; H04W 88/16
See application file for complete search history.

(56) References Cited

U.S. PATENT DOCUMENTS

| | | | |
|---|---|---|---|
| 6,052,560 A * | 4/2000 | Karabinis | H04B 7/18563 455/12.1 |
| 6,061,562 A | 5/2000 | Martin | |
| 6,112,083 A | 8/2000 | Sweet et al. | |
| 6,201,797 B1 | 3/2001 | Leuca et al. | |
| 6,240,072 B1 | 5/2001 | Lo et al. | |
| 6,249,677 B1 | 6/2001 | Noerpel et al. | |
| 6,741,573 B1 * | 5/2004 | Asaeda | H04B 7/18582 370/316 |
| 6,781,968 B1 | 8/2004 | Colella et al. | |
| 6,829,221 B1 | 12/2004 | Winckles et al. | |
| 6,934,262 B1 | 8/2005 | Lau et al. | |
| 6,982,966 B2 | 1/2006 | Eidenschink et al. | |
| 7,017,042 B1 | 3/2006 | Ziai et al. | |
| 7,032,242 B1 | 4/2006 | Grabelsky et al. | |
| 7,054,322 B2 | 5/2006 | D-Annunzio et al. | |
| 7,174,373 B1 | 2/2007 | Lausier | |
| 7,237,017 B1 | 6/2007 | Pecus et al. | |
| 7,289,440 B1 | 10/2007 | Beshal et al. | |
| 7,386,723 B2 | 6/2008 | Seada et al. | |
| 7,394,779 B2 * | 7/2008 | Seo | H04B 7/18584 370/316 |
| RE40,476 E | 9/2008 | Leuca et al. | |
| 7,477,597 B2 | 1/2009 | Segel | |
| 7,535,863 B2 | 5/2009 | Gin et al. | |
| 7,616,645 B2 | 11/2009 | Ota et al. | |
| 7,636,360 B2 | 12/2009 | Nagai et al. | |
| 7,636,369 B2 | 12/2009 | Wong | |
| 7,643,409 B2 | 1/2010 | Voit et al. | |
| 7,821,981 B2 | 10/2010 | Smith et al. | |
| 7,889,728 B2 | 2/2011 | Arad et al. | |
| 7,924,882 B2 | 4/2011 | Nagai et al. | |
| 7,983,255 B2 | 7/2011 | Kue | |
| 7,992,174 B2 | 8/2011 | Gin et al. | |
| 8,019,841 B2 | 9/2011 | Ellis et al. | |
| 8,068,827 B2 | 11/2011 | Miller et al. | |
| 8,081,633 B2 | 12/2011 | Veits | |
| 8,195,090 B2 | 6/2012 | Treesh et al. | |
| 8,208,421 B2 | 6/2012 | Dankberg et al. | |
| 8,274,981 B2 | 9/2012 | Foxworthy et al. | |
| 8,279,748 B2 | 10/2012 | Foxworthy et al. | |
| 8,345,650 B2 | 1/2013 | Foxworthy et al. | |
| 8,379,613 B2 | 2/2013 | Foxworthy et al. | |
| 8,427,999 B2 | 4/2013 | Foxworthy et al. | |
| 8,456,986 B2 | 6/2013 | Kimmich et al. | |
| 8,457,035 B2 | 6/2013 | Foxworthy et al. | |
| 8,675,486 B2 | 3/2014 | Friedman et al. | |
| 8,804,730 B2 | 8/2014 | Foxworthy et al. | |
| 9,264,127 B2 | 2/2016 | Foxworthy et al. | |
| 9,276,663 B2 | 3/2016 | Foxworthy et al. | |
| 9,419,702 B2 | 8/2016 | Foxworthy et al. | |
| 9,432,896 B2 | 8/2016 | Foxworthy et al. | |
| 2001/0026537 A1 | 10/2001 | Massey | |
| 2001/0033580 A1 | 10/2001 | Dorsey et al. | |
| 2001/0036161 A1 | 11/2001 | Eidenschink et al. | |
| 2002/0049055 A1 | 4/2002 | Matthews | |
| 2003/0048766 A1 | 3/2003 | D-Annunzio et al. | |
| 2003/0069043 A1 | 4/2003 | Chhaochharia | |
| 2003/0069926 A1 | 4/2003 | Weaver et al. | |
| 2004/0208121 A1 | 10/2004 | Gin et al. | |
| 2004/0253951 A1 | 12/2004 | Chang et al. | |
| 2006/0047851 A1 | 3/2006 | Voit et al. | |
| 2006/0050736 A1 | 3/2006 | Segel | |
| 2006/0171369 A1 | 8/2006 | Ostrup et al. | |
| 2006/0262724 A1 | 11/2006 | Friedman et al. | |
| 2006/0274744 A1 | 12/2006 | Nagai et al. | |
| 2007/0076607 A1 | 4/2007 | Voit et al. | |
| 2007/0096788 A1 | 5/2007 | Thesling | |
| 2007/0104096 A1 | 5/2007 | Ribera | |
| 2007/0110098 A1 | 5/2007 | Hart et al. | |
| 2007/0147279 A1 | 6/2007 | Smith et al. | |
| 2007/0171918 A1 | 7/2007 | Ota et al. | |
| 2007/0213060 A1 | 9/2007 | Shaheen | |
| 2007/0255829 A1 | 11/2007 | Pecus et al. | |
| 2008/0002579 A1 | 1/2008 | Lindholm et al. | |
| 2008/0043663 A1 | 2/2008 | Youssefzadeh et al. | |
| 2008/0212517 A1 | 9/2008 | Thesling | |
| 2009/0067429 A1 | 3/2009 | Nagai et al. | |
| 2009/0092137 A1 | 4/2009 | Haigh et al. | |
| 2009/0093213 A1 | 4/2009 | Miller et al. | |
| 2010/0260043 A1 | 10/2010 | Kimmich et al. | |
| 2010/0265876 A1 | 10/2010 | Foxworthy et al. | |
| 2010/0265877 A1 | 10/2010 | Foxworthy et al. | |
| 2010/0265878 A1 * | 10/2010 | Foxworthy | H04B 7/18541 370/316 |
| 2010/0265879 A1 | 10/2010 | Foxworthy et al. | |
| 2010/0265941 A1 | 10/2010 | Foxworthy et al. | |
| 2010/0265950 A1 | 10/2010 | Foxworthy et al. | |
| 2010/0265957 A1 | 10/2010 | Foxworthy et al. | |
| 2011/0182230 A1 | 7/2011 | Ohm | |
| 2015/0103736 A1 | 4/2015 | Foxworthy et al. | |
| 2015/0288443 A1 | 10/2015 | Foxworthy et al. | |
| 2017/0117953 A1 | 4/2017 | Foxworthy et al. | |

FOREIGN PATENT DOCUMENTS

| | | |
|---|---|---|
| WO | WO-2005/082040 A | 9/2005 |
| WO | WO-2007/103369 A | 9/2007 |
| WO | WO-2007/133786 A | 11/2007 |
| WO | WO-2010/121214 A | 10/2010 |
| WO | WO-2010/121215 A | 10/2010 |
| WO | WO-2010/121216 A | 10/2010 |
| WO | WO-2010/121217 A | 10/2010 |
| WO | WO-2010/121219 A | 10/2010 |
| WO | WO-2010/121220 A | 10/2010 |
| WO | WO-2010/121221 A | 10/2010 |

OTHER PUBLICATIONS

PCT International Preliminary Report on Patentability dated Jul. 1, 2011, Int'l App. No. PCT/US2010/031509, 9 pgs.
PCT International Search Report and Written Opinion dated Jul. 27, 2010, Int'l App. No. PCT/US2010/031514, 9 pgs.

(56) References Cited

OTHER PUBLICATIONS

PCT International Preliminary Report on Patentability dated May 23, 2011, Int'l App. No. PCT/US2010/031514, 9 pgs.
PCT International Search Report and Written Opinion dated Jul. 28, 2010, Int'l App. No. PCT/US2010/031508, 10 pgs.
PCT International Preliminary Report on Patentability dated Jul. 1, 2011, Int'l App. No. PCT/US2010/031508, 11 pgs.
PCT International Search Report and Written Opinion dated Aug. 2, 2010, Int'l App. No. PCT/US2010/031510, 10 pgs.
PCT International Preliminary Report on Patentability dated Jul. 1, 2011, Int'l App. No. PCT/US2010/031510, 12 pgs.
PCT International Search Report and Written Opinion dated Sep. 3, 2010, Int'l App. No. PCT/US2010/031511, 16 pgs.
PCT International Preliminary Report on Patentability dated Aug. 2, 2011, Int'l App. No. PCT/US2010/031511, 12 pgs.
PCT International Search Report and Written Opinion dated Sep. 20, 2010, Int'l App. No. PCT/US2010/031515, 19 pgs.
PCT International Preliminary Report on Patentability dated Aug. 2, 2011, Int'l App. No. PCT/US2010/031515, 12 pgs.
PCT International Search Report and Written Opinion dated Nov. 23, 2010, Int'l App. No. PCT/US2010/031513, 15 pgs.
PCT Revised International Search Report and Written Opinion dated Jul. 1, 2011, Int'l App. No. PCT/US2010/031513, 17 pgs.
PCT International Preliminary Report on Patentability dated Aug. 2, 2011, Int'l App. No. PCT/US2010/031513, 15 pgs.
Akyildiz et al., "A Survey of Mobility Management in Next-Generation All-IP-Based Wireless Systems," IEEE Wireless Communications, IEEE Service Center, Piscataway, NJ, US vol. 11, No. 4, Aug. 1, 2004, 14 pgs.
Akyildiz et al., "Mobility Management in Current and Future Communications Network," IEEE Network, IEEE Service Center, New York, NY USA, vol. 12, No. 4, Jul. 1, 1998, 12 pgs.
Akyildiz et al., "Mobility Management in Next-Generation Wireless Systems," Proceedings of the IEEE, New York, US, vol. 87, No. 8, Aug. 1, 1999, 38 pgs.

Feltrin et al., "Design, Implementation and Performances of an On-board Processor-based Satellite Network," Communications, 2004 IEEE International Conference on, vol. 6, No., pp. 3321-3325, Jun. 20-24, 2004.
Held, "Virtual Private Networking, Introduction to Virtual Private Networking," Dec. 31, 2004, Virtual private Networking: a Construction Operation and Utilization Guide, Joh Wiley & Sons, GB, 22 pgs.
Industrial Consortium for S-UMTS, "Final Report S-UMTS: Preparation of Next Generation Universal Mobile Satellite Telecommunications Systems," Nov. 29, 2000, 35 pgs.
Kota, et al., "Integrated SATCOM/Terrestrial Networking: Protocols and DISN/Teleport Interface," Proceedings of the Military Communications Conference (MILCOM), San Diego, Nov. 6-8, 1995, New York, IEEE, US, vol. 1, Nov. 6, 1995, pp. 453-459, XP-000580864.
LAN/MAN Standards Committee of the IEEE Computer Society, IEEE Standard for Local and Metropolitan Area Networks—Virtual Bridged Local Area Networks, IEEE Std 802.1QTM-2005, May 19, 2006, The Institute of Electrical and Electronics Engineers, Inc., USA, 303 pgs.
Mancuso et al., "Switched Ethernet networking Over LEO Satellite," Wireless Communication Systems, 2005, 2nd International Symposium on Siena, Italy, Sep. 5-9, 2005, Piscataway, NJ, US, IEEE, pp. 883-886, Sections I.-IV., 5 pgs.
Shen, "Handover in Packet-Domain UMTS," EE Times Design, Aug. 2, 2002, retrieved from the internet on Aug. 2, 2010 at: http://www.eetimes.com/design/communications-design/4018087/Handover-in-packet-Domain-UMTS, 6 pgs.
Shneyderman, "Mobile VPNs for Next Generation GPRS and UMTS Networks," White Paper Lucent Technologies, Dec. 31, 2000, retrieved online at: www.esoumoy.free.fr/telecom/tutorial/3G-VPN.pdf, 16 pgs.
Senevirathne et al., "Ethernet Over IP—a Layer 2 VPN Solution Using Generic Routing Encapsulation (GRE)," working document of the Internet Engineering Task Force (IETF), http://tools.ietf.org/html/draft-tsenevir-l2vpn-gre-00#section-2, 6 pgs.

* cited by examiner

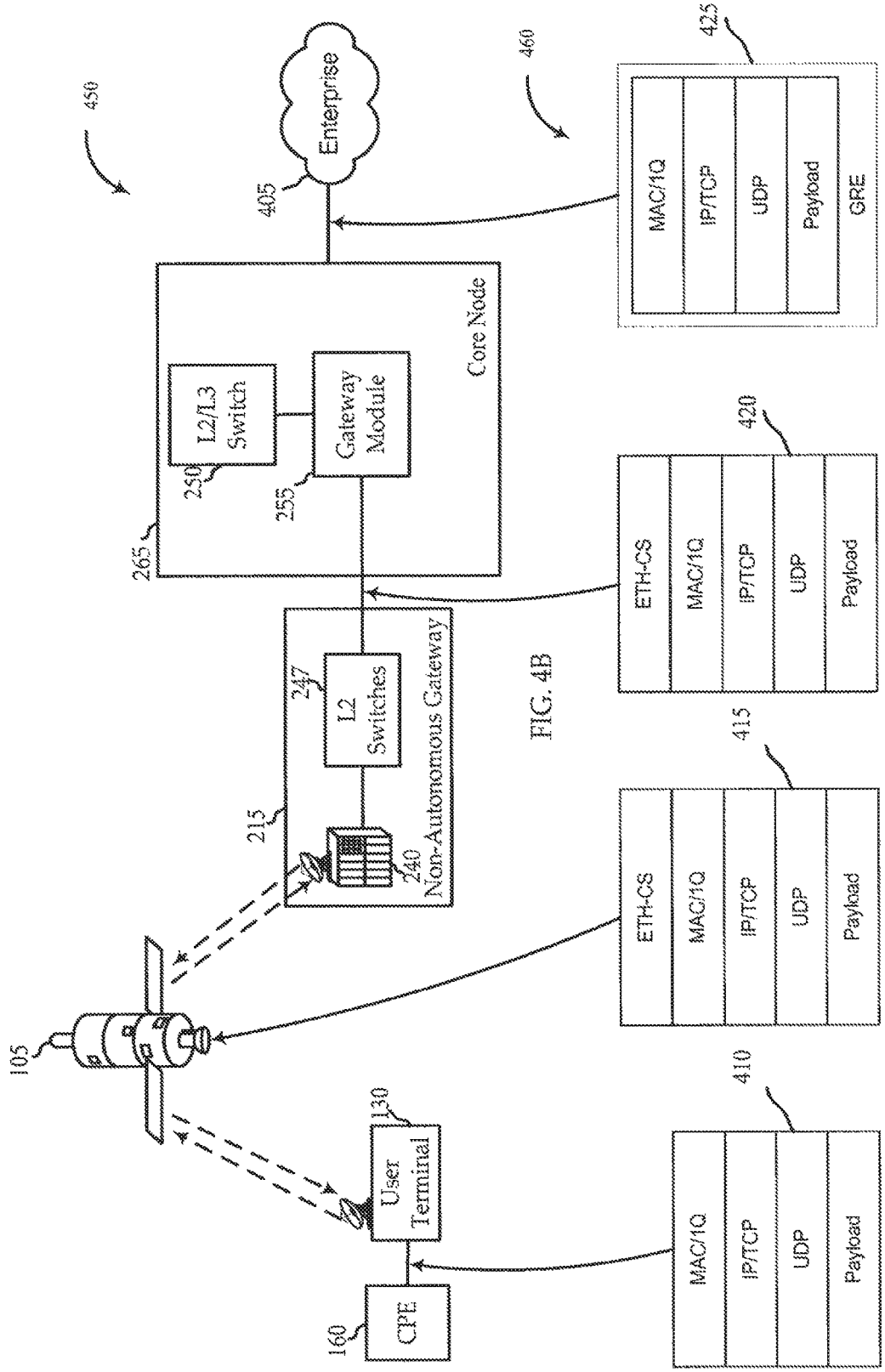

LAYER-2 CONNECTIVITY FROM SWITCH TO ACCESS NODE/GATEWAY

CROSS REFERENCES

This Application is a continuation of U.S. patent application Ser. No. 14/990,702 entitled, "Layer-2 Connectivity From Switch To Access Node/Gateway", filed Jan. 7, 2016, which is a continuation of U.S. patent application Ser. No. 13/739,173, entitled, "Layer-2 Connectivity From Switch To Access Node/Gateway," filed Jan. 11, 2013, which is a continuation-in-part of U.S. patent application Ser. No. 12/761,834, entitled "Layer-2 Connectivity from Switch to Access Node/Gateway," filed Apr. 16, 2010, which claims priority to U.S. Provisional Application No. 61/170,359, entitled "Distributed Base Station Satellite Topology," filed on Apr. 17, 2009, and also claims priority to U.S. Provisional Application No. 61/254,551, entitled "Layer-2 Connectivity from Switch to Access Node/Gateway," filed on Oct. 23, 2009. U.S. patent application Ser. No. 13/739,173 is also a continuation-in-part of U.S. patent application Ser. No. 12/761,882, entitled "Layer-2 Extension Services," filed on Apr. 16, 2010, which claims priority to U.S. Provisional Application No. 61/170,359, entitled "Distributed Base Station Satellite Topology," filed on Apr. 17, 2009, and also claims priority to U.S. Provisional Application No. 61/254,554, entitled "Layer-2 Extension Services," filed on Oct. 23, 2009. U.S. patent application Ser. No. 13/739,173 is also a continuation-in-part of U.S. patent application Ser. No. 12/761,904, entitled "Mobility Across Satellite Beams Using L2 Connectivity," filed on Apr. 16, 2010, which claims priority to U.S. Provisional Application No. 61/170,359, entitled "Distributed Base Station Satellite Topology," filed on Apr. 17, 2009, and also claims priority to U.S. Provisional Application No. 61/316,776, entitled "Mobility Across Satellite Beams Using L2 Connectivity," filed on Mar. 23, 2010. U.S. patent application Ser. No. 13/739,173 is also a continuation-in-part of U.S. patent application Ser. No. 12/761,941, entitled "Multi-Satellite Architecture," filed on Apr. 16, 2010, which claims priority to U.S. Provisional Application No. 61/170,359, entitled "Distributed Base Station Satellite Topology," filed on Apr. 17, 2009, and also claims priority to U.S. Provisional Application No. 61/316,782, entitled "Multi-Satellite Architecture," filed on Mar. 23, 2010. The entirety of each of the above-identified Applications are expressly incorporated by reference herein for any and all purposes.

BACKGROUND

Satellite communications systems are becoming ubiquitous for communicating large amounts of data over large geographic regions. In typical satellite communications systems, end consumers interface with the systems through user terminals. The user terminals communicate, via one or more satellites, with one or more gateways. The gateways may then process and route the data to and from one or more networks according to various network protocols and tags processed at the network layer and above (e.g., layers 3 and above of the Open System Interconnection Reference Model (OSI) stack). While utilizing higher layers to route communications may provide certain features, such as enhanced interoperability, it may also limit certain capabilities of the network. For example, routing limits the types of tags that can persist across multiple sub-networks.

Presently, gateways in satellite networks are configured to support a number of services and perform a variety of network functions. For example, gateways perform IP Routing protocols, Layer-3 redundancy schemes, acceleration, AAA/Radius services (i.e., terminal registration on the network), DHCP/DNS, trivial file transfer protocol (TFTP), network time protocol (NTP), public key encryption (PKI), and the like. Such gateways are expensive to build and maintain. Furthermore, the services and functionality offered by these gateways are isolated to the customers for which the gateway specifically service. Many gateways providing the same or similar services and must be maintained in parallel in order to provide service to an entire customer base over a large geographical area.

Further, current implementations of satellite networks fail to provide the services and functionality at layer-2 (i.e., layer-2 of the OSI-model stack) communicating from one point on the network to another. Additionally, current implementations of satellite networks only provide redundancy within the gateway. For example, current satellite network implementations may provide redundant access to a points on the network (i.e., multiple fiber lines to a gateway such that if one line is compromised, service still continues over the second line); however, if, for example, the gateway itself is down (or a service of the gateway), there is currently no way for another gateway to continue to provide the service (or services) of a failed gateway.

Current gateway implementations typically communicate over layer-3 or "layer-2.5" (i.e., multi-protocol label switching (MPLS)). As such, networks using only layer-3 or layer-2.5 are limited in the services and network configurations that can be offered. For example, an MPLS network may be deployed using RFC-2547 which is MPLS that redistributes routes using border gateway protocol (BGP). Accordingly, such a deployment includes a layer-3 network over an MPLS underlying network, so each core node or gateway is routed (i.e., the MAC header of packets transmitted are altered), thus limiting the capabilities of the network.

Additionally, in current mobile IP implementations each mobile device is identified by its home address (i.e., at the mobile device's home agent) regardless of the mobile's device's current location. While the mobile device is away from its home network, the mobile device is assigned a care-of address. The care-of address identifies the mobile device's current location. The care-of address acts as a local endpoint of a tunnel back to the mobile device's home agent, and the home address. As such, mobile IP specifies how the mobile device registers with its home agent and how the home agent routes data to the mobile device through the tunnel (between the home argent and the care-of address).

Mobile IP has significant drawbacks. One drawback is that the when the mobile device moves out of its home location, the mobile device's care-of address is a virtual address. Hence, moving out of the home location requires a hand off, which changes the mobile device's IP address by adding a care-of-address. This is particularly problematic in IPv4 networks (e.g., connectivity is temporarily lost, browser session is lost, VPN session is lost, etc.). In many applications (e.g., VPN, VoIP), sudden changes in network connectivity and IP address causes significant problems. For example, an SSL tunnel for on-line banking will terminate. Furthermore, the tunnel between the home address and the care-of address is a layer-3 protocol, and as such, the as the mobile device moves out of its home location the mobile device is no longer connected to the same network (i.e., LAN, subnet, etc.). Additionally, traffic must be routed through the home agent location. For example, if the mobile device and the data the mobile device is accessing are at the same remote location, the data must travel all the way to the home agent location and then circle back to the remote location, thus greatly increasing latency. Accordingly, current mobile IP implementations fail to provide a persistent IP address and persistent connectivity and efficient data transfer over a large geographical area. For these and/or other reasons, it may be desirable to provide ground-segment networking with enhanced functionality.

SUMMARY

In one embodiment, a system for providing layer-2 connectivity through a non-routed ground segment network, is described. A system includes a satellite configured to transmit data packets. The system further includes a non-autonomous gateway in communication with the satellite. The non-autonomous gateway is configured to receive the data packets from the satellite at layer-1 (L1) of the OSI-model, generate a plurality of virtual tagging tuples within the layer-2 packet headers of the plurality of data packets. The non-autonomous gateway is further configured to transmit, at layer-2 (L2) of the OSI-model, the virtually tagged data packets. Each of the packets including a virtual tagging tuple and an entity destination. The system further includes a L2 switch in communication with the non-autonomous gateway. The L2 switch is configured to receive the data packets and transmit the data packets to the entity based on the virtual tuples associated with each of the data packets. Further, the system may include a second non-autonomous gateway in communication with the L2 switch. The second non-autonomous gateway may be configured to receive the virtually tagged data packets and transmit the virtually tagged data packets to an entity based on the virtual tagging tuple associated with each of the virtually tagged packets.

In a further embodiment, a method for providing layer-2 connectivity through a non-routed ground segment network, is described. The method includes transmitting, by one or more satellites, data packets, receiving, at a non-autonomous gateway, the data packets from the one or more satellites at layer-1 of the OSI-model (L1), and generating, by the non-autonomous gateway, a plurality of virtual tagging tuples within layer-2 of the OSI-model (L2) packet headers of the plurality of data packets. Furthermore, the method includes transmitting, by the non-autonomous gateway at L2, the virtually tagged data packets, wherein each includes a virtual tagging tuple and an entity destination, receiving, at an L2 switch, the data packets, and transmitting, by the L2 switch, the data packets to the entity based on each of the virtual tuples associated with each of the data packets.

In yet a further embodiment, a computer-readable medium for providing layer-2 connectivity through a non-routed ground segment network, is described. The machine-readable medium includes instructions for transmitting data packets, receiving the data packets from the one or more satellites at layer-1 of the OSI-model (L1), and generating a plurality of virtual tagging tuples within layer-2 of the OSI-model (L2) packet headers of the plurality of data packets. The machine-readable medium further includes instructions for transmitting, at L2, the virtually tagged data packets, wherein each includes a virtual tagging tuple and an entity destination, receiving, at an L2 switch, the data packets, and transmitting, by the L2 switch, the data packets to the entity based on each of the virtual tuples associated with each of the data packets.

In another embodiment, a method of providing end-to-end layer-2 connectivity throughout a non-routed ground segment network connected to one or more satellites, is described. The method includes transmitting, by the one or more satellites, data packets, receiving, at a first non-autonomous gateway in communication with the one or more satellites. The data packets from the one or more satellites at layer-I (LI) of the OSI-model. The method further includes generating, by the first non-autonomous gateway, a plurality of virtual tagging tuples within the layer-2 (L2) packet headers of the data packets. The plurality of data packets each include a virtual tagging tuple. The method further includes receiving, at a L2 switch in communication with the first non-autonomous gateway, the plurality of virtually tagged data packets, transmitting, by the L2 switch, the plurality of virtually tagged data packets, and receiving, by a second non-autonomous gateway in communication with the L2 switch, the plurality of virtually tagged data packets. Further, the method includes transmitting, by the second non-autonomous gateway, the plurality of virtually tagged data packets to an entity based on the virtual tagging tuple associated with each of the plurality of virtually tagged packets.

In yet another embodiment, a machine-readable medium for providing end-to-end layer-2 connectivity throughout a non-routed ground segment network connected to one or more satellites, is described. The machine-readable medium includes instructions for transmitting, by the one or more satellites, data packets, receiving, at a first non-autonomous gateway in communication with the one or more satellites. The data packets from the one or more satellites at layer-I (LI) of the OSI-model. The machine-readable medium further includes instructions for generating, by the first non-autonomous gateway, a plurality of virtual tagging tuples within the layer-2 (L2) packet headers of the data packets. The plurality of data packets each include a virtual tagging tuple. The machine-readable medium further includes instructions for receiving, at a L2 switch in communication with the first non-autonomous gateway, the plurality of virtually tagged data packets, transmitting, by the L2 switch, the plurality of virtually tagged data packets, and receiving, by a second non-autonomous gateway in communication with the L2 switch, the plurality of virtually tagged data packets. Further, the machine-readable medium includes instructions for transmitting, by the second non-autonomous gateway, the plurality of virtually tagged data packets to an entity based on the virtual tagging tuple associated with each of the plurality of virtually tagged packets.

In one embodiment, a method of providing layer-2 extension services through a non-routed ground segment network is described. The method includes providing a Layer-2 (L2) interface between a node of the non-routed ground segment network and a service provider, assigning a virtual tagging tuple to the service provider and receiving service provider traffic at a node of the non-routed ground segment network. The method further includes tagging the service provider traffic with the virtual tagging tuple, and switching the tagged service provider traffic through the non-routed ground segment network according to the virtual tagging tuple.

In one embodiment, a system for providing layer-2 extension services through a non-routed ground segment network is described. The system includes a plurality of nodes of the non-routed ground segment network. The nodes are in communication with each other over a substantially persistent layer-2 connection. The system further includes a first node is locally coupled with a layer-2 network associated with a service provider. The service provider being associated with a virtual tagging tuple. The system also includes a second node is in operative communication with a plurality of customers. The second node being geographically remote from the first node. At least a portion of traffic communicated with the plurality of customers and associated with the service provider is tagged with the virtual tagging tuple, and each of the plurality of nodes is configured to switch the portion of the traffic at L2 according to the virtual tagging tuple.

In one embodiment, a machine-readable medium for providing layer-2 extension services through a non-routed ground segment network is described. The machine-readable medium includes instructions for providing a Layer-2 (L2) interface between a node of the non-routed ground segment network and a service provider, assigning a virtual tagging tuple to the service provider and receiving service provider traffic at a node of the non-routed ground segment network. The machine-readable medium further includes instructions for tagging the service provider traffic with the virtual tagging tuple, and switching the tagged service provider traffic through the non-routed ground segment network according to the virtual tagging tuple.

In one embodiment, a system for providing mobility across satellite beams is described. The system includes a first core node, a second core node in communication with the first core node at layer-2 of the OSI model (L2), and a first gateway in communication, at L2, with the first core, the first gateway configured to provide access to a first spot beam at a first location. The system further includes a second gateway in communication, at L2, with the second core node, the second gateway configure to provide access to a second spot beam at a second location, and a mobile device, at the first location, in communication with the first gateway via the first spot beam, wherein the mobile device is assigned an IP address by the first core node. The mobile device moves from the first location to the second location. Further, the first gateway, in response to the mobile device moving from the first location to the second location, notifies the second gateway, through the first core node and the second core node, that the mobile device is moving to the second location, and transmits the session information to the second gateway, and the second gateway, in response to the notification, maintains connectivity with the mobile device using the IP address.

In one embodiment, a method of providing mobility across satellite beams is described. The method includes providing access to a first spot beam at a first location serviced by a first gateway, providing access to a second spot beam at a second location serviced by a second gateway, and assigning a mobile device, at the first location, an IP address by the first gateway. The mobile device moves from the first location to the second location. The method further includes in response to the mobile device moving from the first location to the second location, notifying the second gateway, through a first core node and a second core node, that the mobile device is moving to the second location, transmitting the session information to the second gateway and in response to the notification, maintaining connectivity with the mobile device using the IP address.

In one embodiment, a computer-readable medium for providing mobility across satellite beams is described. The computer-readable medium includes instructions for providing access to a first spot beam at a first location serviced by a first gateway, providing access to a second spot beam at a second location serviced by a second gateway, and assigning a mobile device, at the first location, an IP address by the first gateway. The mobile device moves from the first location to the second location. The computer-readable medium further includes instructions for in response to the mobile device moving from the first location to the second location, notifying the second gateway, through a first core node and a second core node, that the mobile device is moving to the second location, transmitting the session information to the second gateway and in response to the notification, maintaining connectivity with the mobile device using the IP address.

In one embodiment, a satellite networking system is described. The system includes a first satellite, a second satellite, and a core network. The core node is configured to provide a plurality of services. The system further includes a first gateway in communication with the first satellite and the core network, and a second gateway in communication with the second satellite and the core network. The first satellite is configured to share the plurality of services with the second satellite through the first and second gateways.

In one embodiment, a satellite networking system is described. The system includes a first satellite which is of a first satellite type. The system further includes a second satellite which is of a second satellite type. The system includes a gateway in communication with the first and second satellite. The first satellite is configured to share a plurality of services with the second satellite through the gateway.

In one embodiment, another satellite networking system is described. The system includes a first satellite, a second satellite, a first gateway in communication with the first satellite, and a second gateway in communication with the second satellite. The system further includes a first core in communication with the first gateway, and a second core in communication with the first core and the second gateway. The first and second cores are in communication over a virtual private network (VPN). The first satellite is configured to share a plurality of services with the second satellite through the first and second gateways and the first and second cores.

In one embodiment, a method of implementing a multi-satellite network is described. The method includes providing a first satellite, providing a second satellite, and providing a core network configured to provide a plurality of services. The method further includes providing a first gateway in communication with the first satellite and the core network, and providing a second gateway in communication with the second satellite and the core network. The first satellite is configured to share the plurality of services with the second satellite through the first and second gateways.

In one embodiment, a system for implementing a satellite network is described. The system includes satellite gateways in communication with subscribers over a satellite communication network. The satellite gateways send network communications to the subscribers and receive network communications from the subscribers. The system further includes a first core node in communication with at least one of the satellite gateways. The first core node provides networking services, at L2, to a first subset of subscribers. The system further includes a second core node in communication, at L2, with one of the satellite gateways and the first core node. The second core node provides the networking services, at layer-2 of the OSI model, to a second subset of the subscribers. In response to failure of at least one of the networking services in the first core node, the second core node providing the at least one of the services to the first subset of the subscribers.

In one embodiment, a satellite networking system is described. The system includes a first core node in communication, at layer-2 of the OSI model (L2), with a first satellite gateway. The system further includes a second core node in communication, at L2, with a second satellite gateway and the first core node. Further, the system includes a peering node in communication, at L2, with the first satellite gateway. The peering node is configured to provide content or services at the first satellite gateway. Further, the peering node is configured to provide content or services at anyone of the first code node, the second core node, and the second satellite gateway.

In one embodiment, a method of implementing a redundant core node architecture in a satellite communication network is described. The method includes providing, at a first core node, a plurality of services, at layer-2 of the OSI model (L2), to a first plurality of subscribers through a first satellite gateway. The method further includes providing, at a second core node, the services, at L2, to a second plurality of subscribers through a second satellite gateway and the first core node. receiving, at the second core node, a failure notification of at least one of the plurality of services provided by the first core node, and in response to the failure notification, providing, by the second core node, the at least one of the plurality of services to the first plurality of subscribers.

In one embodiment, a computer-readable medium for implementing a redundant core node architecture in a satellite communication network is described. The computer-readable medium includes instructions for providing, at a first core node, a plurality of services, at layer-2 of the OSI model (L2), to a first plurality of subscribers through a first satellite gateway. The computer-readable medium further includes instructions for providing, at a second core node, the services, at L2, to a second plurality of subscribers through a second satellite gateway and the first core node, receiving, at the second core node, a failure notification of at least one of the plurality of services provided by the first core node, and in response to the failure notification, providing, by the second core node, the at least one of the plurality of services to the first plurality of subscribers.

In one embodiment, a method of implementing acceleration through a packet encapsulation protocol tunnel is described. The method includes establishing a packet encapsulation protocol tunnel between a first network endpoint and a second network endpoint, sending packets with a packet encapsulation protocol tunnel header from the first network endpoint to the second network endpoint, and removing the packet encapsulation protocol tunnel headers from the packets. The method further includes storing the packet encapsulation protocol tunnel headers in a storage memory, performing acceleration on the packets, and retrieving the packet encapsulation protocol tunnel headers from the storage memory. Further, the method includes replacing the packet encapsulation protocol tunnel headers on the packets, and sending the packets with the packet encapsulation protocol tunnel headers through the packet encapsulation protocol tunnel to the second endpoint.

In one embodiment, a system for implementing acceleration through a packet encapsulation protocol tunnel is described. The system includes a customer premises device (CPE) configured to transmit a packet with a network request. The packet includes a header and a destination. The system further includes a user terminal (UT) in communication with the CPE configured to receive the packet. Further, the system includes a satellite in communication with the UT configured to transmit the packet. The system also includes a satellite modem termination system (SMTS) in communication with the satellite. The SMTS is configured to receive the packet, establish a packet encapsulation protocol tunnel between the SMTS and a gateway module, and place a packet encapsulation protocol tunnel header within the packet header. Then, a core node is in communication with the SMTS, and includes acceleration modules, the gateway module, and a storage memory. The acceleration module is configured to receive the packets, remove the packet encapsulation protocol tunnel header, store the packet encapsulation protocol tunnel header in the storage memory, and perform acceleration on the packet. The gateway module is further configured to receive the packet after acceleration, retrieve the packet encapsulation protocol tunnel header from the storage memory, replace the packet encapsulation protocol tunnel header on header of the packet, and transmit the packet to the destination.

In one embodiment, a computer-readable medium for implementing acceleration through a packet encapsulation protocol tunnel is described. The computer-readable medium includes instructions for establishing a packet encapsulation protocol tunnel between a first network endpoint and a second network endpoint, sending packets with a packet encapsulation protocol tunnel header from the first network endpoint to the second network endpoint, and removing the packet encapsulation protocol tunnel headers from the packets. The computer-readable medium further includes instructions for storing the packet encapsulation protocol tunnel headers in a storage memory, performing acceleration on the packets, and retrieving the packet encapsulation protocol tunnel headers from the storage memory. Further, the computer-readable medium includes instructions for replacing the packet encapsulation protocol tunnel headers on the packets, and sending the packets with the packet encapsulation protocol tunnel headers through the packet encapsulation protocol tunnel to the second endpoint.

BRIEF DESCRIPTION OF THE DRAWINGS

A further understanding of the nature and advantages of the present invention may be realized by reference to the following drawings. In the appended figures, similar components or features may have the same reference label. Further, various components of the same type may be distinguished by following the reference label by a dash and a second label that distinguishes among the similar components. If only the first reference label is used in the specification, the description is applicable to any one of the similar components having the same first reference label irrespective of the second reference label.

FIG. 4B shows an illustrative communication link for an enterprise customer in a system in communication with an enterprise network, according to various embodiments.

FIG. 4C shows an illustrative data flow through the link in FIG. 4B, according to various embodiments.

DETAILED DESCRIPTION OF THE INVENTION

The ensuing description provides exemplary embodiment(s) only, and is not intended to limit the scope, applicability or configuration of the disclosure. Rather, the ensuing description of the exemplary embodiment(s) will provide those skilled in the art with an enabling description for implementing an exemplary embodiment, it being understood that various changes may be made in the function and arrangement of elements without departing from the spirit and scope as set forth in the appended claims. Some of the various exemplary embodiments may be summarized as follows.

In many typical satellite communications systems, end consumers interface with the systems through user terminals. The user terminals communicate, via one or more satellites, with one or more gateways. The gateways may then process and route the data to and from one or more networks according to various network protocols and tags processed at the network layer and above (e.g., layers 3 and above of the Open System Interconnection Reference Model (OSI) stack).

Figure 1:
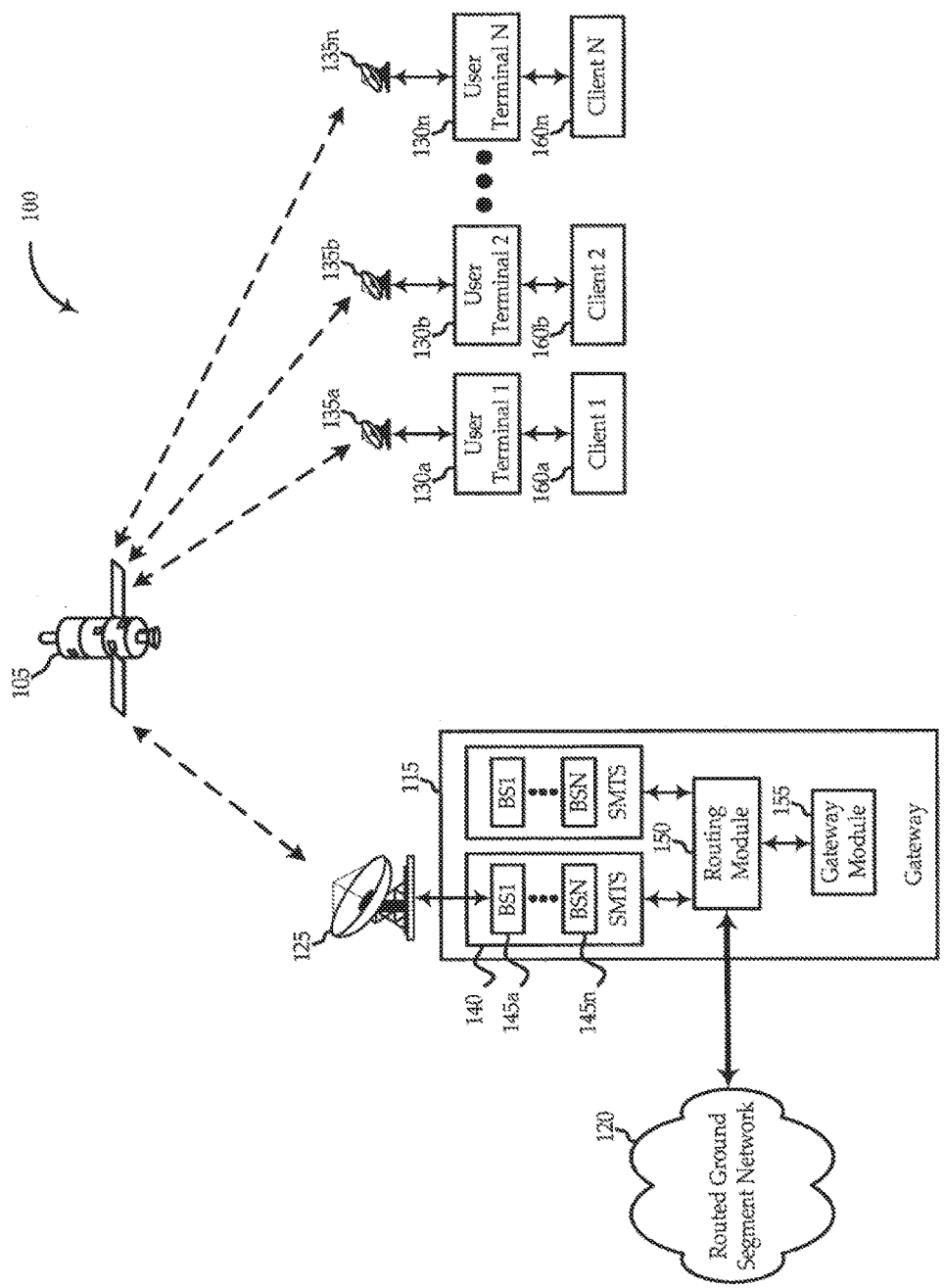
FIG. 1 illustrates a typical satellite communications system in accordance with various embodiments.

For example, FIG. 1 illustrates a typical satellite communications system 100. The satellite communications system 100 includes a number of user terminals 130 in communication with a gateway 115 via a satellite 105. For example, a subscriber of satellite communications services desires to access a web page using a browser. The subscriber's client 160 (e.g., a client application running on customer premises equipment (CPE) controlled by the subscriber) may communicate an HTML request through a respective one of the user terminals 130. A user antenna 135 in communication with the respective user terminal 130 communicates the request to the satellite 105, which, in turn, sends the request to the gateway 115 through a provider antenna 125.

The gateway 115 receives the request at a base station 145 configured to service that user terminal 130 and included within a satellite modem termination system (SMTS) 140. The SMTS 140 sends the request data to a routing module 150, in communication with a gateway module 155. The routing module 150 and gateway module 155 work together to determine and generate routing data for communicating the request data through a routed ground segment network 120. Typically, the gateway module 155 may be a control plane application which sets up connectivity to the router. Even where actual routing is not done by the gateway module 155, components of the gateway 115 may implement routing functions.

As used herein, a "routed network" refers to a network having a number of routers, configured to use protocols at layer-3 and above of the OSI stack (e.g., or substantially equivalent types of protocols) to route data through the network. The "routing module," as used herein, is intended to broadly include any type of network device configured to route at layers 3 and above of the OSI stack (e.g., or provide substantially similar network layer functionality). Particularly, routing is intended to be distinguished from switching (e.g., at layer 2 of the OSI stack (e.g., or substantially similar functionality), as will become more clear from the description below.

While utilizing higher layers to route communications may provide certain features, such as enhanced interoperability, it may also limit certain capabilities of the network. As one exemplary limitation, at each node where a layer-3 routing decision is made, determining the appropriate routing may involve parsing packet headers, evaluating parsed header information against routing tables and port designations, etc. These steps may limit the amount and type of traffic that can be sent over the network, as well as the protocols available for transport on the network.

In another exemplary limitation, at each router, layer-2 headers are typically stripped off and replaced with other tags to identify at least the next routing of the data through the network. As such, it is impossible to maintain a single network between routed terminals. In other words, a packet which is generated at one LAN, passes through one or more routers (i.e., at layer-3 or above) and is received at another LAN, will always be considered to be received from a different network. Accordingly, virtual networking protocols such as, VPN, MPLS, etc. must be used for sending traffic between one gateway 115 and another gateway 115. Furthermore, depending on the type of service, if the service or services fail on one gateway 115, then other gateways 115 may be unable to provide the failed service or services to subscribers connected to the failed gateway 115 (the two gateways are, from a networking prospective, isolated). However, if the traffic between each gateway 115 was switched at layer-2, then other gateways 115 would be able to provide the failed service or services to the subscribers connected to the failed gateway 115. It can be appreciated that some benefits of a single network configuration are unattainable in a layer-3 routed network. For example, tags for supporting proprietary service provider networks, Multiprotocol Label Switching (MPLS), and/or other types of networks are impossible to maintain across large geographic regions (e.g., multiple LANs, WANs, subnets, etc.) of a routed ground segment network 120.

In the illustrative example, internet protocol (IP) and/or other tags are used to route the request data to an appropriate IP address for use in satisfying the subscriber's request. When a response to the request is received by the routed ground segment network 120, layer-3 and/or higher-layer tags are again used to route the response data through the network to the appropriate base station 145 in the appropriate gateway 115. The base station 145 then communicates the response data to the client 160 via the provider antenna 125, the satellite 105, the subscriber antenna 135, and the user terminal 130.

Figure 2:
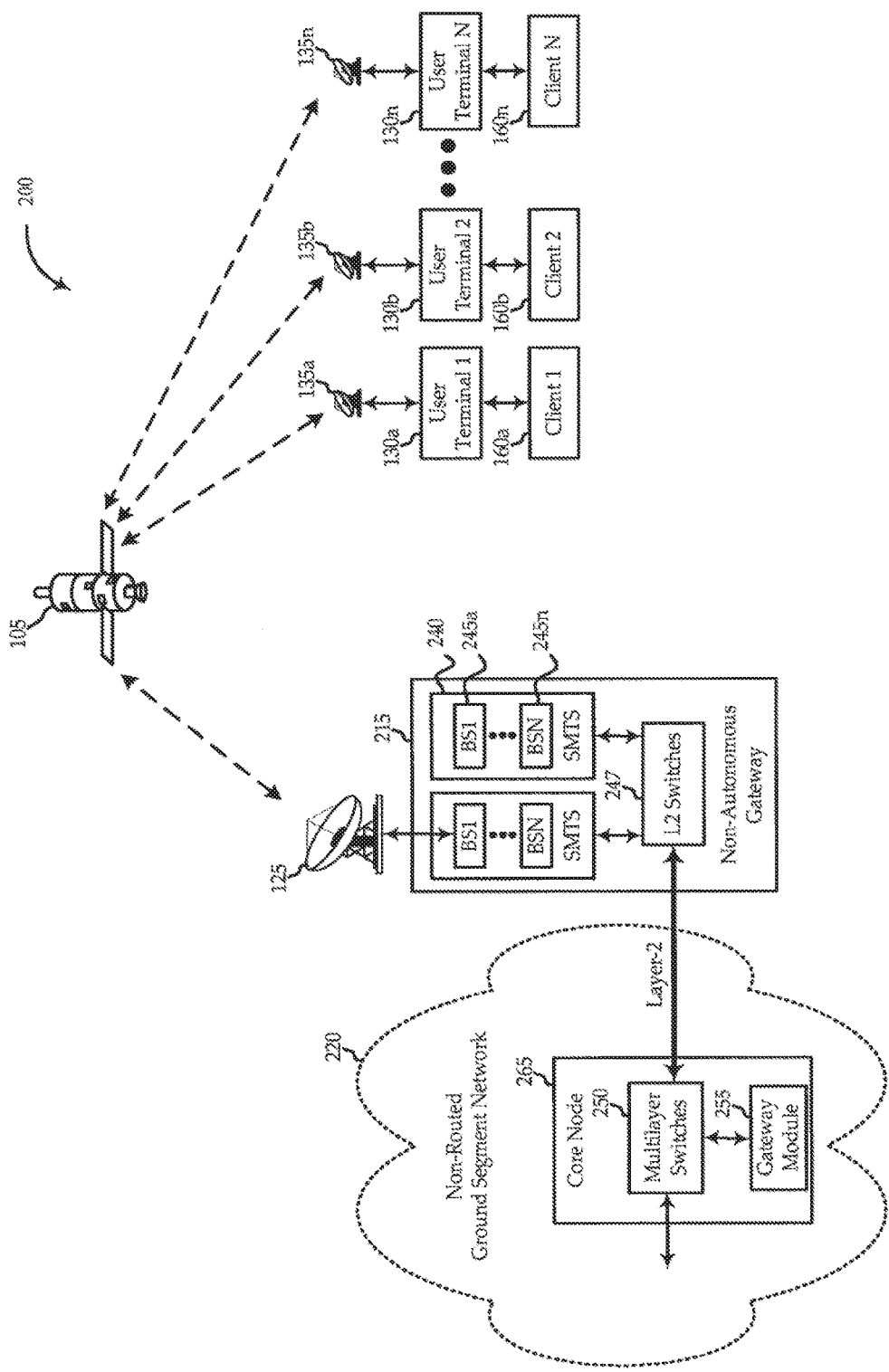
FIG. 2 shows an embodiment of a satellite communications system having a number of user terminals in communication with a non-autonomous gateway via a satellite, according to various embodiments

Embodiments address these limitations of the routed ground segment network 120 in various ways, for example, through the use of core nodes. FIG. 2 shows an embodiment of a satellite communications system 200 having a number of user terminals 130 in communication with a non-autonomous gateway 215 via a satellite 105, according to various embodiments. The non-autonomous gateway 215 is in communication with other nodes of a non-routed ground segment network 220 (e.g., other non-autonomous gateways 215) via one or more core nodes 265. Embodiments of the satellite communications system 200 effectively provide mesh-like layer-2 connectivity between substantially all the nodes of the non-routed ground segment network 220.

In various embodiments, components of the non-routed ground segment network 220 (e.g., components of the gateways 215, core nodes 265, etc.) are implemented, in whole or in part, in hardware. They may include one or more Application Specific Integrated Circuits (ASICs) adapted to perform a subset of the applicable functions in hardware. Alternatively, the functions may be performed by one or more other processing units, on one or more integrated circuits. In other embodiments, other types of integrated circuits may be used (e.g., Structured/Platform ASICs, Field Programmable Gate Arrays and other Semi-Custom ICs), which may be programmed. Each may also be implemented, in whole or in part, with instructions embodied in a computer-readable medium, formatted to be executed by one or more general or application specific controllers.

In various embodiments, the satellite 105 is a geostationary satellite, configured to communicate with the user terminals 130 and gateways 215 using reflector antennae, lens antennae, array antennae, phased array antennae, active antennae, or any other mechanism for reception of such signals. In some embodiments, the satellite 105 operates in a multi-beam mode, transmitting a number of narrow beams, each directed at a different region of the earth. With such a multibeam satellite 105, there may be any number of different signal switching configurations on the satellite 105, allowing signals from a single gateway 215 to be switched between different spot beams. In one embodiment, the satellite 105 is configured as a "bent pipe" satellite, wherein the satellite 105 may frequency convert the received carrier signals before retransmitting these signals to their destination, but otherwise perform little or no other processing on the contents of the signals. In various embodiments, there could be a single carrier signal or multiple carrier signals for each service or feeder spot beam. In some embodiments, the subscriber antenna 135 and user terminal 130 together comprise a very small aperture terminal (VSAT), with the subscriber antenna 135 measuring less than one meter in diameter and having approximately 2 watts of power. In other embodiments, a variety of other types of subscriber antennae 135 may be used at the user terminal 130 to receive the signal from the satellite 105.

In certain embodiments, the satellite communications system 200 has its nodes (e.g., non-autonomous gateways 215, core nodes 265, etc.) distributed over a large geographic region (e.g., across the United States of America). Each core node 265 may be configured to support up to twenty non-autonomous gateways 215, each non-autonomous gateway 215 may be configured to support up to four user links, and each user link may support thousands of clients 160. For example, the satellite 105 may operate in a multi-beam mode, transmitting a number of spot beams, each directed at a different region of the earth. Each spot beam may be associated with one of the user links, and used to communicate between the satellite 105 and thousands of user terminals 130. With such a multi-beam satellite 105, there may be any number of different signal switching configurations on the satellite 105, allowing signals from a single gateway 215 to be switched between different spot beams.

In one illustrative case, a subscriber of satellite communications services desires to access a web page using a browser. The subscriber's client 160 (e.g., a client application running on customer premises equipment controlled by the subscriber) may communicate an HTML request through a respective one of the user terminals 130. A user antenna 135 in communication with the respective user terminal 130 communicates the request to the satellite 105, which, in turn, sends the request to the non-autonomous gateway 215 through a provider antenna 125.

The non-autonomous gateway 215 receives the request at a base station 245 configured to service that user terminal 130 and included within a satellite modem termination system (SMTS) 240. Unlike in FIG. 1, where the SMTS 140 sends the request data to a routing module 150, the SMTS 240 of FIG. 2 sends the request data to one or more layer-2 (L2) switches 247. The L2 switches 247 forward the data to a core node 265 or other node of the non-routed ground segment network 220 according to layer-2 (e.g., or substantially equivalent) information. For example, unlike the router module 150 of FIG. 1, the L2 switches 247 may not expend substantial resources analyzing higher layer tags (e.g., parsing 1P headers) and may not strip off tags for the sake of packet routing. Furthermore, all terminals, code nodes, non-autonomous gateways, autonomous gateways, etc. are all able to be on a single contiguous network.

In some embodiments, all data in the non-routed ground segment network 220 being communicated between two non-autonomous gateways 215 passes through at least one core node 265. The core node 265 may include one or more multilayer switches 250 and a gateway module 255. It is worth noting that, while embodiments of the typical gateway 115 of FIG. 1 are shown to include gateway modules 155, embodiments of the non-autonomous gateways 215 do not include gateway modules 255. In some embodiments, the gateway module 255 of the core node 265 is substantially the same as the gateway module 155 of FIG. 1.

When data is received at the core node 265 it may be processed in a number of different ways by the one or more multilayer switches 250. In some embodiments, the multilayer switches 250 process higher-layer information to provide certain types of functionality. For example, it may be desirable to handle packets in certain ways according to virtual private networking (VPN) tags, voice-over-IP (VoIP) designations, and/or other types of higher-layer information.

It is worth noting that embodiments of the multilayer switches 250 are configured to process routing-types of information without stripping data from the packets. In this way, embodiments of the satellite communications system 200 effectively provide mesh-like layer-2 connectivity between substantially all the nodes of the non-routed ground segment network 220. One feature of this type of layer-2 connectivity is that embodiments may perform higher layer processing only (e.g., or primarily) at the core nodes 265, which may substantially speed up communications through the non-routed ground segment network 220. Another feature is that embodiments of the non-routed ground segment network 220 may allow certain types of information (e.g., VPLS tags, proprietary network services tags, etc.) to persist across multiple sub-networks. These and other features will be further appreciated from the description below.

Figure 3:
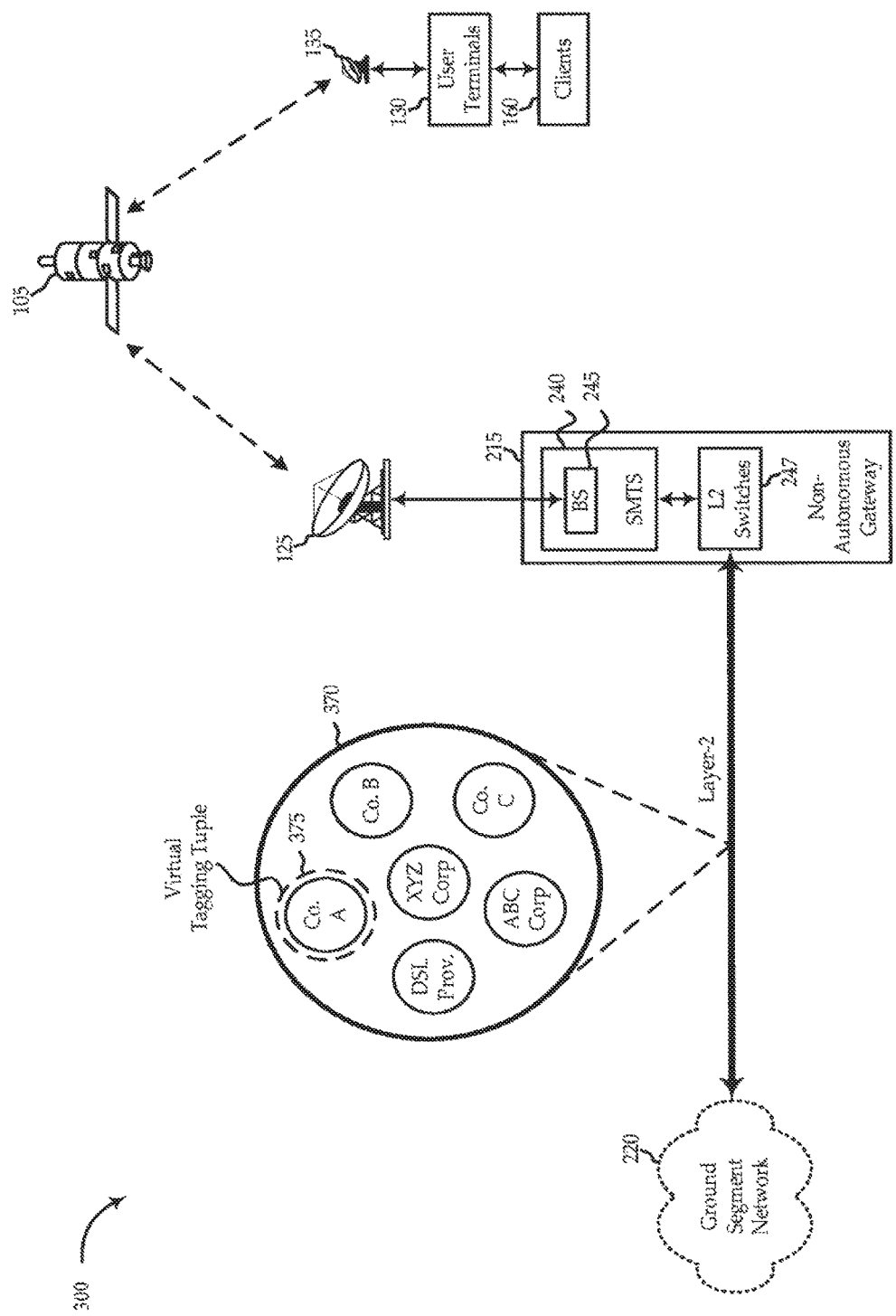
FIG. 3 shows an embodiment of a satellite communications system having a non-autonomous gateway in communication with nodes of a non-routed ground segment network, according to various embodiments.

In some embodiments, the layer-2 connectivity across the non-routed ground segment network 220 is further enabled through the use of virtual tagging tuples. FIG. 3 shows an embodiment of a satellite communications system 300 having a user terminal 130 in communication with a non-autonomous gateway 215 via a satellite 105, where the non-autonomous gateway 215 is further in communication with nodes of a non-routed ground segment network 220 using virtual tagging tuples 375, according to various embodiments. As illustrated, the non-autonomous gateway 215 is in communication with other nodes of the non-routed ground segment network 220 via a tuple-enabled communication link 370.

Embodiments of the tuple-enabled communication link 370 are configured to carry traffic according to a virtual tagging tuple 375. The virtual tagging tuple 375 may be configured to have one or more elements that virtually define information about data relevant to communicating the data through the non-routed ground segment network 220. In one embodiment, the tuple-enabled communication link 370 is implemented as a 10-Gigabit LAN PHY cable (an Ethernet cable configured according to certain local area network (LAN) physical layer (PHY) standards).

Each virtual tagging tuple 375 may "reserve" or "carve out" a certain portion of the tuple-enabled communication link 370 (e.g., the fiber trunk) Each portion may be associated with (e.g., purchased by) an entity. For example, the tuple-enabled communication link 370 may be virtually shared among a number of entities via the virtual tagging tuples 375, and the allotment for each entity may be based on the amount carved out for the entity. For example, if the tuple-enabled communication link 370 represents ten Gigabits per second to "sell," virtual tagging tuples 375 may be purchased in fractions of that link capacity (e.g., one-Gigabit increments). Each entity may then be serviced according to a quality of service structure or other service level agreement, according to the capacity purchased. Further, each entity may be provided with certain types of functionality associated with one or more of its virtual tagging tuples 375.

In one embodiment, the tuple-enabled communication link 370 is a fiber-optic trunk configured according to IEEE Standard 802.1Q-2005. Each virtual tagging tuple 375 may be implemented as a "VLAN tag" according to the 802.1Q standard. For example, where the tuple has two elements, "double tagging," or "Q-in-Q" tagging may be used according to the 802.1Q standard.

For example, a request for content (e.g., an HTML page, a document file, a video file, an image file, etc.) is sent from a client 160 client to a user terminal 130. The request is transmitted up to the satellite 105 and back down to the non-autonomous gateway 215 via the subscriber antenna 135 and the provider antenna 125. Components of the non-autonomous gateway 215 (e.g., one or more L2 switches 247) are configured to add virtual tagging tuples 375 to the data packets.

The virtual tagging tuples 375 added to the data packets may include an entity designation and a location of the entity, implemented as an ordered pair. For example, the entity may be "XYZ Corp," with an entity designation of "205" (or some other numeric, alpha, or alphanumeric designation). Furthermore, "XYZ Corp." may be associated with any number of locations. For example, "XYZ Corp." may have locations in Denver, Colo., San Francisco, Calif., and Rapid City, S.D., and each of these locations may be assigned a location identifier. For example, Denver, Colo. may be assigned "001," San Francisco, Calif. may be assigned "360," and Rapid City, S.D. may be assigned "101," as their location identifiers. Accordingly, virtual tagging tuple 375 "(205, 001)" may indicate traffic associated with "XYZ Corp." and destined for Denver, Colo., while virtual tagging tuple 375 "(205, 101)" would indicate traffic associated with "XYZ Corp." and destined for Rapid City, S.D.

Additional entity designations may be generated. For example, "Co. A" may have a "D24" designation, while "Co. C" may have a "450" designation. Furthermore, location identifiers may be used by multiple entities. For example, virtual tagging tuple 375 "(D24, 360)" may indicate traffic assigned to "Co. A" destined for San Francisco, Calif., while virtual tagging tuple 375 "(205, 360)" indicates traffic assigned to "XYZ Corp." also destined for San Francisco. Alternatively, each entity my have its own customized location identifier(s).

In various embodiments of the non-routed ground segment network 220, the virtual tagging tuples 375 are used to communicate the packets throughout the network without using port-based routing, destination addresses, header parsing, etc. The packets may effectively be communicated among nodes of the non-routed ground segment network 220 as if the nodes are part of a single subnet. Even geographically remote non-autonomous gateways 215 may communicate as if part of a local area network (LAN). For example, as described above, based on virtual tagging tuple 375 entity and location designations, packets may be forwarded to designated locations anywhere in the non-routed ground segment network 220. The virtual tagging tuples 375 may be used by gateway modules, switches, cross-connects, core nodes, peering routers, and/or any other node of the non-routed ground segment network 220.

Figure 4A:
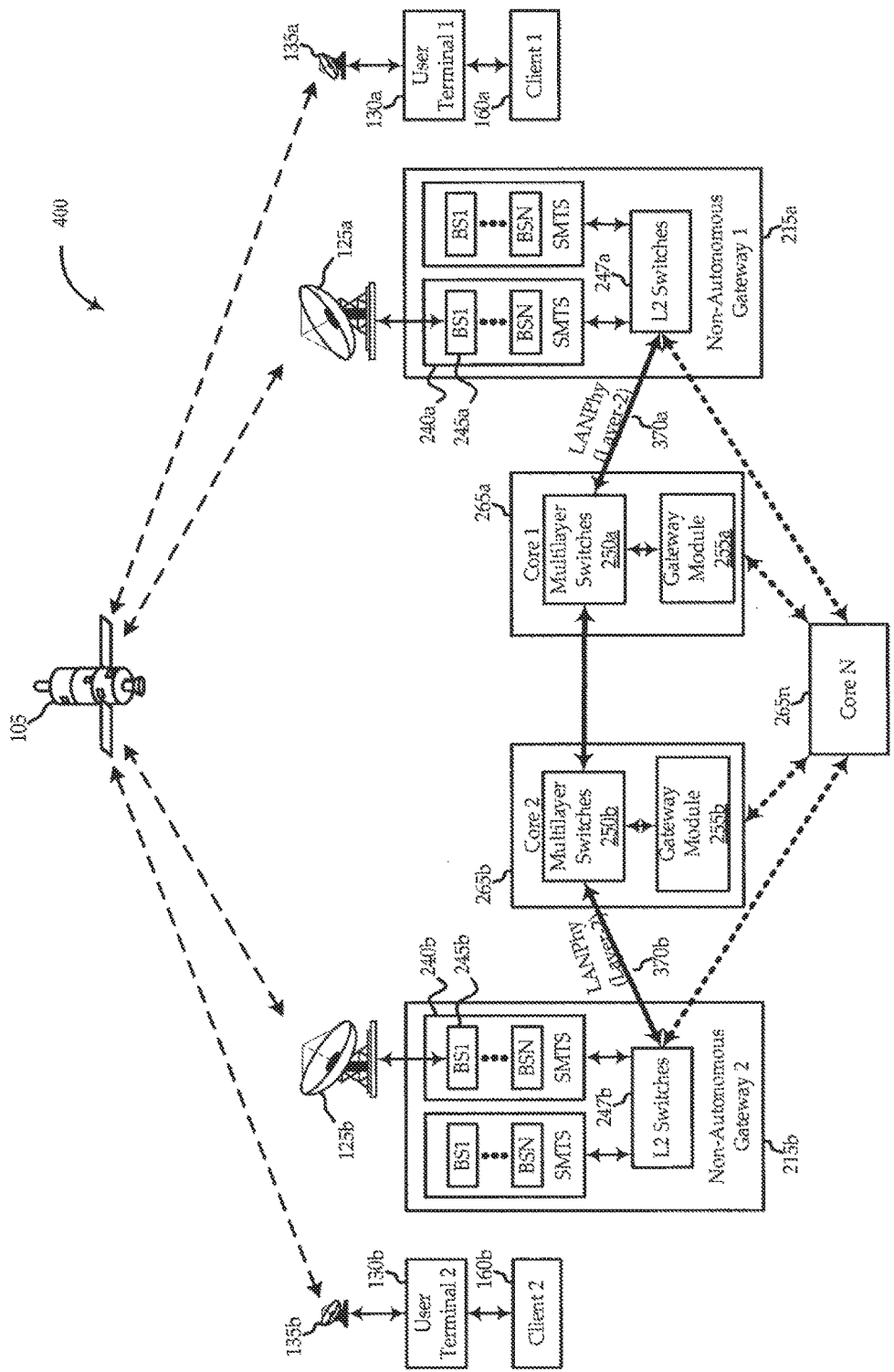
FIG. 4A shows an embodiment of a satellite communications system used for communication between two clients over a non-routed ground segment network, according to various embodiments.

In various embodiments, clients 160 may use the satellite communications system 300 to communicate, via the non-routed ground segment network 220, to any addressable location in communication with the non-routed ground segment network 220. For example, clients 160 may communicate with service providers, the Internet, content delivery networks (CDNs), other clients 160, etc. FIG. 4A shows an embodiment of a satellite communications system 400 used for communication between two clients 160 over a non-routed ground segment network, according to various embodiments. In some embodiments, the satellite communications system 400 is substantially equivalent (e.g., an extended illustration of) the satellite communications system 200 of FIG. 2.

A first client 160a is in communication with a first non-autonomous gateway 215a via a respective subscriber antenna 135a and provider antenna 125, and the satellite 105. The first non-autonomous gateway 215a is in communication with one or more core nodes 265 (illustrated as a first core node 265a and an nth core node 265n). For example, data is communicated from the first client 160a, destined for a second client 160b. The data is received by a first base station 245a in a first SMTS 240 in the first non-autonomous gateway 215a. The data is then switched by one or more first L2 switches 247a and sent over a first LAN PHY cable 370a to one or more first multilayer switches 250a in the first core node 265a. In the first core node 265a, the data from the first client 160a may be processed (e.g., interpreted, parsed, switched, etc.) at one or more layers by the first multilayer switches 250a and/or a first gateway module 255a.

The first core node 265a is in communication with at least a second core node 265b. The first core node 265a may determine, for example as a function of an associated virtual tagging tuple 375 or a higher-layer tag, that the data from the first client 160a should be passed to the second core node 265b. The second core node 265b may further process the communications at one or more layers by second multilayer switches 250b and/or a second gateway module 255b.

The second core node 265b may pass the data to an appropriate second non-autonomous gateway 215b, for example, over a second LAN PHY cable 370b. The second non-autonomous gateway 215b may then switch the data at layer 2 and pass the data to an appropriate second base station 245b in a second SMTS 240b in the second non-autonomous gateway 215b. For example, the second base station 245b is configured to support (e.g., or is currently switched or tuned to support) a spot beam being used to service the second client 160b. The second base station 245b may communicate the data from the second non-autonomous gateway 215b to the second client 160b via a respective provider antenna 125b and subscriber antenna 135b, and the satellite 105.

It is worth noting that, while the first core node 265a and/or the second core node 265b may process the data at multiple layers, embodiments of the core nodes 265 are configured to maintain layer-2 connectivity across the communication. In fact, the non-autonomous gateways 215, core nodes 265, and other nodes may all be part of a non-routed ground segment network (e.g., like the non-routed ground segment network 220 of FIG. 2), and embodiments of the non-routed ground segment network may effectuate layer-2 connectivity between any two of its nodes. For example, the first non-autonomous gateway 215a and the second non-autonomous gateway 215b act as if they are on a single subnet (e.g., LAN), regardless of the number of nodes through which the data passes, the distance over which it is communicated, the number of sub-networks employed, etc.

It will be appreciated that a large non-routed ground segment network may include a number of different types of nodes, for example, to account for various client densities and locations, topologies (e.g., mountain ranges, lakes, etc.), etc. Furthermore, satellite communications network 400 enables, for example, client 1 160a and client 2 160b to function on the same network. As such, both clients are able to have an IP address on the same sub-net (e.g., 192.168.1.*), receive the same services, receive a multicast or a broadcast message, etc. In other words, client 1 and client 2 are able to be connected in the same manner similar to if were located in the same room connected to the same switch.

Of course many of these features further involve use of one or more types of data stack throughout a communication link. For example, FIG. 4B shows an illustrative communication link for an enterprise customer in a system in communication with an enterprise network 405, like the one shown in FIG. 4A, and FIG. 4C shows an illustrative data flow through the link in FIG. 4B. As illustrated, the communication link 450 of FIG. 4B provides connectivity between a client (e.g., enterprise customer premises equipment (CPE)) 160 and an enterprise head-end 405. Communications on the communication link 450 may pass from the enterprise remote site to a gateway 215 (e.g., from the CPE 160 to the gateway via a user terminal and a satellite link 105), from the gateway 215 to a core node 265 (e.g., from an L2 backhaul switch in the gateway to an gateway and L2/L3 switch in the core), and from the core to the enterprise head-end 405 (e.g., from the L2/L3 switch in the core to a peer router in the head-end via a leased line). The data flow 460 in FIG. 4C shows illustrative data stacks at various locations (410, 415, 420, and 425) in the communication link 450 of FIG. 4B. It is worth noting, for example, that the bottom four layers of the illustrative data stack remains intact throughout the communication link 450.

Figure 5:
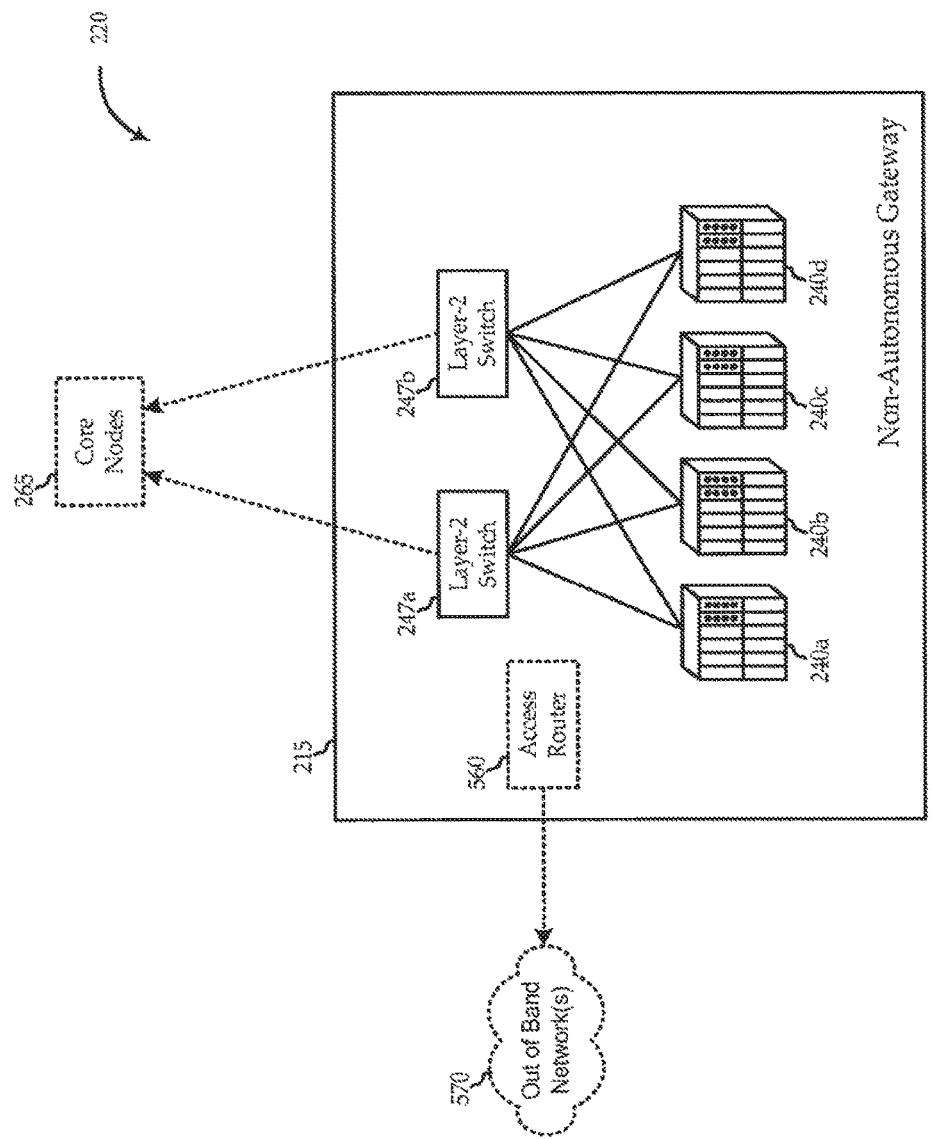
FIG. 5 illustrates a non-autonomous gateway shown as part of a portion of a non-routed ground segment network, according to various embodiments.

As discussed above, the non-routed ground segment network (e.g., like the network 400 of FIG. 4A) may include a number of different types of nodes in various types of configurations. Some of these different types of nodes and node configurations are described with reference to FIGS. 5-9. Turning first to FIG. 5, an embodiment of a non-autonomous gateway 215 is shown as part of a portion of a non-routed ground segment network 220.

The non-autonomous gateway 215 includes a number of SMTSs 240. Embodiments of each SMTS 240 include multiple base stations. For example, each base station may be implemented on a circuit card or other type of component integrates into the SMTS 240. The illustrated non-autonomous gateway 215 includes four SMTSs 240, each in communication with two L2 switches 247. For example, each SMTS 240 is coupled with both L2 switches 247 to provide redundancy and/or other functionality. Each L2 switch 247 may then be in communication (e.g., directly or via other nodes of the non-routed ground segment network 220 that are not shown) with one or more core nodes 265. For example, each L2 switch 247 may be in communication with a single core node 265, so that the non-autonomous gateway 215 is effectively in substantially redundant communication with two core nodes 265.

Embodiments of the non-autonomous gateway 215 are configured to support other types of communication, for example, with other networks. In one embodiment, one or more service providers are in communication with the non-routed ground segment network 220 via one or both of the L2 switches 247 or one or more of the core nodes 265. In one embodiment, the non-autonomous gateway 215 includes an access router 560. The access router 560 may be configured to interface with (e.g., provide connectivity with) one or more out-of-band networks 570.

Figure 6A:
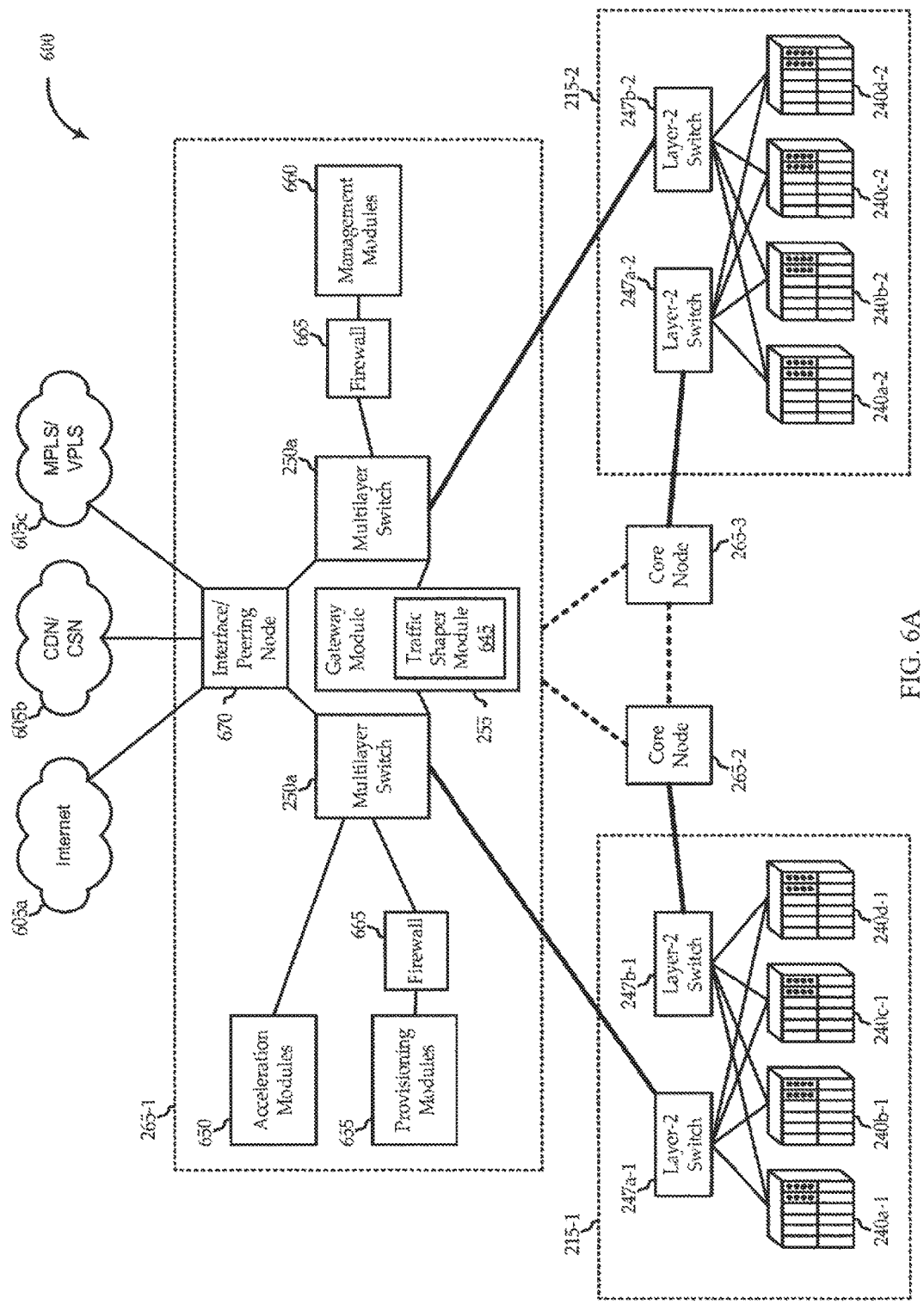
FIG. 6A shows an embodiment of a communications system having multiple non-autonomous gateways in communication with a more detailed illustrative embodiment of a core node, according to various embodiments.

As described above, the L2 switches 247 in the non-autonomous gateway 215 are in communication with one or more core nodes 265 so as to facilitate persistent layer-2 connectivity. FIG. 6A shows an embodiment of a communications system 600 having multiple non-autonomous gateways 215, like the non-autonomous gateway 215 of FIG. 5, in communication with a more detailed illustrative embodiment of a core node 265, according to various embodiments. As in FIG. 5, each non-autonomous gateway 215 includes multiple SMTSs 240, each in communication with multiple L2 switches 247. Each L2 switch 247 is shown to be in communication with a core node 265, so that the non-autonomous gateway 215 is effectively in substantially redundant communication with multiple core nodes 265. Further, in some embodiments, each core node 265 is in communication with each other core node 265, either directly or indirectly. For example, the core nodes 265 may be in communication in a ring-like topology, a mesh-like topology, etc.

As discussed above, the non-autonomous gateways 215 communicate with the core nodes 265 using layer-2 connectivity between one or more L2 switches 247 in the non-autonomous gateways 215 and one or more multilayer switches 250 in the core nodes 265. The illustrative first core node 265-1 is in communication with multiple non-autonomous gateways 215 via two multilayer switches 250. In various embodiments, the multilayer switches 250 are in communication with each other either directly or indirectly (e.g., via an gateway module 255).

In some embodiments, the gateway module 255 includes one or more processing components for processing traffic received at the multilayer switches 250. In one embodiment, the gateway module 255 includes a traffic shaper module 645. Embodiments of the traffic shaper module 645 are configured to help optimize performance of the communications system 600 (e.g., reduce latency, increase effective bandwidth, etc.), for example, by delaying packets in a traffic stream to conform to one or more predetermined traffic profiles.

The multilayer switches 250 may further be in communication with one or more networks 605. The networks 605 may include the Internet 605a, one or more CDNs 605b, one or more MPLS or VPLS networks 605c, etc. In some embodiments, the core node 265 includes an interface/peering node 670 for interfacing with these networks 605. For example, an Internet service provider or CDN service provider may peer with the core node 265 via the interface/peering node 670.

Embodiments of the multilayer switches 250 process data by using one or more processing modules in communication with the multilayer switches 250. For example, as illustrated, the multilayer switches 250 may be in communication with acceleration modules 650, provisioning modules 655, and/or management modules 660. Communications with some or all of these modules may be protected using components, like firewalls 665. For example, certain modules may have access to (and may use) private customer data, proprietary algorithms, etc., and it may be desirable to insulate that data from unauthorized external access. In fact, it will be appreciated that many types of physical and/or logical security may be used to protect operations and data of the core nodes 265. For example, each core node 265 may be located within a physically secured facility, like a guarded military-style installation.

Figure 6B:
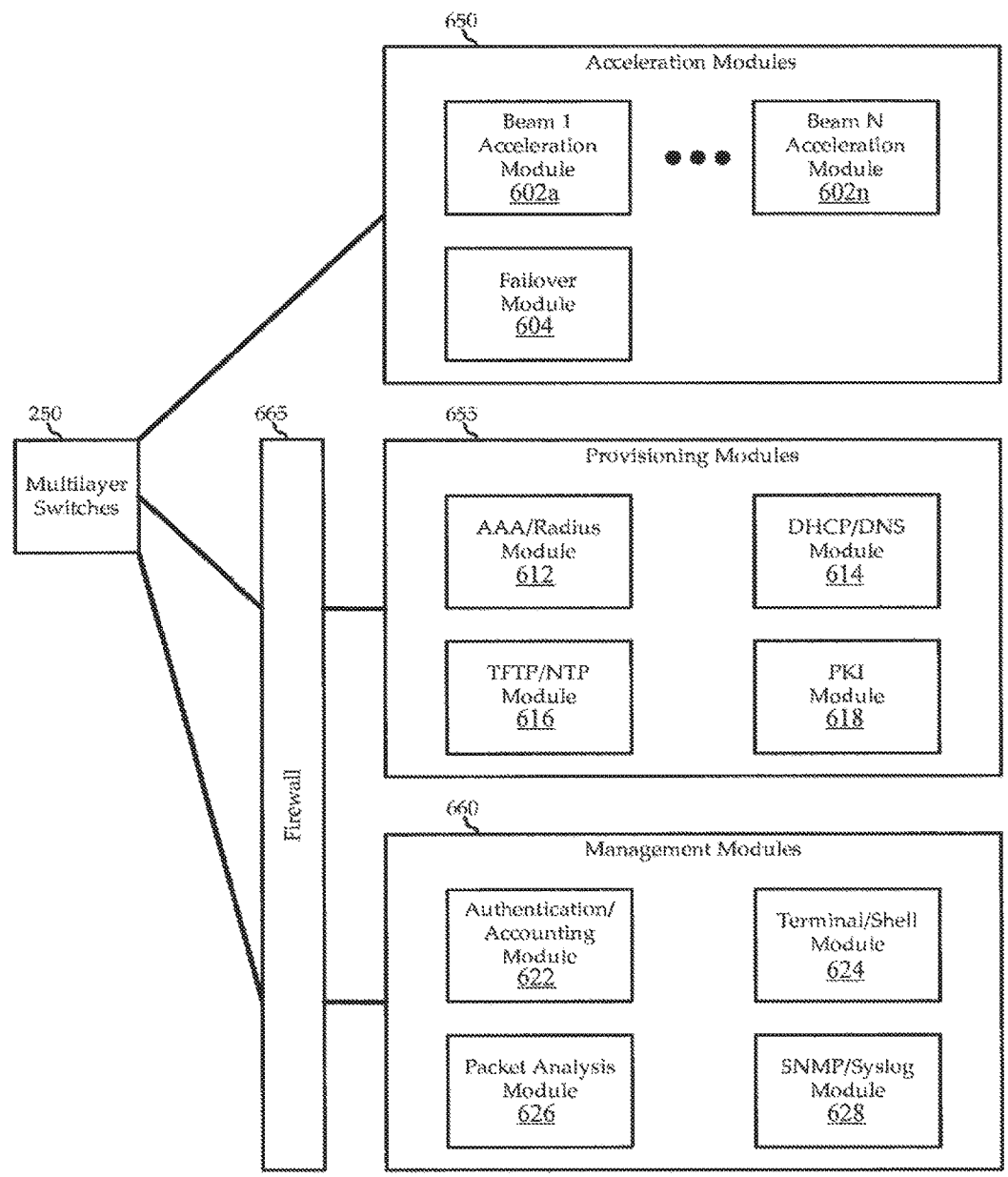
FIG. 6B shows embodiments of various modules in communication with one or more multilayer switches, according to various embodiments

FIG. 6B shows embodiments of various modules in communication with one or more multilayer switches 250, according to various embodiments. As in the first core node 265-1 of FIG. 6A, FIG. 6B shows multilayer switches 250 in communication with acceleration modules 650, provisioning modules 655, and management modules 660. The multilayer switches 250 are in communication with the provisioning modules 655 and management modules 660 via a firewall 665. It is worth noting that the illustrated modules are intended only to show one non-limiting embodiment. Many other types of modules, units, groupings, configurations, etc. are possible according to other embodiments.

In one embodiment, the acceleration modules 650 include beam-specific acceleration modules 602 and a failover module 604 which detects a connection failure and redirects network traffic to a backup or secondary connection. Embodiments of the acceleration modules 650 provide various types of application, WAN/LAN, and/or other acceleration functionality. In one embodiment, the acceleration modules 650 implement functionality of AcceleNet applications from Intelligent Compression Technologies, Inc. ("ICT"), a division of ViaSat, Inc. This functionality may be used to exploit information from higher layers of the protocol stack (e.g., layers 4-7 of the OSI stack) through use of software or firmware operating in each beam-specific acceleration module 602. The acceleration modules 650 may provide high payload compression, which may allow faster transfer of the data and enhances the effective capacity of the network. In some embodiments, certain types of data (e.g., real-time data, User Datagram Protocol (UDP) data traffic, etc.) bypass the acceleration modules 650, while types of data (e.g., non-real-time data, Transmission Control Protocol (TCP) data traffic, etc.) are routed through the accelerator module 650 for processing. For example, IP television programming may bypass the acceleration modules 650, while web video may be sent to the acceleration modules 650 from the multilayer switches 250.

In one embodiment, the provisioning modules 655 include a AAA/Radius module 612, a DHCP/DNS module 614, a TFTP/NTP module 616, and a PKI module 618. Embodiments of the AAA/Radius module 612 perform certain types of authentication and accounting functionality. For example, the AAA/Radius module 612 may implement functionality of an Authentication Authorization Accounting (AAA) server, a Remote Authentication Dial-In User Service (RADIUS) protocol, an Extensible Authentication Protocol (EAP), a network access server (NAS), etc. Embodiments of the DHCP/DNS module 614 implement various IP management functions, including Dynamic Host Configuration Protocol (DHCP) interpretation, Domain Name System (DNS) look-ups and translations, etc. Embodiments of the TFTP/NTP module 616 implement various types of protocol-based functions, including file transfer protocols (e.g., File Transfer Protocol (FTP), trivial file transfer protocol (TFTP), etc.), synchronization protocols (e.g., Network Time Protocol (NTP)), etc. Embodiments of the PKI module 618 implement various types of encryption functionality, including management of Public Key Infrastructures (PKIs), etc.

In one embodiment, the management modules 660 include an authentication/accounting module 622, a terminal/shell module 624, a packet analysis module 626, an SNMP/Syslog module 628, etc. Embodiments of the authentication/accounting module 622 implement various authentication and accounting functions that may be similar to or different from those of the AAA/Radius module 612. For example, the authentication/accounting module 622 may control certain billing functions, handle fair access policies (FAPs), etc. Embodiments of the terminal/shell module 624 implement various types of connectivity with individual devices. Embodiments of the packet analysis module 626 implement various packet analysis functions. For example, the packet analysis module 626 may collect packet-level information and/or statistics for use in certain types of accounting functions. Embodiments of the SNMP/Syslog module 628 implement various network protocol management and logging functions. For example, the SNMP/Syslog module 628 may use the Simple Network Management Protocol (SNMP) to expose network management information and the Syslog standard to log network messages.

Figure 7A:
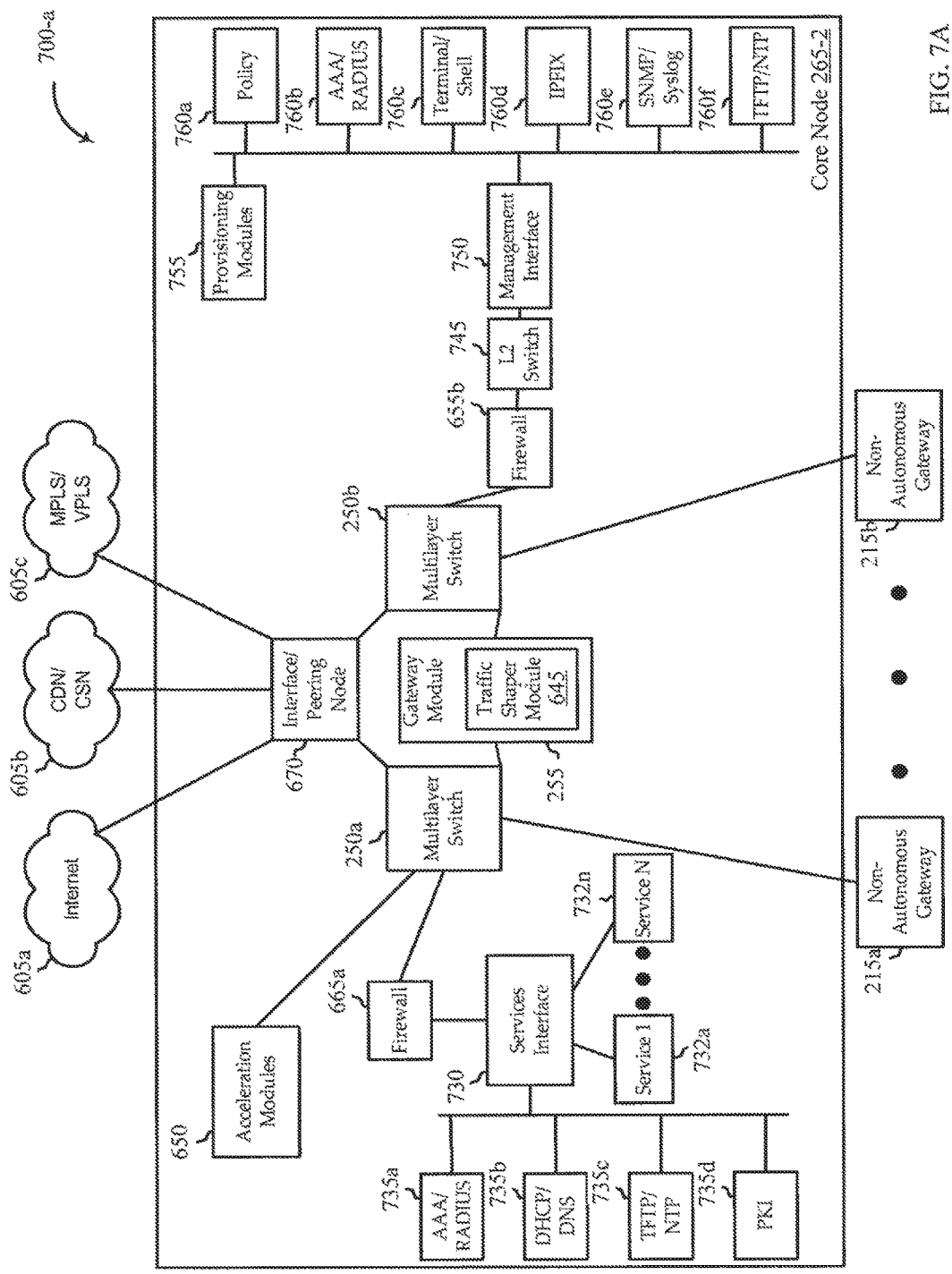
FIG. 7A illustrates an alternative architecture of a core node, according to various embodiments.

FIG. 7A illustrates an alternative architecture of a core node 265-2, in accordance with one embodiment of the present invention. Core node 265-2 may be in communication with 1 to N non-autonomous gateways 215. As discussed above, the non-autonomous gateways 215 communicate with the core node 265-2 using layer-2 connectivity between one or more layer-2 switches 247 in the non-autonomous gateways 215 and one or more multilayer switches 250a and 250b in the core node 265-2. The illustrative core node 265-2 is in communication with multiple non-autonomous gateways 215a-215n via multilayer switches 250a and 250b. In various embodiments, the multilayer switches 250a and 250b are in communication with each other either directly or indirectly (e.g., via a gateway module 255).

Embodiments of the multilayer switches 250a and 250b process data by using one or more processing modules or interfaces in communication with the multilayer switches 250a and 250b. For example, as illustrated, the multilayer switches 250a and 250b may be in communication with AAA/RADIUS 735a, DHCP/DNS 735b, TFTP/NTP 735c, or PKI 735d, through a firewall 665 and services interface 730. Furthermore, multilayer switches 250a and 250b may be in communication with a provisioning module 755 through a firewall 665b, a layer-2 switch 745, and a management interface 750. In addition to being in communication with provisioning module 755, multilayer switches 250a and 250b may also be in communication with policy module 760a, AAA/RADIUS 760b, terminal/shell 760c, IP flow information export (IPFIX), traffic and/or flow accounting and analysis 760d, SNMP/syslog 760e, and TFTP/NTP 760f. Communication with these modules may be restricted, for example, certain modules may have access to (and may use) private customer data, proprietary algorithms, etc., and it may be desirable to insulate that data from unauthorized external access. In fact, it will be appreciated that many types of physical and/or logical security may be used to protect operations and data of the core node 265-2. For example, each core node 265 may be located within a physically secured facility, like a guarded military-style installation.

In a further embodiment, services interface 730 may be in communication with service 1 732a to service N 732n. Service 1 to service N may be any one of the services described above (i.e., AAA/RADIUS 745a, DHCP/DNS 735b, TFTP/NTP 735c, PKI module 735d, etc.), as well as other services provided in satellite networking environment. Furthermore, any number of services may be provided (i.e., 1-N number of services).

In one embodiment, AAA/Radius module 760b may implement the functionality of AAA/Radius module 612, DHCP/DNS module 735b may implement the functionality of DHCP/DNS module 614, TFTP/NTP module 735c may implement the functionality of TFTP/NTP module 616, SNMP/Syslog module 760e may implement the functionality of SNMP/Syslog module 628, terminal/shell module 760c may implement the functionality of terminal/shell module 624, and PKI module 735d may implement the functionality of PKI module 618. In a further embodiment, policy module 760a may control certain billing functions, handle fair access policies (FAPs), etc.

Figure 7B:
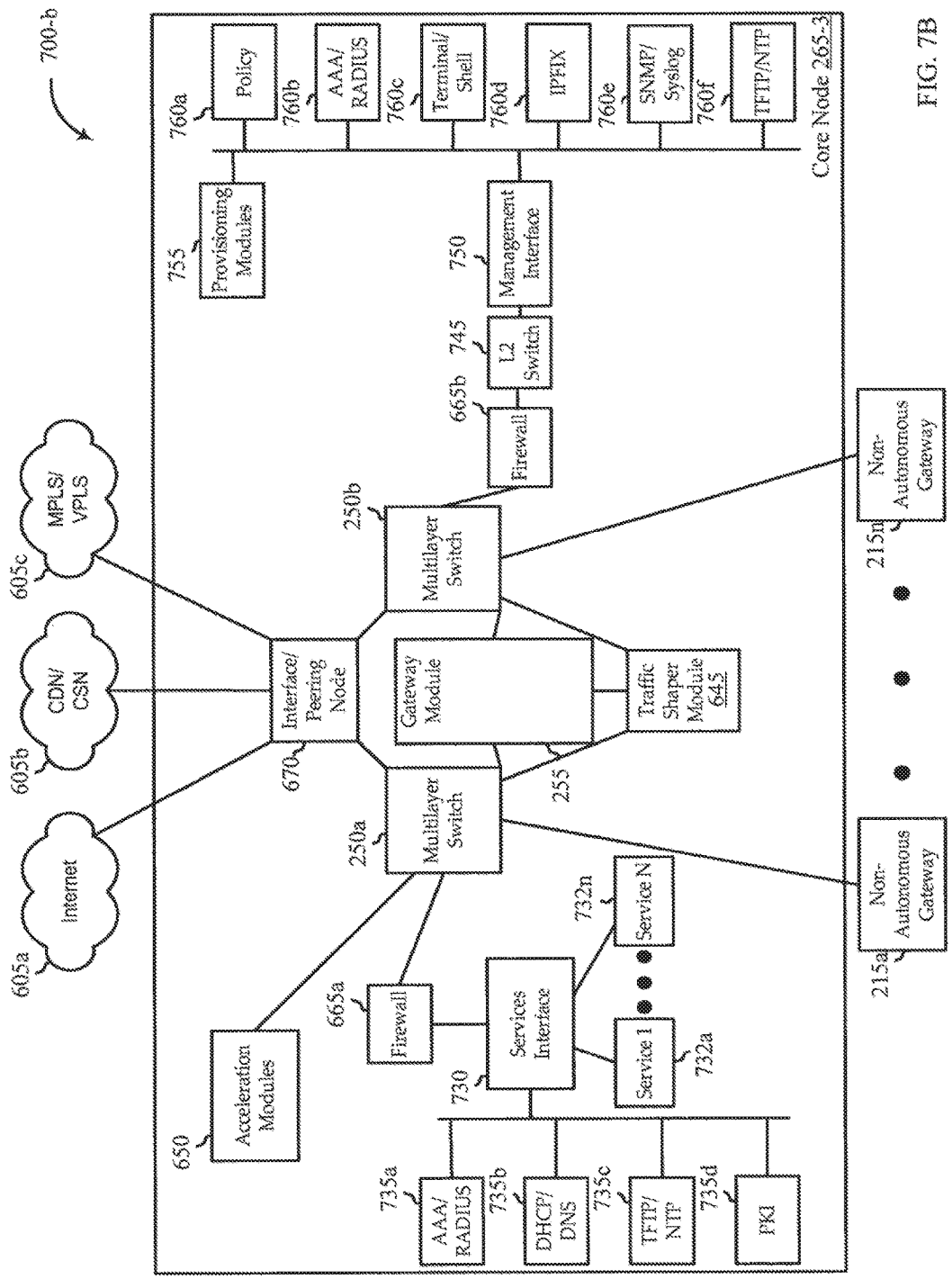
FIG. 7B illustrates traffic shaper module operating separately from gateway module, according to various embodiments.

In an alternative embodiment, FIG. 7B illustrates traffic shaper module 645 operating separately from gateway module 255. In this configuration traffic shaper module 645 may be locally or remotely located from gateway module 255, and may communicate directly with multilayer switches 250a and 250b, or with gateway module 255.

Figure 7C:
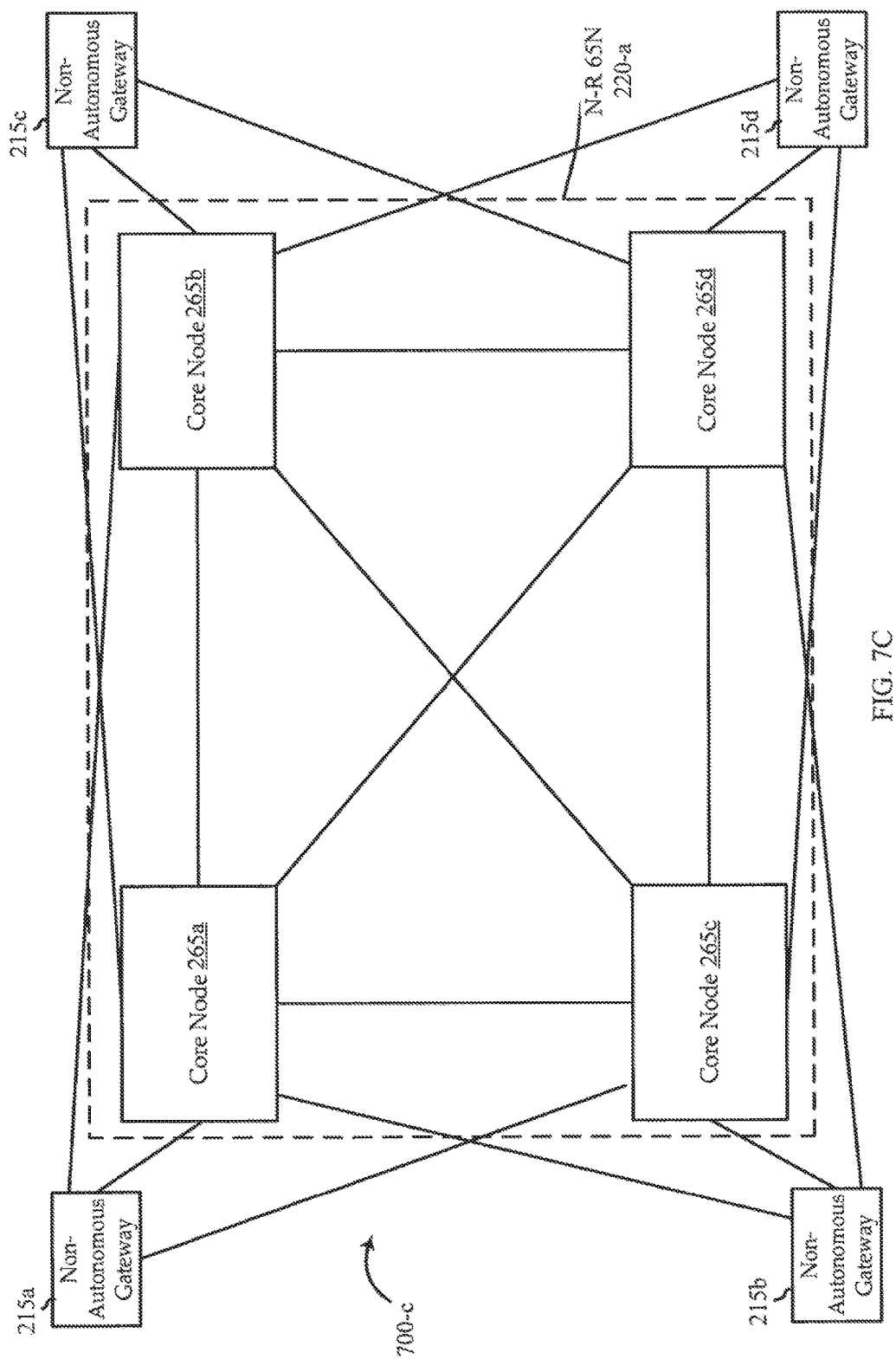
FIG. 7C illustrates one embodiment of a core-based network architecture implementing a non-routed ground segment network, according to various embodiments.

Accordingly, core node 265 is configured to internally handle various services and functionality. Turning now to FIG. 7C, which illustrates one embodiment of a core-based network architecture 700-c, implementing a non-routed ground segment network 220-a which includes core nodes 265. In one embodiment, each core node 265a-d is connected to every other core node, and each core node 265a-d is connected to a non-autonomous gateway 215a-d, respectively. This configuration is merely for the purposes of explanation, and it should be noted that any number of core nodes or non-autonomous gateways may be used. Also, core nodes may be indirectly connected to other core nodes, core nodes may be connected to other core nodes through one or more non-autonomous gateway, etc.

Such a network configuration provides significant benefits. For example, service and/or resource specific failure at a core node, or complete failure of a core node is able to be redundantly managed by one or more of the other core nodes. Assuming, for the purpose of explanation, that core node 265a services non-autonomous gateway 215a, core node 265b services non-autonomous gateway 215b, and so forth. If for example, DHCP service at core node 265b fails, then DHCP service requests from the customers connected with non-autonomous gateway 215b would be serviced through core node 265d, without the customers noticing any change. For example, their IP address, their session, etc. would remain the same. Furthermore, the other services provided by core node 265b (e.g., DNS, acceleration, PKI, etc.) would still be handled by core node 265b, and only the failed service would be diverted to core node 265d.

Such a service specific redundancy scheme is possible by this network configuration, in part, because of the end-to-end layer-2 connectivity, the placement of the core nodes, and structure and configuration of the core nodes 265. For example, if the network did not have end-to-end layer-2 connectivity, then such redundancy would not be possible. If the packets were routed (i.e., layer-3 or above), or virtually switched (i.e., MPLS), then once a packet went from core node 265b to core node 265d, the MAC header of the packet would be altered, and as such the network (i.e., the LAN, subnet, etc.) of the packet would change. Accordingly, the ability to provide service through the new core node (e.g., core node 265d) would be lost.

Similarly, if a core node completely fails or the connection (e.g., fiber cable) between a core node and a non-autonomous gateway fails, then all of the operations of the failed core node are able to be assumed by (or diverted to) one or more other core nodes. For example, if the connection between non-autonomous gateway 215a and core node 265a is cut or damaged, then core node 265c may provide the services previously provided by core node 265a to non-autonomous gateway 215a. In one embodiment, in both examples the core node assuming the failed service in response to a complete failure may be notified of the failure by, for example, time-to-live (TTL) packets, acknowledgment packets, etc. If the core node's functions fall below a threshold, another core node may be triggered to assume servicing of the failed service (or services).

Furthermore, such a network configuration is configured to allow sharing of resources among the core nodes. For example, one or more resources at one code node may be over-burdened, while other core nodes may be running under capacity. In such a situation, some or all of the services from the over-burdened core node may be diverted to one or more other core nodes. As such, the usage of all cores may be distributed in order to maximize core node resource use and avoid a core node from being over committed.

It should be noted that any available path within non-routed ground segment network 220-a may be used. For example, it may be more efficient or necessary for a failed service at core node 265c to be handled by core node 265b, by passing though non-autonomous gateway 215d. As such, network 700-c provides completely dynamic paths among the core nodes 265 and non-autonomous gateways 215. Furthermore, within network 700-c, any service can be provided to any customer by any core at any time. In one embodiment, core node connectivity may be fully meshed at layer-2 using VPLS.

In one embodiment, because core node 265 is configured to provide end-to-end layer-2 connectivity across a network, core node 265 is able to more easily peer with one or more public or private networks. For example, a public or private network may connect with non-autonomous gateway 215d. The customers connected to non-autonomous gateways 215a-c can receive the content from the peering node connected to non-autonomous gateway 215d, as though the peering node was connected directly to their respective non-autonomous gateways 215a-c. This is due, in part, to the end-to-end layer-2 connectivity and inter-node connectivity. As such, the content provided by the peering node to customers connected with non-autonomous gateway 215d is also provided to each of the other customers connected with non-autonomous gateways 215a-c. As such, peering at one node that is geographically dispersed from other nodes (or gateways) may be able to provide access to the peered network from the other nodes or gateways. For example, by peering with a network in Dallas, network 700-c has access to the peered network from Denver (or anywhere else with network 700-c).

For example, a peering node in Dallas connected to a non-autonomous gateway 215 in Dallas can provide their content to customers in San Francisco (e.g., non-autonomous gateway 215a), Denver (e.g., non-autonomous gateway 215b), Salt Lake (e.g., non-autonomous gateway 215c), by only connecting through a single drop point (i.e., Dallas). As such, a peering node providing content significantly increases the number of customers, without adding additional drop points. This is particularly useful in a peering context because in order for a peering relationship to exist, the two networks need to be "peers" (i.e., be relatively equal in content and customer base). Network 700-c significantly increases the number of customers that the entity implementing network 700-c can represent to the potential peer, thus increasing the likelihood of developing a peering (or equal) relationship.

Similar to a peering node, network 700-c may connect with content service network (CSN) and/or a content delivery network (CDN) 605 through one or more gateways 215. Like a peering relationship, CSN/CDN 605 provides content and services to a network provider, and typically such CSN/CDNs 605 are located at high traffic areas (e.g., New York, San Francisco, Dallas, etc.). Moving these CSN/CDNs 605 to more remote of more locations is often not economical. Accordingly, network 700-c allows CSN/CDN 605 to connect at any gateway 215 or core node 265, and not only provide the content and/or services to the customers at the connected core node 265 or non-autonomous gateway 215, but to customers within the entire network 700-c connected to all non-autonomous gateways 215 and core nodes 265. Thus, the CSN/CDN 605 can connect at one drop point, and provide content to all customers within network 700-c.

This, in part, is made possible by the end-to-end layer-2 connectivity of network 700-c. If the network was routed, then the customers not directly connected to the gateway or core node at the drop point for the CSN/CDN 605, are difficult to be on the same network and would not be able to receive the content and services. Furthermore, the redundancy scheme of network 700-c provides a sufficient amount redundancy to accommodate for such a large number of customers. Without the redundancy scheme of network 700-c, CSN/CDN 605 would not be able to be sufficiently supported.

Additionally, network 700-c is capable of utilizing out-of-band fail over networks for additional redundancy (e.g., out of band (OOB) network). Again, the out-of-band network can only be connected to one non-autonomous gateway 215 or core node 265, but still provide the redundancy to any part of network 700-c. As such, network 700-c need only connect to the out-of-band network at one location in order to gain the benefit of the out-of-band network throughout the entire network 700-c.

Furthermore, it should be noted that the configuration illustrated in FIG. 7C should not be construed as limiting, and any number of variations to the network architecture may be used. For example, a non-autonomous gateway may be connected to two core nodes and no other non-autonomous gateways. Alternatively, the core nodes may note be interconnected and/or a non-autonomous gateway may be placed between two core nodes. As such, any number of variations may be implemented.

It is worth noting that the functionality of the various modules is described as occurring within one or more core modules 265, and the core modules 265 are in communication with a distributed network of non-autonomous gateways 215 and/or other nodes. While this type of distributed non-routing networking may be preferred in many environments, it may be difficult (e.g., not cost-effective or technologically inefficient) or impractical for a gateway to communicate with a core node 265. As such, it may be desirable in some environments to implement a so-called autonomous gateway having at least some of the combined functionality of a non-autonomous gateway 215 and a core node 265.

Figure 8:
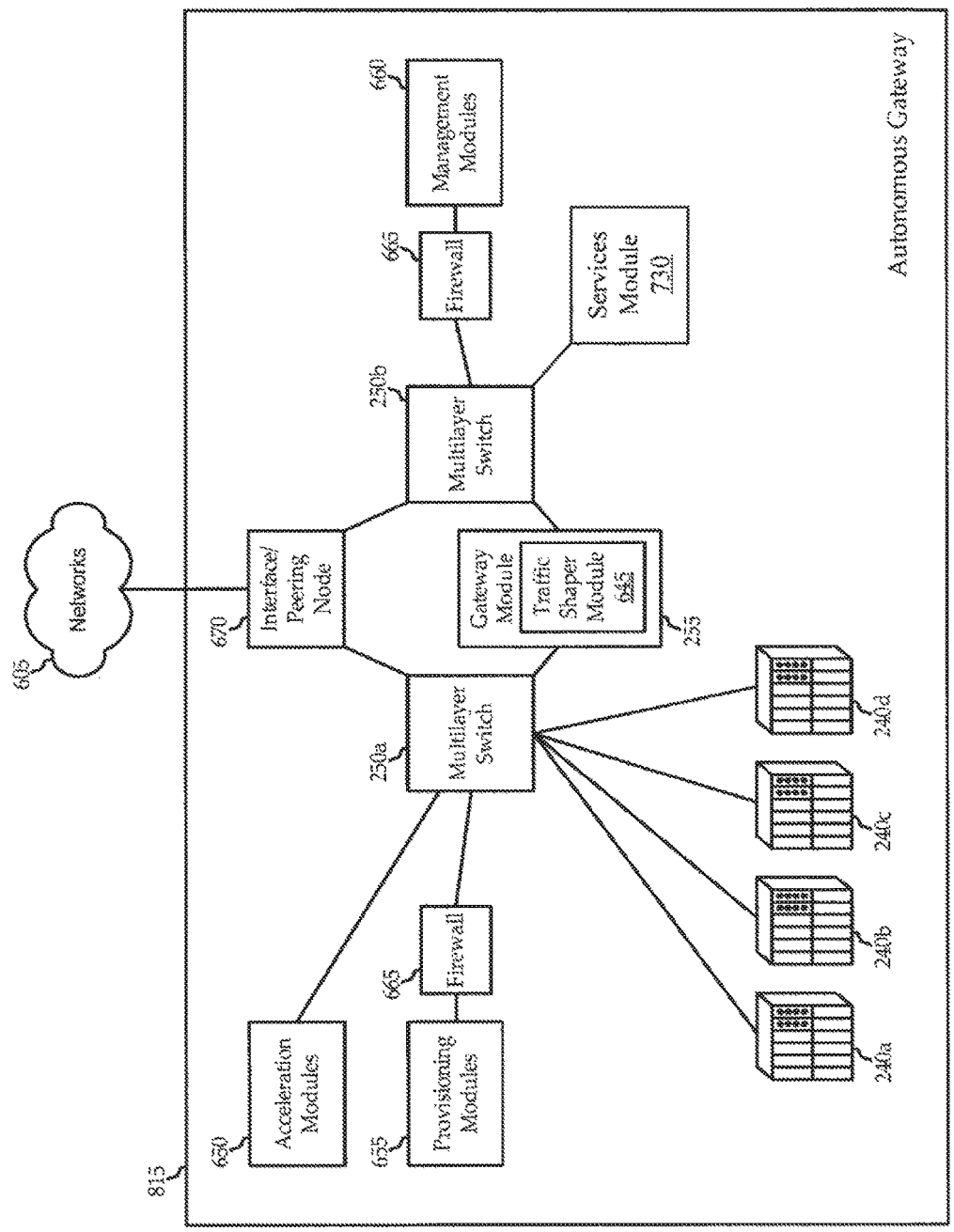
FIG. 8 shows an embodiment of an autonomous gateway, according to various embodiments.

FIG. 8 shows an embodiment of an autonomous gateway 815, according to various embodiments. In some embodiments, the autonomous gateway 815 includes one or more SMTSs 240, which may be implemented substantially as the SMTSs 240 of the non-autonomous gateway 215 of FIG. 2. The SMTSs 240 may be in communication with one or more multilayer switches 250. The multilayer switches 250 may be in communication with a gateway module 255 and an interface/peering node 670. The interface/peering node 670 may be in communication with one or more other networks 605. It is worth noting that the gateway module 255 may include other functionality in certain embodiments. For example, the illustrated embodiment includes a traffic shaper module 645. In other embodiments, the traffic shaper module 645 may be implemented differently or as part of a different component. The multilayer switches 250 may be configured to process data using one or more modules. For example, the multilayer switches 250 may be in communication with acceleration modules 650, provisioning modules 655, services module 730, and/or management modules 660, for example, through one or more firewalls 665. It will be appreciated that, unlike the typical gateway 115 of FIG. 1, in accordance with aspects of the present invention, embodiments of the autonomous gateway are able to implement some of the enhanced (e.g., Layer-2 connectivity-enabled) functionality of the non-autonomous gateways 215 and core nodes 265.

In one embodiment, autonomous gateway 815 is configured to operate autonomously or separately from other gateways and/or core nodes. For example, using services module 730, acceleration modules 650, provisioning modules 655, and/or management modules 660, autonomous gateway 815 is able to completely manage requests received through SMTSs 240 and multilayer switches 250a and 250b. Furthermore, since multilayer switches 250a and 250b are equipped to handle requests at both layer-2 and layer-3, autonomous gateway 815 is not limited in the same ways as gateway 115.

In one embodiment, services module 730 may include services, such as, AAA, RADIUS, DHCP, DNS, TFTP, NTP, PKI, etc. Furthermore, management modules 660 may include billing, terminal, shell, IP flow information export (IPFIX), traffic and/or flow accounting and analysis, SNMP, syslog, etc. Accordingly, autonomous gateway 815 is equipped to function as a "stand-alone" entity, locally (or pseudo-locally) providing services and management to CPEs.

Figure 9:
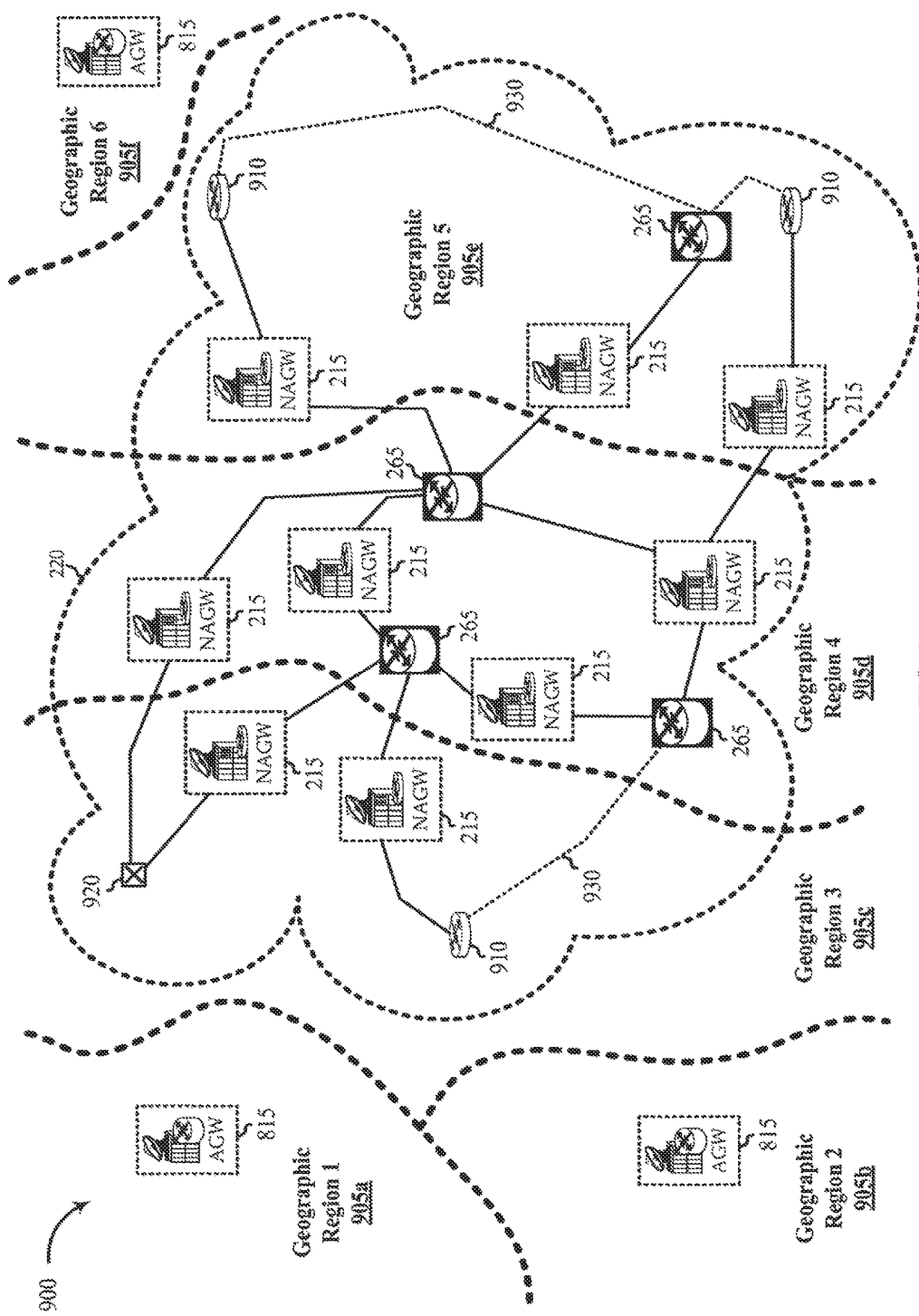
FIG. 9 shows an embodiment of a satellite communications system that distributes autonomous gateways and non-autonomous gateways across a number of geographically dispersed regions, according to various embodiments.

FIG. 9 shows an embodiment of a satellite communications system 900 that distributes autonomous gateways 815 and non-autonomous gateways 215 across a number of geographically dispersed regions 905, according to various embodiments. In one embodiment, a first geographic region 905a, a second geographic region 905b and a sixth geographic region 905f represent environments where it is not cost-effective to provide communications with core nodes 265. As such, these geographic regions 905 are illustrated as having autonomous gateways 815. For example, autonomous gateways 815 may be used in island regions, geographically remote regions, regions with particular types of topologies (e.g., large mountain ranges), etc.

In contrast to the above-mentioned regions (geographic regions 905a, 905b, and 905f), a third geographic region 905c, a fourth geographic region 905d, and a fifth geographic region 905e indicate regions where it is cost-effective to implement a core-based non-routed ground segment network 220. As illustrated, each non-autonomous gateway 215 is either directly or indirectly in communication with at least one core node 265 (e.g., typically two core nodes 265). Other components may also be included in the non-routed ground segment network 220. For example, additional switches 910, optical cross-connects 920, etc. may be used. Further, while the non-routed ground segment network 220 is configured to provide point-to-point layer-2 connectivity, other types of connectivity may also be implemented between certain nodes. For example, one or more VPLS networks may be implemented to connect certain nodes of the non-routed ground segment network 220.

In various embodiments, core nodes 265 may be located on a new or existing fiber run, for example, between metropolitan areas. In some configurations, the core nodes 265 may be located away from the majority of spot beams (e.g., in the middle of the country, where much of the subscriber population lives closer to the outsides of the country). In alternative embodiments, core nodes 265 may be located near the majority of spot means. Such spatial diversity between code nodes and subscriber terminals may, for example, facilitate frequency re-use of between service beams and feeder beams. Similarly, non-autonomous gateways 215 may be located to account for these and/or other considerations.

It is worth noting that, in the non-routed ground segment network 220, twelve gateways (e.g., including both non-autonomous gateways 215 and autonomous gateways 815) are illustrated. If all were implemented as autonomous gateways 815, the topology may require twelve gateway modules, routers, switches, and other hardware components. Further, various licensing and/or support services may have to be purchased for each of the autonomous gateways 815. In some cases, licensing requirements may dictate a minimum purchase of ten thousand licenses for each gateway module, which may require an initial investment into 120-thousand licenses from the first day of operation.

Using aggregated functionality in one or more core nodes 265, however, may minimize some of these issues. For example, the non-routed ground segment network 220 includes four core nodes 265, each having a gateway module, and only three of the twelve gateways are autonomous gateways 815. As such, only seven gateway modules may be operating on the non-routed ground segment network 220. As such, only seven instances of each core networking component may be needed, only seven licenses may be needed, etc. This may allow for a softer ramp-up and other features.

It will be appreciated that there are many types of functionality that may be supported and/or enabled by facilitating persistent layer-2 connectivity throughout the non-routed ground segment network 220. One set of functionality includes the provision of layer-2 extension services, through which one or more services may be applied to traffic across the non-routed ground segment network 220, for example, by associating the service with a particular virtual tagging tuple 375. As discussed above with reference to FIG. 3, virtual tagging tuples 375 may be used effectively to designate certain types of traffic in a way that persists across the non-routed ground segment network 220.

Figure 10:
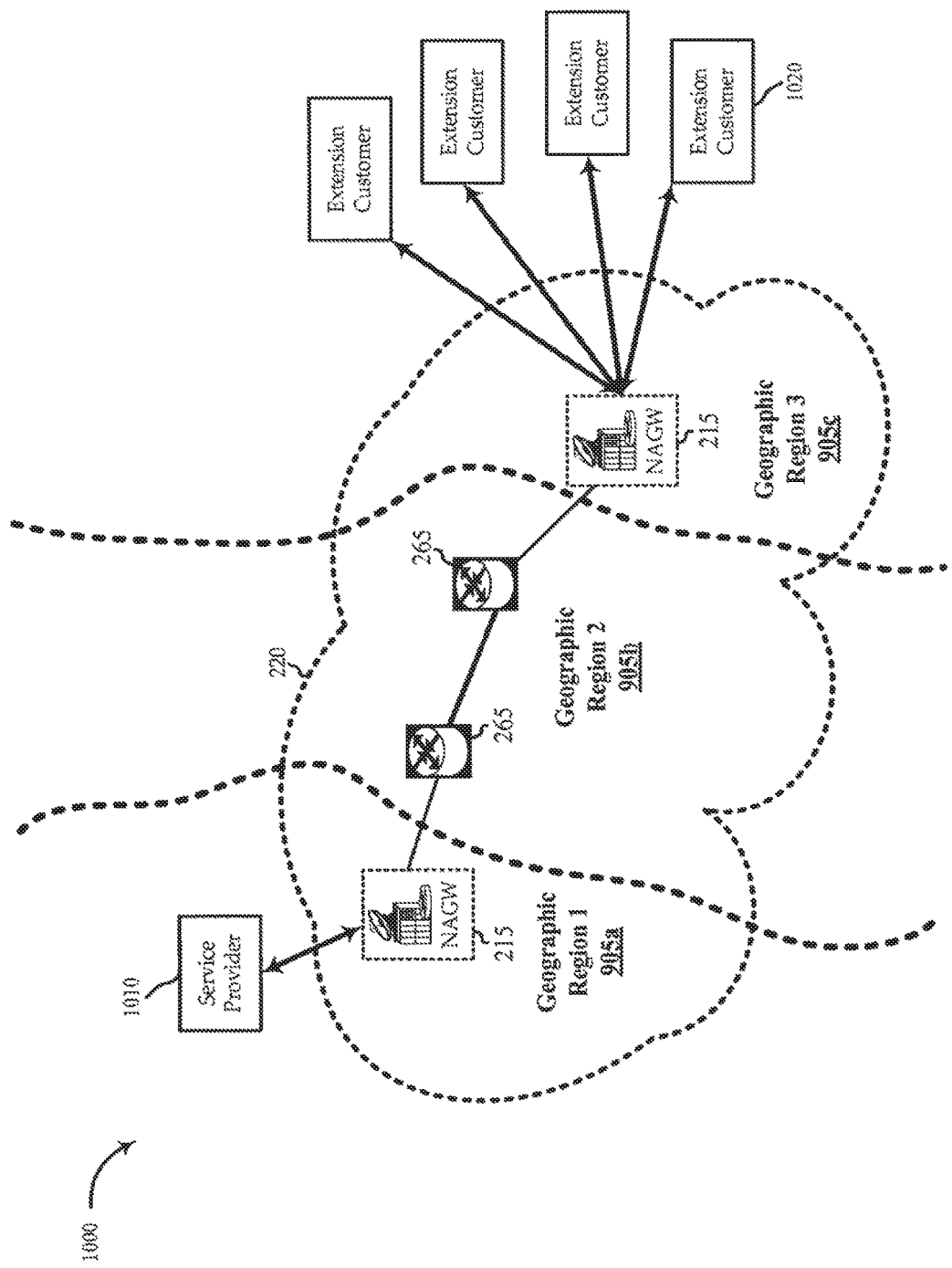
FIG. 10 shows an embodiment of a portion of a communications system configured to facilitate layer-2 extension services, according to various embodiments.

FIG. 10 shows an embodiment of a portion of a communications system 1000 configured to facilitate layer-2 extension services, according to various embodiments. The communications system 1000 may be a portion of the communications system 900 of FIG. 9. As illustrated, a service provider 1010 interfaces with (e.g., establishes layer-2 connectivity with) a non-autonomous gateway 215 in a first geographic region 905a. The service provider 1010 is assigned, or otherwise associated with, at least one virtual tagging tuple 375 (e.g., or at least one element of a virtual tagging tuple 375).

It will be appreciated from the preceding description that, by virtue of plugging into a single non-autonomous gateway 215, embodiments of the non-routed ground segment network 220 can provide layer-2 connectivity between the service provider 1010 and any other node of the non-routed ground segment network 220. Further, by being associated with at least a portion of a virtual tagging tuple 375, the service provider 1010 can extend its service offerings to customers 1020 serviced by any node of the non-routed ground segment network 220 without having to build out a layer-2 infrastructure in other locations. For example, by plugging into the non-autonomous gateway 215 in the first geographic region 905a, the service provider 1010 may be able to service customers 1020 in a substantially remote third geographic region 905c. As such, customers 1020 may experience a service offering from the service provider 1010 substantially as if the customers were connected with the service provider 1010 via a local subnet.

While the service provider 1010 is shown interfacing with the non-routed ground segment network 220 at a non-autonomous gateway 215, the service provider 1010 may alternatively interface with the non-routed ground segment network 220 at any other node where the layer-2 connectivity is accessible. For example, if a service provider 1010 already has an infrastructure built out close to a core node 265 in Arizona, the service provider 1010 can connect to that core node 265 to service customers 1020 via a non-autonomous gateway 215 in New York, even with no layer-2 infrastructure in New York.

For example, say an enterprise customer purchases the identifier "205" for use as the first element of a virtual tagging tuple 375. In one embodiment, all enterprise traffic is designated at layer 2 by a tuple of the form "(205, XXX)," where "XXX" indicates a location. For example, data tagged anywhere in the non-routed ground segment network 220 as "(205,100)" is associated with the enterprise customer and a non-autonomous gateway 215 at location "100" (e.g., Kansas), while data tagged anywhere in the non-routed ground segment network 220 as "(205,128)" is associated with the enterprise customer and a non-autonomous gateway 215 at location "128" (e.g., New Mexico).

In another embodiment, a DSL service provider 1010 in Colorado desires to provide DSL services to customers 1020 in New York, where it has no layer-2 infrastructure. The DSL service provider 1010 is assigned a particular tuple designation. The DSL service provider 1010 then plugs into the non-routed ground segment network 220 at a node in Denver. All DSL traffic from that provider, all over the non-routed ground segment network 220, is tagged with the assigned virtual tuple designation. As such, DSL customers 1020 in New York may substantially immediately be provided with DSL services that appear to the customers to be "local."

In still another embodiment, all traffic for an Internet service provider 1010 is designated at layer 2 by a tuple of the form "(205, XXX, YYY)," where "XXX" indicates a location and "YYY" designates a service offering. For example, data tagged anywhere in the non-routed ground segment network 220 as "(205, 100, 5D2)" is associated with the Internet service provider 1010, a non-autonomous gateway 215 at location "100" (e.g., Kansas), and a certain type of traffic shaping designated by "5D2"; while data tagged anywhere in the non-routed ground segment network 220 as "(205, 100, 083)" is associated with the Internet service provider 1010, the non-autonomous gateway 215 at location "100," and a VPLS network. Of course, any other type of particular service offering may be designated (e.g., (e.g., multicasting, VPN, MPLS, VLAN, enterprise caching, etc.). In other embodiments, the virtual tagging tuples 375 may have other numbers of elements, other types of designations may be used, single elements may designate multiple locations or services, etc.

Figure 11:
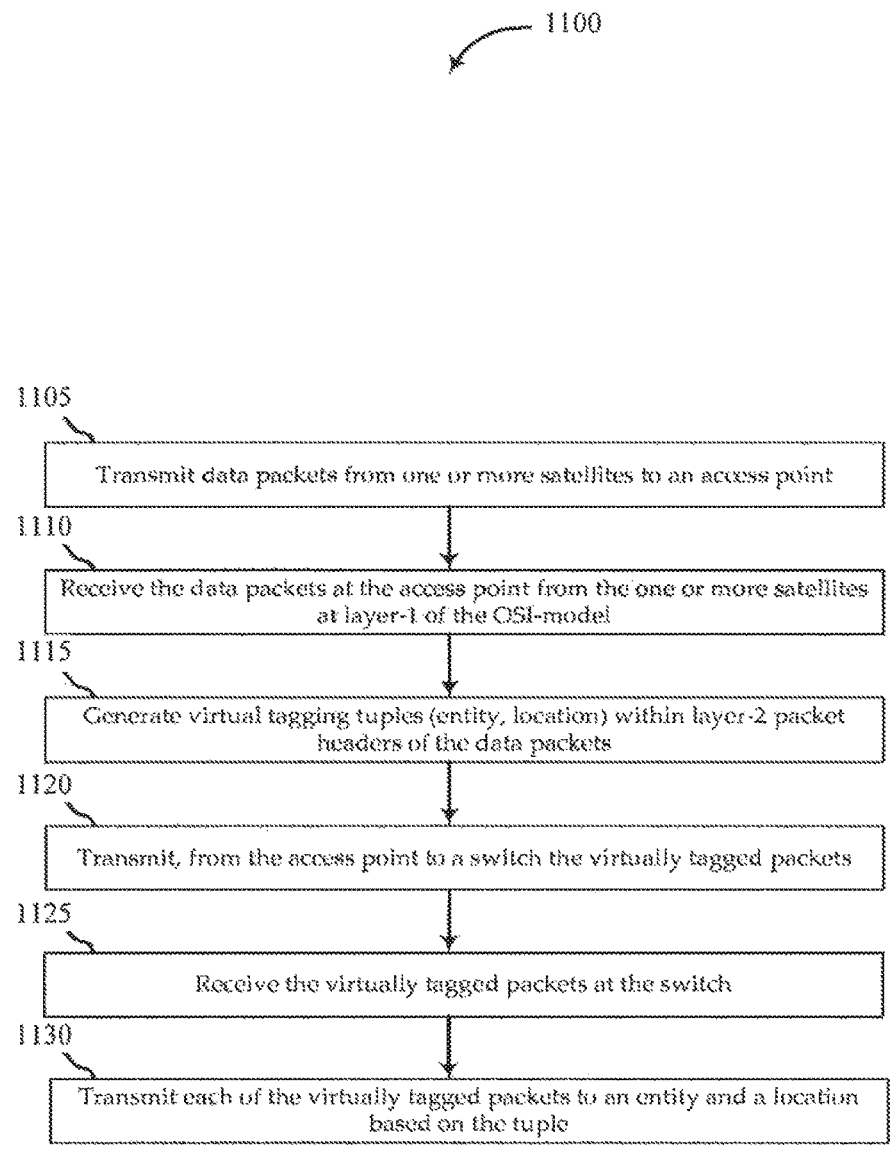
FIG. 11 shows an illustrative flow diagram of a method of implementing layer-2 connectivity within a satellite ground segment backhaul network, according to various embodiments.

FIG. 11 shows an illustrative flow diagram of a method 1100 of implementing layer-2 connectivity within a satellite ground segment backhaul network. At process block 1105, data packets from one or more satellites may be transmitted to an access point. In one embodiment, an access point may be a base station, a gateway, a combination of base stations, etc.

At process block 1110, the data packets may be received at the access node from the one or more satellites at layer-1 of the OSI-model. Accordingly, at process block 1115, virtual tagging tuples within the layer-2 headers of the data packets may be generated. In one embodiment, the tuples may, at least, include an entity and a location designation. At process block 1120, the tagged packets may then be transmitted from the access point to switches and other destinations within the backhaul network.

For example, if a virtually tagged packet is received at a switch (process block 1125), then the switch may transmit each of the virtually tagged packets to an entity and location based on the tuple information (process block 1130). Accordingly, the virtually tagged packets are able to be transmitted across the backhaul network at layer-2, thus providing significant benefits to the backhaul network.

Figure 12:
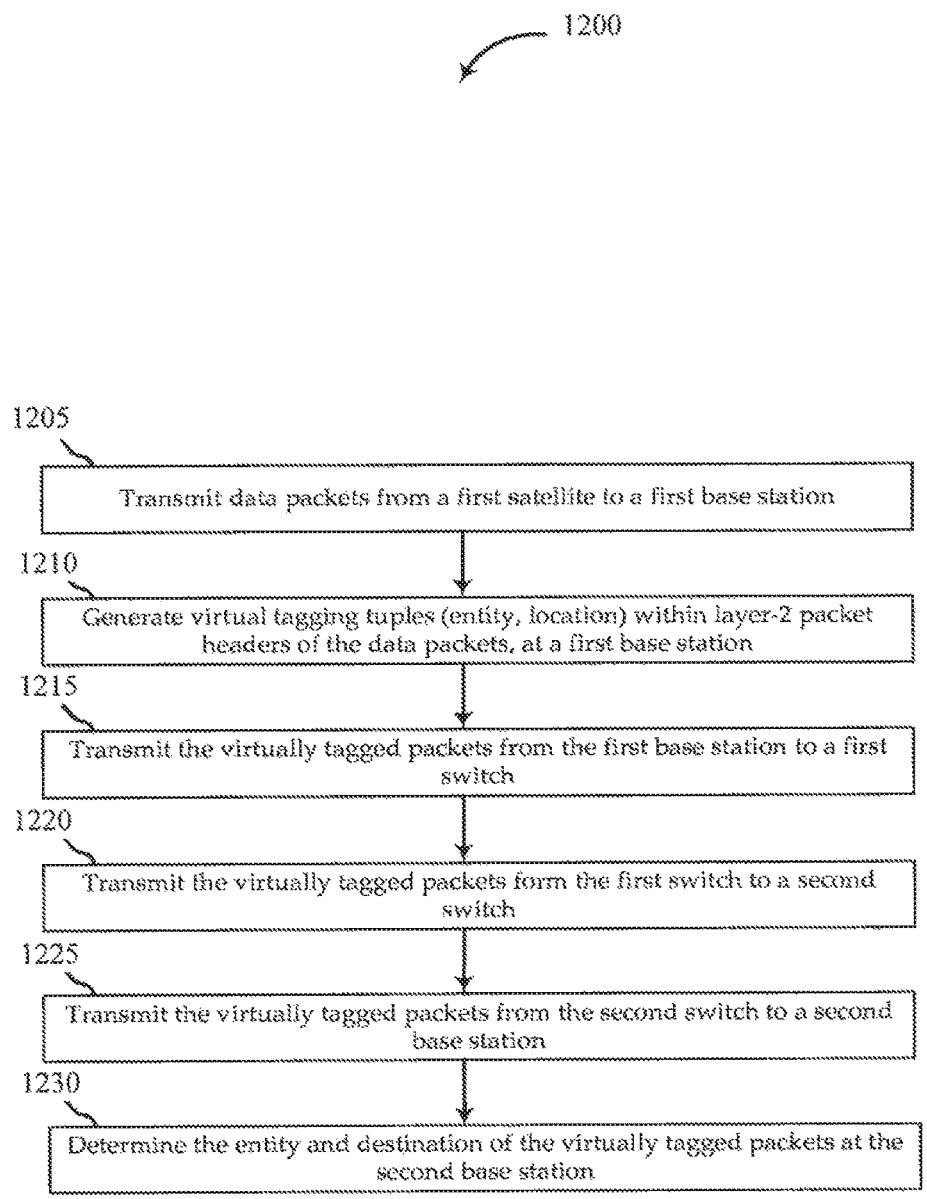
FIG. 12 shows an illustrative flow diagram of a method for implementing access node/gateway to access node/gateway layer-2 connectivity within a backhaul ground segment network connected to one or more satellites, according to various embodiments.

FIG. 12 shows an illustrative flow diagram of a method 1200 of implementing access node/gateway to access node/gateway layer-2 connectivity within a backhaul ground segment network connected to one or more satellites. At process block 1205, data packets may be transmitted form a first satellite to a first base station. The first base station may then generate virtual tagging tuples to include in the layer-2 header (process block 1210).

Furthermore, the first base station then transmits the virtually tagged packets to a first switch (process block 1215), and the first switch transmits the packets to a second switch (process block 1220). Then, at process block 1225, the second switch transmits the packets to a second base station which determines, based on the virtual tagging tuple, the entity and destination of the packets (process block 1230).

Figure 13:
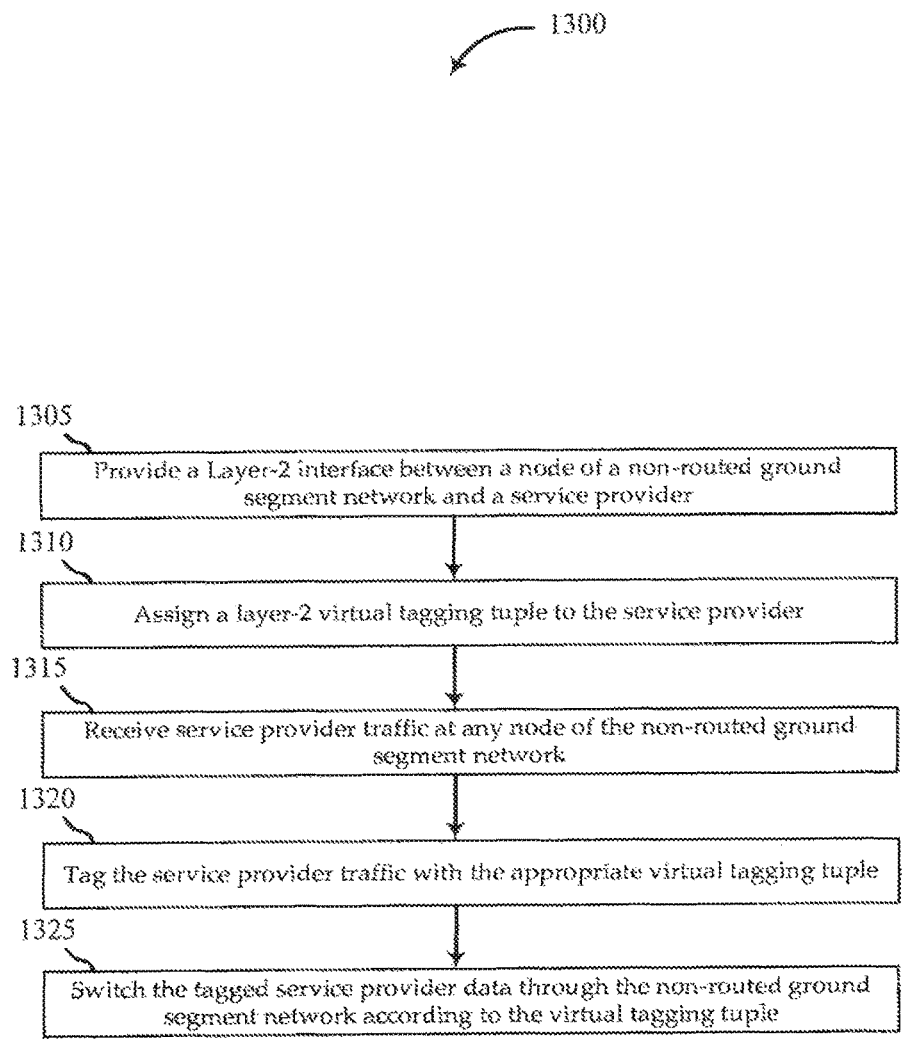
FIG. 13 shows a flow diagram of a method for providing layer-2 extension services across a non-routed ground segment network, according to various embodiments.

FIG. 13 shows a flow diagram of a method 1300 for providing layer-2 extension services across a non-routed ground segment network, according to various embodiments. The method 1300 begins at block 1305 by providing a Layer-2 interface between a node of a non-routed ground segment network and a service provider. At block 1310, a layer-2 virtual tagging tuple is assigned to the service provider. Service provider traffic is received at any node of the non-routed ground segment network at block 1315. At block 1320, the service provider traffic is tagged with the appropriate virtual tagging tuple. The tagged service provider data is then switched, at block 1325, through the non-routed ground segment network according to the virtual tagging tuple.

Aspects of the invention include providing mobility among multiple satellite beams. Particularly, a mobile device (or client) is able to move among satellite and maintain the same consistent IP address. Furthermore, the mobile device is able to remain within the same network (i.e., LAN, subnet, etc.) while moving through coverage of multiple satellite beams. Aspects of the invention are realized, in part, due to end-to-end layer-2 connectivity throughout the ground segment network.

Figure 14:
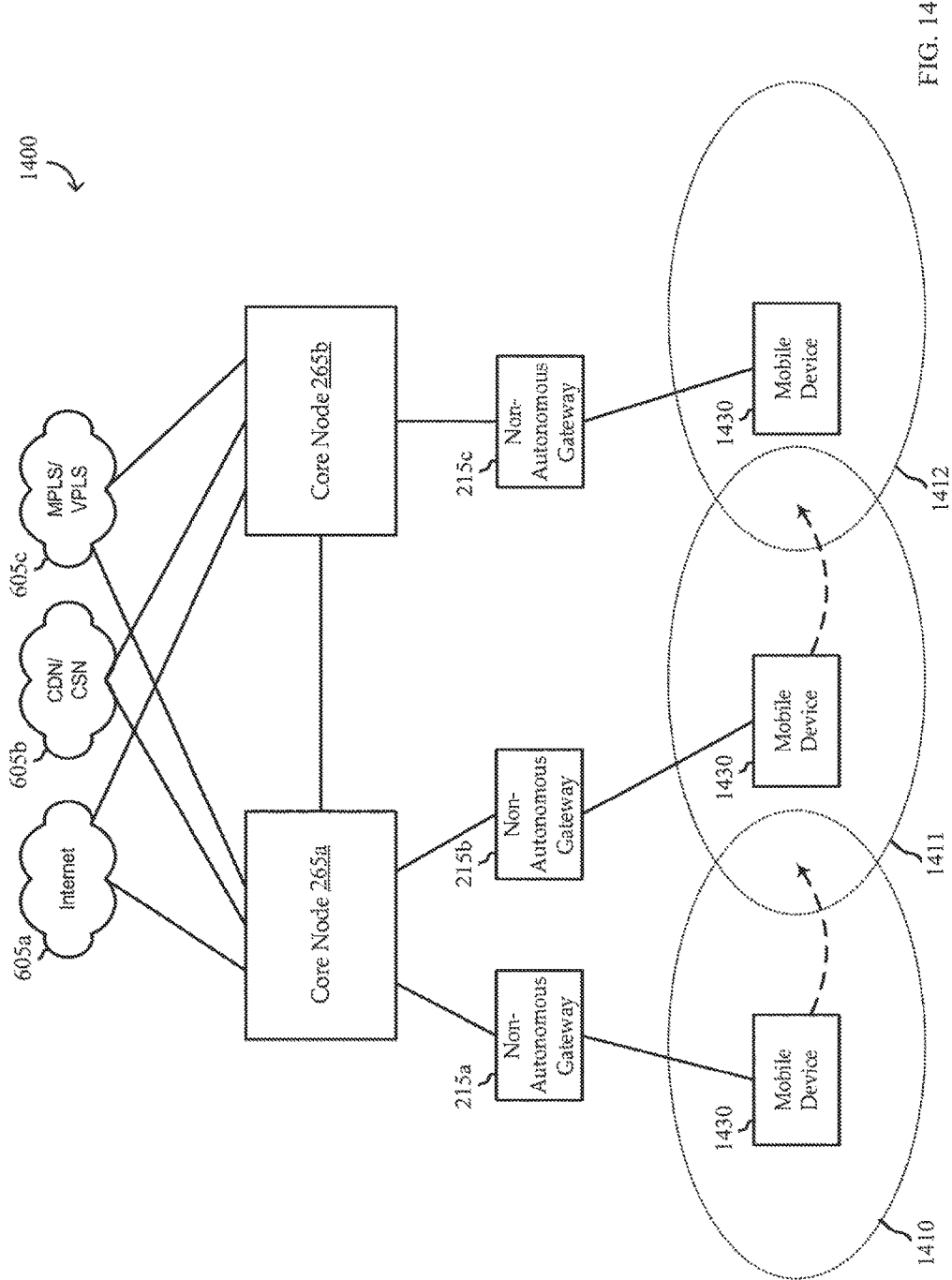
FIG. 14 shows a block diagram of a system for implementing mobility across satellite spot beams, according to various embodiments.

FIG. 14 shows a block diagram of a system 1400 for implementing mobility across satellite spot beams, according to various embodiments of the invention. In one embodiment, system 1400 may include core nodes 265*a* and 265*b* in communication with the Internet 605*a*, CND/CSN 605*b* and MPLS/VPLS networks 605*c*. Core nodes 265*a* and 265*b* are in communication together at layer-2 of the OSI model. Furthermore, core node 265*a* is in communication, at layer-2, with non-autonomous gateway 215*a* and non-autonomous gateway 215*b*, and core node 265*b* is in communication, at layer-2, with non-autonomous gateway 215*c*.

In a further embodiment, each of non-autonomous gateways 215*a-c* service spot beams at locations 1410, 1411, and 1412, respectively. Mobile device 1430 is in communication with non-autonomous gateway 215*a* at location 1410. In one embodiment, mobile device 1430, upon connecting through a spot beam to non-autonomous gateway 215*a* is assigned an IP address, and the IP address is associated with a local area network (LAN). Mobile device 1430 executes a number of applications (e.g., an internet browser, and email client, etc.), enterprise applications (VPN, exchange, etc.), etc. While the applications are being executed on mobile device 1430, application sessions are established, and reliance on the assigned IP address is necessary by these applications. Further, in the event that connectivity is lost by the mobile device 1430, or mobile device 1430's IP address is changed, then application connectivity and the session would be lost.

Assuming now that mobile device 1430 is travelling in an airplane (in an automobile, on a train, on a ship, etc), and mobile device 1430 has established a VPN session (or other application). As the airplane travels from location 1410 to location 1411, the spot beam servicing mobile device 1430 changes, and accordingly the non-autonomous gateway servicing the spot beam changes from non-autonomous gateway 215*a* to non-autonomous gateway 215*b*. As such, in order to maintain the same IP address, connectivity, the VPN session (in this example), etc., then a handoff of the IP address for mobile device 1430 occurs.

In one embodiment, the overlap of spot beam coverage at location 1410 and 1411 is detected and the eminent transition of mobile device 1430, and as such from coverage under the first spot beam and the second spot beam is detected. Once the eminent transition is detected and identified, non-autonomous gateway 215*a* sends a "handoff" message to core node 265*a*, and then from core node 265*a* to non-autonomous gateway 215*b*. Each hop is at layer-2 of the OSI model and the messages are at layer-3 and above, which allows the layer-3 protocol to be IP, DECNet, AppleTalk, or the like. As such, each of non-autonomous gateway 215*a*, core node 265*a*, and non-autonomous gateway 215*b* are able to be on the same network (i.e., same subnet, same LAN, etc.).

Accordingly, as mobile device 1430 move to location 1411, non-autonomous gateway 215*b* is transitioned to maintaining connectivity for mobile device 1430. Thus, connectivity is maintained, the same IP address is maintained, and so forth. In a further embodiment, even if mobile device 1430 continues to travel to location 1412, which is covered by a spot beam serviced by non-autonomous gateway 215*c*. Connectivity of mobile device 1430 is still maintained. Non-autonomous gateway 215*c* is in communication with core node 265*b*, thus IP address and connectivity of mobile device is still able to be maintained.

In this situation, once it is determined that mobile device 1430 is going to transition from the spot beam servicing location 1411 to the spot beam servicing location 1412, non-autonomous gateway 215*b* sends a notification to non-autonomous gateway 215*c*. The notification is sent at layer-3 (whereas the user traffic is sent at layer-2) from non-autonomous gateway 215*b* to core node 265*a*, core node 265*a* to core node 265*b*, and then from core node 265*b* to non-autonomous gateway 215*c*. Again, at no time during the handoff is connectivity to mobile device 1430 lost, or is the IP address of mobile device 1430 changed. Thus, system 1400 is configured to provide end-to-end continual connectivity, IP address, and session persistence across spot beams in a satellite network.

Figure 15:
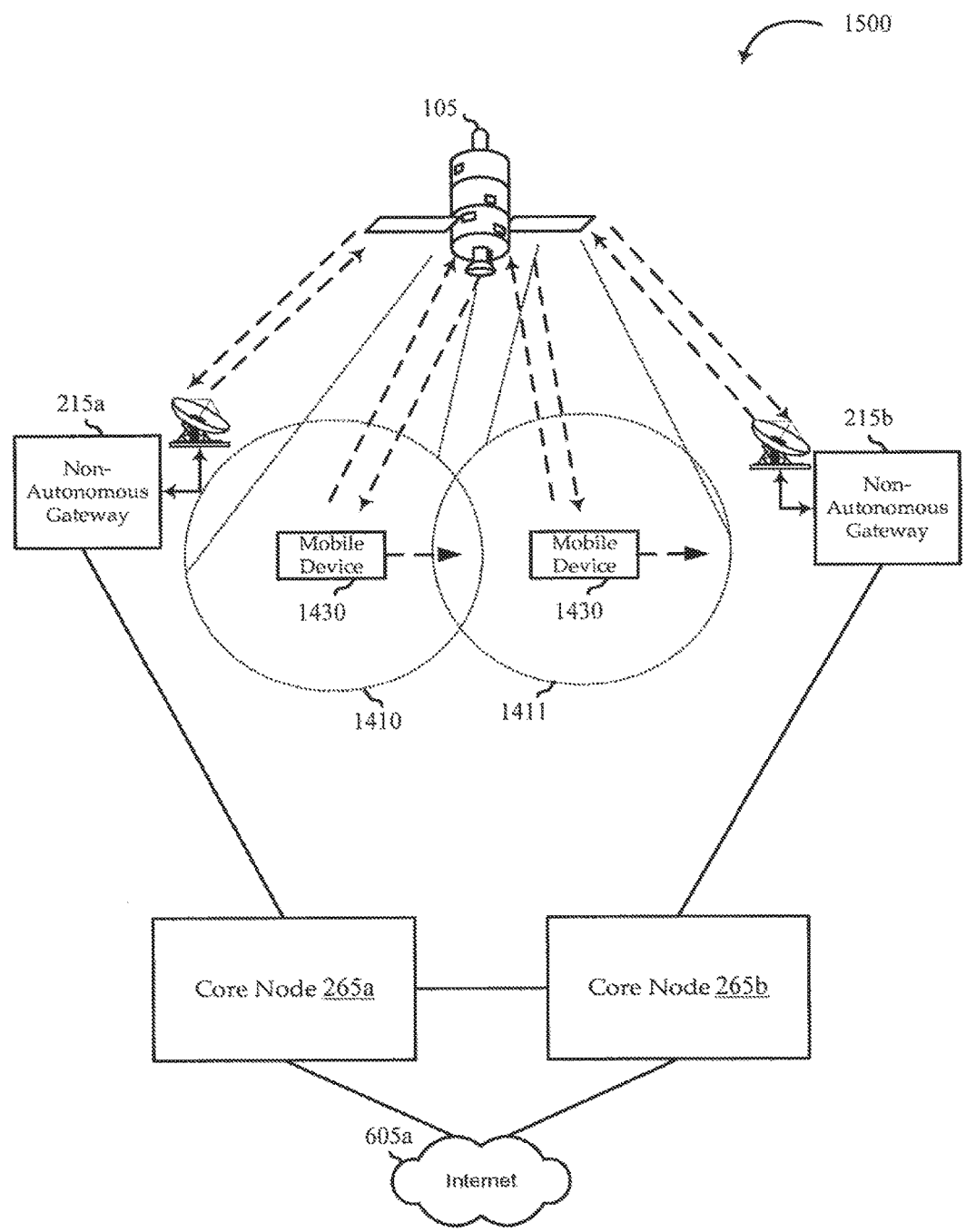
FIG. 15 illustrates a system for providing mobility access across satellite spot beams, according to various embodiments.

Turning now to FIG. 15, which illustrates a system 1500 for providing mobility access across satellite spot beams, according to one embodiment of the present invention. In one embodiment, system 1500 includes a mobile device 1430 in communication with satellite 105. Mobile device 1430 is moving, for example, from west to east; however, it should be noted that mobile device 1430 could be moving in any direction. In one embodiment, mobile device 1430 is a Smartphone, a PDA, a laptop computer, a mobile computer, a cellular telephone, etc. Furthermore, mobile device 1430 may be travelling on a train, a plane, and automobile, etc.

Satellite 105 provides mobile device 1430 with network connectivity at a first location through a first spot beam 1410. Satellite 105 is further configured to provide mobile device 1430 with network connectivity at a second location through spot beam 1411. Accordingly, as mobile device 1430 moves from location to location, satellite 105 is able to provide mobile device 1430 with network connectivity at satellite 105's various spot beams. It should be noted that while only two spot beams are shown, but many more spot beams and many more locations may be present, but for explanatory purposes and ease of understanding, only two spot beams have be shown in FIG. 15.

Once mobile device 1430 has established connectivity with satellite 105, mobile device 1430 receives session and/or IP information. For example, mobile device 1430 is granted a IP address, which is likely a subnet address. In a typical system, when mobile device 1430 moves from the coverage of spot beam 1410 to spot beam 1411, such session information would be lost, and a new session (or a new IP address) would be established at spot beam 1411. Thus, mobile device 1430 would lose connectivity, change IP addresses, and would no longer be on the same network (i.e., subnet, LAN, etc.) while the "handoff" from spot beam 1410 to spot beam 1411 occurs.

According to one embodiment of the present invention, such a loss of connectivity as well as IP address and session information is avoided using the layer-2 connectivity between non-autonomous gateway 215*a*, non-autonomous gateway 215*b*, core node 265*a* and core node 265*b*. In one embodiment, mobile device 1430 is travelling, for example, in a train from New York to San Francisco. For simplicity's sake, only two spot beams have been shown, but in reality there would likely be many more spot beams between San Francisco and New York. As mobile device 1430 travels from the first location to the second location it become necessary for a handoff to occur from spot beam 1410 to spot beam 1411.

At that point, session and IP information stored at non-autonomous gateway 215a is transmitted to core node 265a and then from core node 265a to core node 265b. Then, the session and IP information is transmitted from core node 265b to non-autonomous gateway 215b. Furthermore, the connectivity the entire way from non-autonomous gateway 215a to non-autonomous gateway 215b is at layer-2 of the OSI model. As such, mobile device 1430 is able to move from the first location to the second location without any change in connectivity. The handoff is completely transparent to mobile device 1430. Mobile device 1430's IP address remains the same, no break in connectivity occurs, application sessions are maintained, etc.

Furthermore, satellite 105 establishes a connection with mobile device 1430 at the second location using spot beam 1410, the session information from mobile device 1430's session through spot beam 1411 is maintained for the connection at the second location with spot beam 1411. Accordingly, mobile device 1430 is unaware that any handoff has occurred, and all session connectivity and information is maintained.

Figure 16:
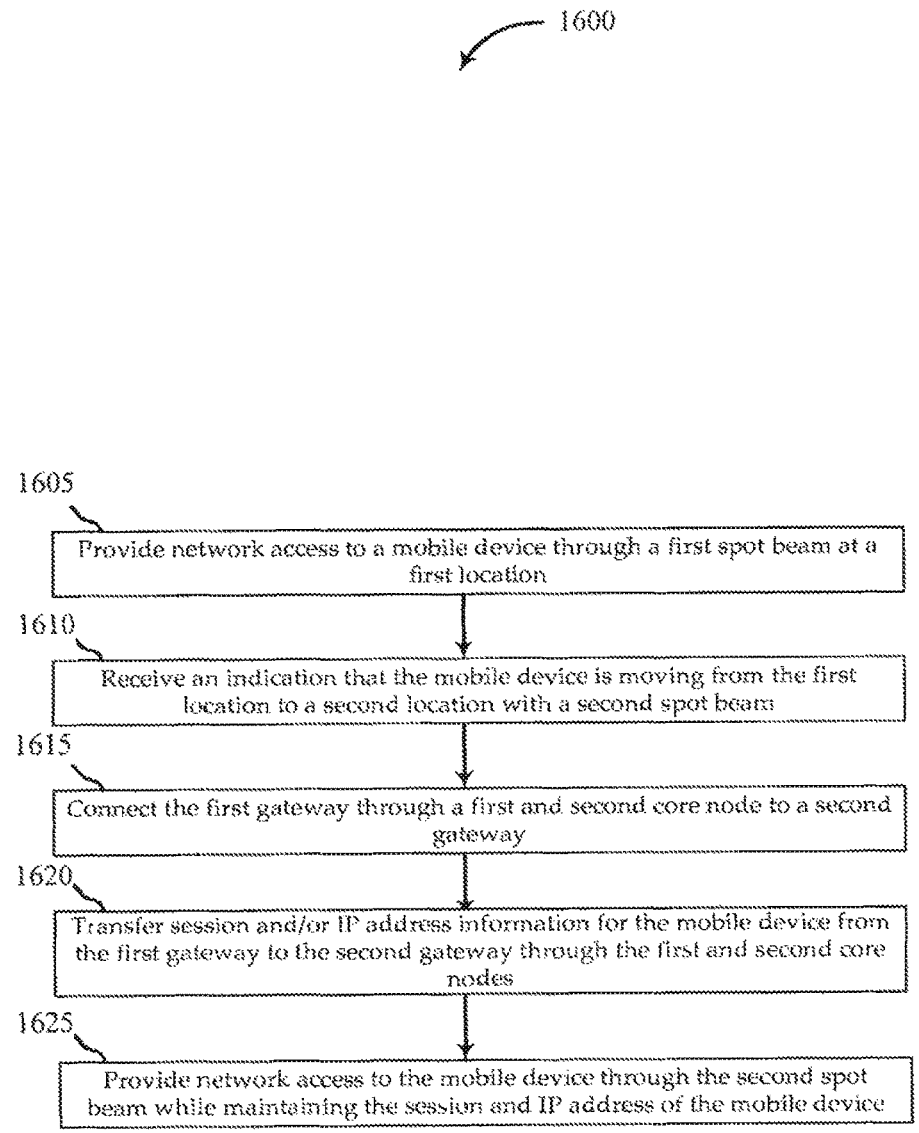
FIG. 16 illustrates a method of providing mobility access across satellite spot beams, according to various embodiments.

Referring now to FIG. 16, which illustrates a method 1600 of providing mobility access across satellite spot beams, according to one embodiment of the present invention. At process block 1605, network access to a mobile device through a first spot beam at a first location is provided. The satellite is further in communication with at least a first and second gateway, which are in turn in communication with at least a first and second core node.

At process block 1610, an indication is received that the mobile device is moving from the first location to a second location, where the second location is serviced with a second spot beam. Accordingly, at process block 1615, the first gateway connects with a second gateway at a layer-2 through the first and second core nodes. Due to the fact that the connectivity from the first gateway to the first core node, the first core node to the second core node, and then the second core node to the second gateway is at layer-2, and the mobile device is able to maintain the same IP address through the handoff and any application and/or session information (process block 1620).

Thus, at process block 1625, the mobile device at the second location through the second spot beam established access to the network with the same IP and/or session of the mobile device while at the first location connected to the first spot beam. Hence, no connectivity break, no loss of session, no loss IP information, etc. occurs.

Aspects of the invention relate to having one gateway which services two or more satellites. A further embodiment includes multiple satellites being serviced by multiple gateways which are in communication with core nodes within a non-routed ground segment network. Furthermore, an alternative embodiment includes multiple satellites services by multiple gateways which are in communication with multiple core nodes.

Figure 17:
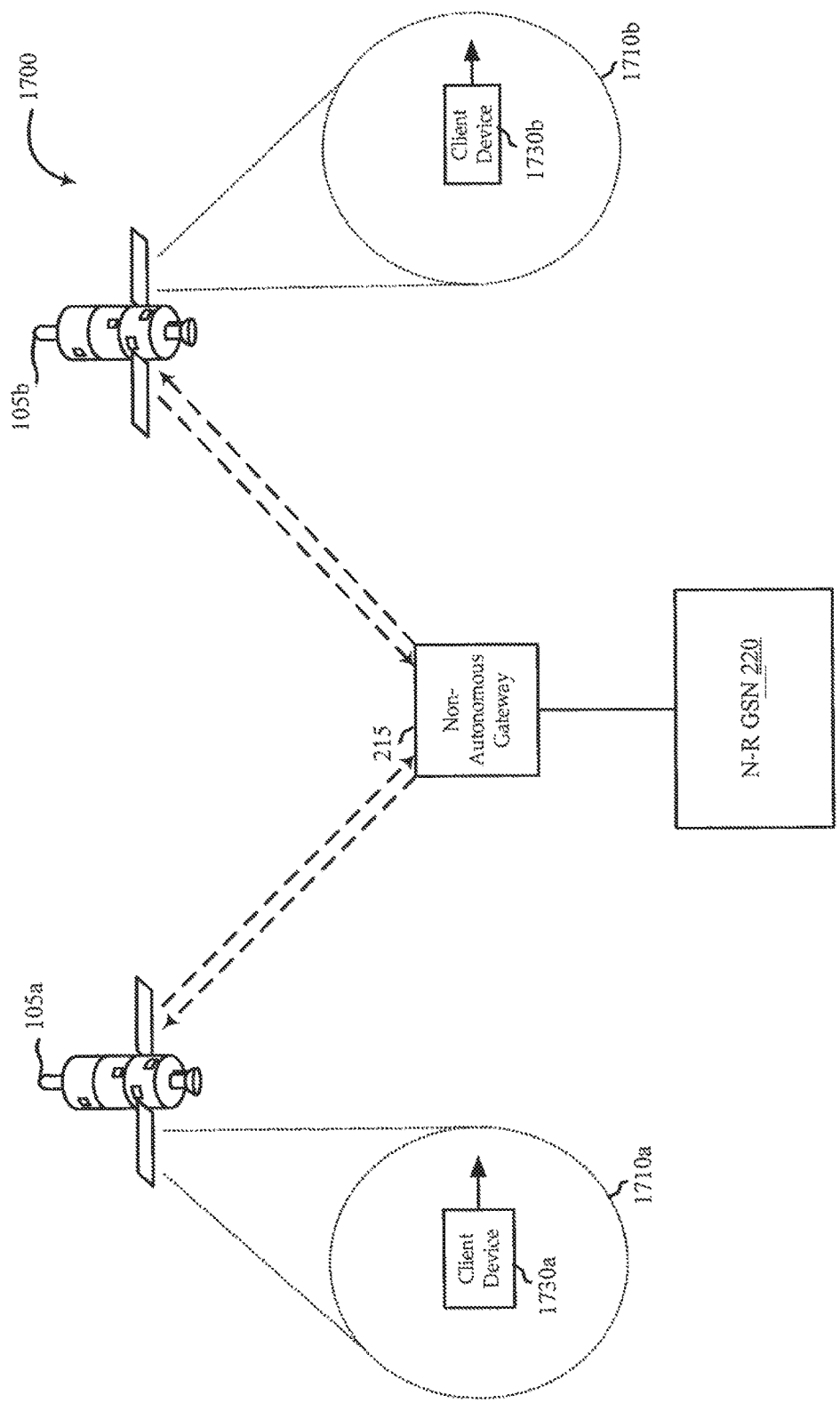
FIG. 17 illustrates a network for implementing layer-2 connectivity for multiple satellites with a single gateway, according to various embodiments.

Turning now to FIG. 17, which illustrates a network 1700 for implementing layer-2 connectivity for multiple satellites with a single gateway, according to various embodiments of the invention. In one embodiment, network 1700 may include a core non-routed ground segment network 220 in communication with a non-autonomous gateway 215. Network 1700 may further include a satellite 105a and 105b each providing a spot beam 1710a and 1710b, respectively.

Client device 1730a may be serviced by spot beam 1710a and client device 1730b may be serviced by spot beam 1710b.

Furthermore, non-autonomous gateway 215 may be in communication with both satellites 105a and 105b. In one embodiment, non-autonomous gateway 215 may include one antenna (or other suitable transmission device) configured to send and receive transmissions to and from satellite 105a and another antenna configured to send and receive transmissions to and from satellite 105b. It should be noted that additional antennas may be included at non-autonomous gateway 215 in order to service any number of satellites. With such a configuration client device 1730a and client device 1730b are able to exist on the same private network (i.e., the same subnet, the same LAN, etc.).

This is, in part, due to the fact that services offered to client device 1730a and client device 1730b are able to be provided through the same non-autonomous gateway 215 and non-routed ground segment network 220, at layer-2. For example, DHCP service provided by network 220 to client device 1730a passes through essentially the same network path as service to client device 1730b. The only difference is the base station within the SMTS servicing client device 1730a would be different from the base station servicing client device 1730b, and the satellites servicing each client device would also be different. However, since communications at each of the points within the network are at layer-1 (i.e., at the satellites) or layer-2 (i.e., at the getaways and core nodes), client devices 1730a and 1730b are able to be on the same private network, even though client device 1730a may be in Boston and client device 1730b may be San Francisco.

Furthermore, if client device 1730a travels to the coverage of spot beam 1710b, client device 1730a is still able to maintain the same IP address, network session, connectivity, etc. Thus, such a network configuration as in network 1700 provides transparent and seamless satellite mobility for client devices accessing network 1700.

In a further embodiment, satellite 105a may be a first type of satellite and satellite 105b may be a second type. For example, the first type may be a KA-band satellite, and the second type may be a KU-band satellite. However, other types of satellites may be used.

Figure 18:
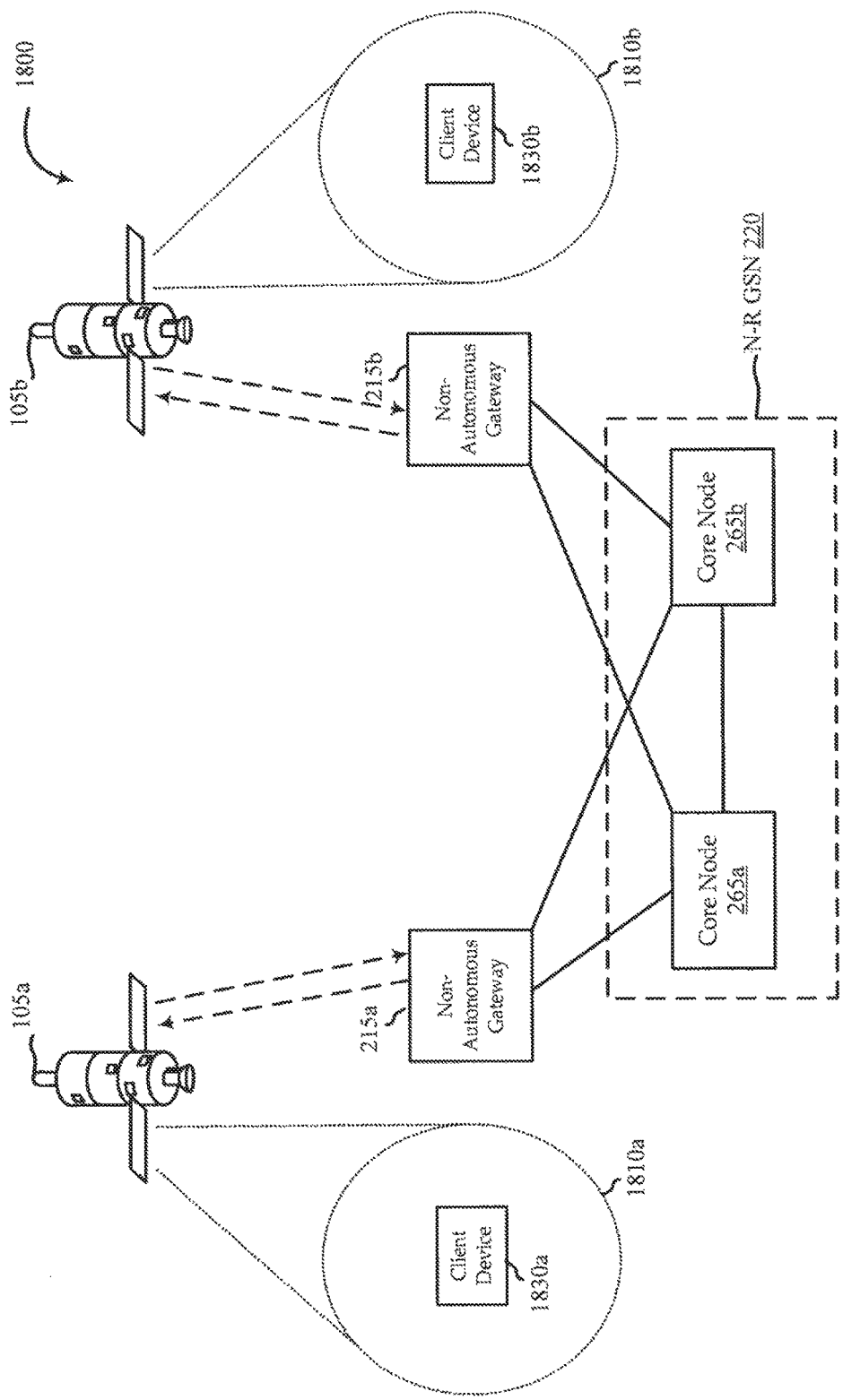
FIG. 18 illustrates a network for implementing layer-2 connectivity for multiple satellites with multiple gateways, according to various embodiments.

Referring next to FIG. 18, which illustrates a network 1800 for implementing layer-2 connectivity for multiple satellites with multiple gateways, according to various embodiments of the invention. In one embodiment, network 1800 may include satellites 105a and 105b providing service to a client device 1830a through a spot beam 1810a and a client device 1830b through spot beam 1810b, respectively. Network 1800 may further include a non-autonomous gateway 215a and a non-autonomous gateway 215b in communication with a non-routed ground segment network 220 through core nodes 265a and 265b, respectively.

According to the configuration of network 1800, client devices 1830a and 1830b are able to be connected to the same private network. In other words, client device 1830a and client device 1830b are able to be assigned IP addresses on the same subnet or LAN. Accordingly, if client device 1830a travels from spot beam 1810a to spot beam 1810b, client device 1830a is able to keep the same IP address, and the switch between spot beams (i.e., the switch between satellites 105a and 105b) is transparent and seamless to client device 1830a. As such, multiple satellites may be interconnected using the same private network, thus expanding satellite coverage and service beyond an individual provider. Additionally, worldwide coverage for customers may also be achieved.

Furthermore, redundancy among core nodes 265*a* and 265*b* also provides satellites 105*a* and 105*b* with redundancy. For example, since core node 265*b* services satellite 105*b*, if core node 265*b* was to fail, all of the service to satellite 105*b*'s customers would also fail. However, since core nodes 265*a* and 265*b* are connected at layer-2 and are configured to provide fail-over redundancy and resource sharing, even if core node 265*b* fails, core node 265*a* is able to maintain service for satellite 105*b*'s customers.

Figure 19:
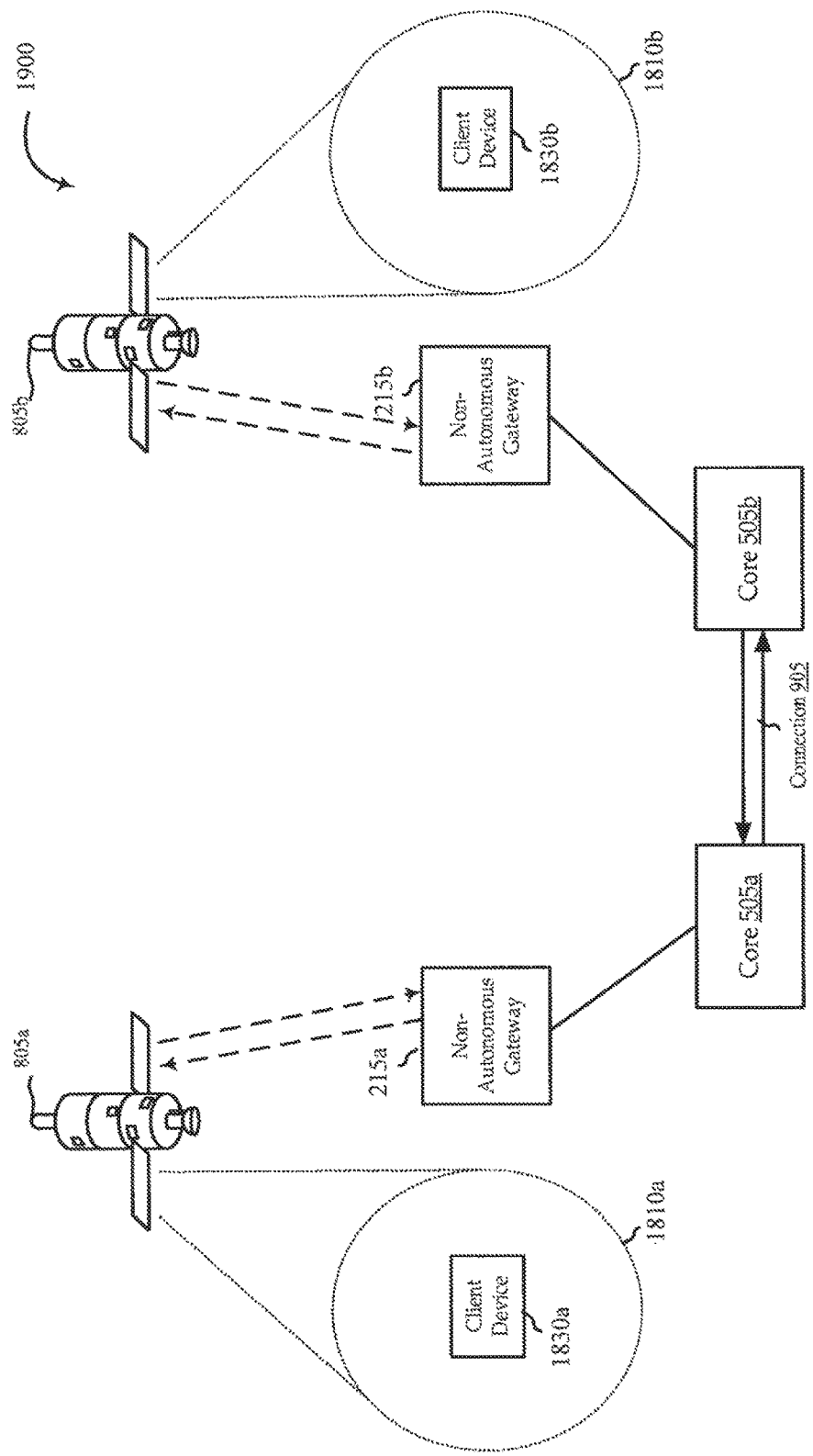
FIG. 19 illustrates a network for implementing layer-2 connectivity for multiple satellites with multiple gateways and multiple cores, according to various embodiments.

Turning now to FIG. 19, which illustrates a network 1900 for implementing layer-2 connectivity for multiple satellites with multiple gateways and multiple cores, according to various embodiments of the invention. In one embodiment, network 1900 may be configured similar to network 1800; however, network 1900 includes two non-routed ground segment networks 220*a* and 220*b* in communication via connection 1905. In one embodiment, connection 1905 may be at layer-3, a VPN, a VPLS, etc. In a further embodiment, networks 220*a* and 220*b* may provide service to separate providers (i.e., two different satellite service providers).

As described above, aspects of the invention include implementing nodes which provide intelligence and functionality (e.g., services, etc). Furthermore, the nodes are interconnected with gateways which provide connectivity to satellites. As such, enterprises, content distribution networks (CDNs), etc. are able to connect to any node or other point in the network (including gateways), and seems like being plugged in to any other node or point in the network.

Figure 20:
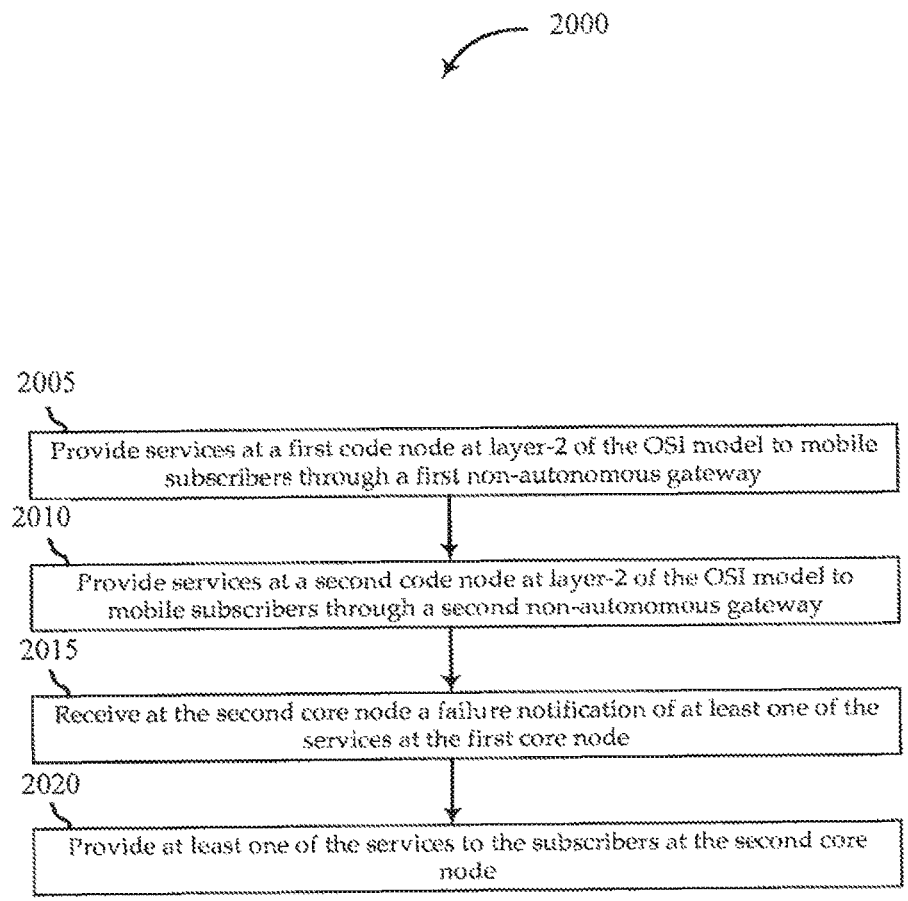
FIG. 20 illustrates a flow diagram describing a method of implementing redundancy among core nodes, according to various embodiments.

FIG. 20 illustrates a flow diagram describing a method 2000 of implementing redundancy among core nodes, in accordance with embodiments of the present invention. At process block 2005, services, at layer-2, are provided to a first set of subscribers by a first core node though a first non-autonomous gateway. At process block 2010, services, at layer-2, are provided to a second set of subscribers by a second core node though a second non-autonomous gateway.

At process block 2015, the second core node receives an indication that a service provided by the first core node has failed, or the core node has completely failed. At process block 2020, in response to the second core node receiving the failure notification, the second core node begins to provide the failed service (or services) to the first set of subscribers. The hand-off is seamless and the first set of customers are able to maintain the same IP address, session, etc. The service (or services) is merely provided by another core node, without the first set of subscribers being aware of the change.

In a further embodiment, even without a failure by one of the core nodes, one or more services may be diverted to another core node based on load at the core node. For example, the first set of subscribers may be using a more resources than the second set of subscribers. As such, the first core node is significantly more burdened than the second core node. One or more services provided to the first set of subscribers may be diverted to the second core node in order to avoid the first core node running out of capacity, or in order to more efficiently utilize the entire capacity of the cores, collectively. The hand-off between core nodes is seamless and unnoticed by the subscribers.

Figure 21:
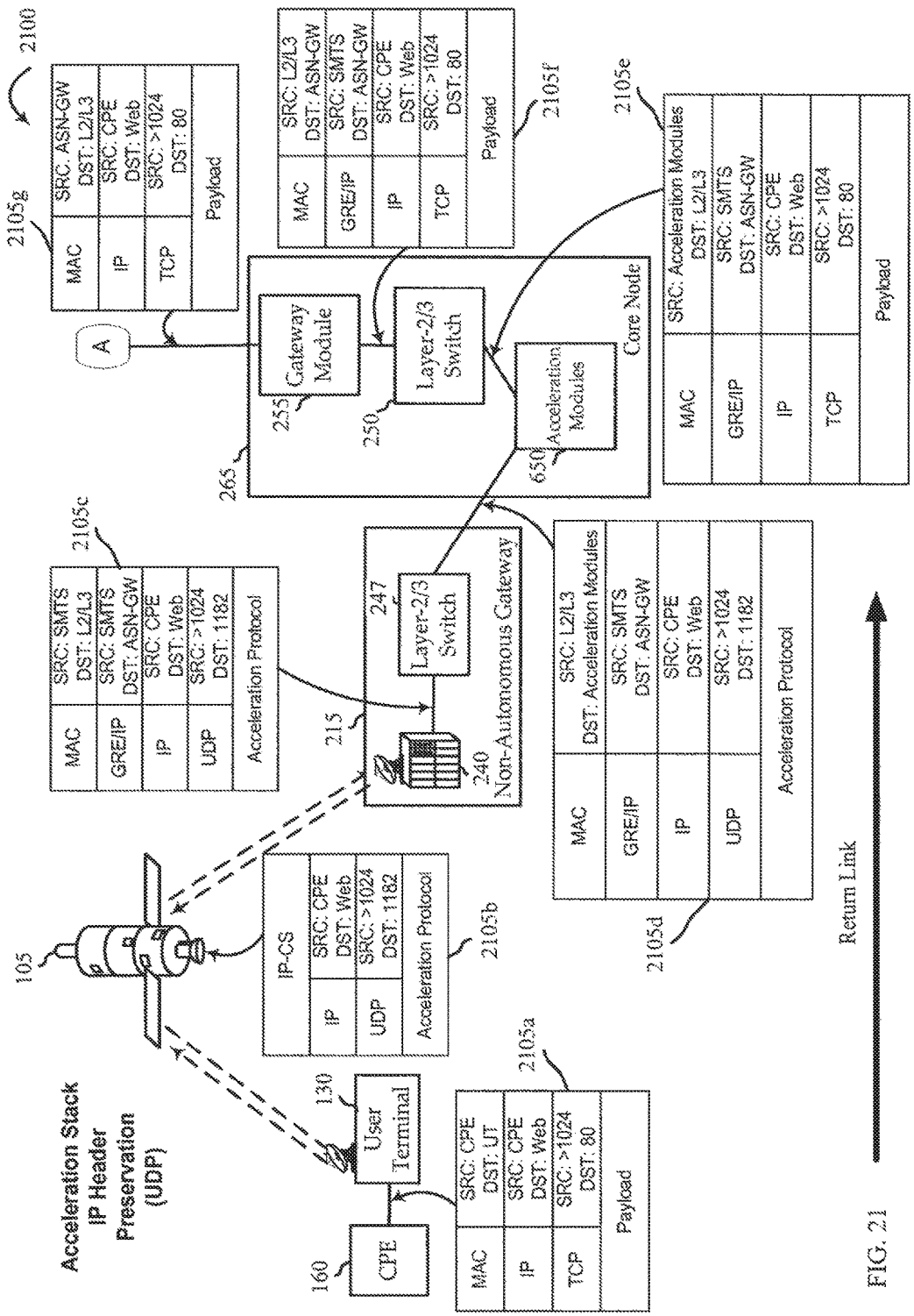
FIG. 21 shows a block diagram of a network for implementing acceleration through a tunnel, according to various embodiments.

FIG. 21 shows a block diagram of a network 2100 for implementing acceleration through a tunnel, according to various embodiments of the invention. In one embodiment, network 2100 may include CPE 160 in communication with user terminal (UT) 130. In one embodiment, CPE 160 may initiate a network request(s) and transmit the request to UT 130. The network request may be a web request (e.g., a browser request for web content, a webpage request, a file request from an FTP server, a streaming video request, etc.). The request may be included as the payload of a packet 2105*a*.

In multiple embodiments, packet 2105*a* may also include a packet header. The packet header may include a MAC header, an IP header, and a TCP header. Each of the MAC, IP, and TCP headers may include a source (SRC) and a destination (DST). In this example, the request is for a website (i.e., XYZ.com) and in packet 2105*a*, the MAC SRC is CPE 160 and MAC DST is UT 130. The IP header SRC is CPE 160 and DST is XYZ.com (i.e., Web). The TCP header SRC and DST indicate port assignments (e.g., port 80 for web traffic, port 21 for FTP traffic, etc.).

Further, packet 2105*a* is transmitted via satellite 105 to SMTS 240 in non-autonomous gateway 215. Prior to transmission, UT 130 changes packet 2105*a* to that of packet 2105*b*. The Internet Protocol Convergence Sublayer (IP-CS) protocol header (or alternatively Ethernet Convergence Sublayer Eth-CS) is used to modify the MAC header and the payload is replaced with an acceleration protocol (e.g., Intelligent Compression Technology (ITC) transport protocol (ITP)). A UDP header may be added to the port designations for the SRC and DST. Such a protocol is configured to allow for acceleration/compression techniques to be performed on the payload of the packet. The details of such compression and acceleration are beyond the scope of this patent. Suffice it to say, a number of various compression algorithms, acceleration techniques, etc. may be used. For example, byte caching, prefetching, multicasting, delta coding, etc. may be used by the acceleration protocol.

As such, because of the compression and other acceleration techniques, the amount/size of data transmitted over satellite 105 and/or between non-autonomous gateway 215 and core node 265, can be greatly reduced.

Conversely, a network provider would be unable to efficiently and effectively service customers if compression and acceleration were not possible over a long delay satellite network. Furthermore, compression allows valuable satellite bandwidth to be freed up, allowing the network operator to either offer more bandwidth to existing customers or add new customers on the network. Accordingly, network 2100 provides a network provider with the ability to compress and accelerate network traffic.

Once packet 2105*b* is received at SMTS 240, packet 2105*b* is altered to resemble packet 2105*c*. In one embodiment, a packet encapsulation protocol tunnel is established. In this example, the tunnel extends from SMTS 240 to gateway module 255. Other tunnels may be used and the tunnel beginning point and end point may be different. Furthermore, many packet encapsulation protocols may be used. For example, the Generic Routing Encapsulation (GRE) protocol, IP in IP protocol (IP-IP), etc. may be used. In this example, the GRE protocol is shown; however, IP-IP or any other packet encapsulation protocol could have been shown.

For example, GRE is a tunneling protocol that can encapsulate a wide variety of network layer protocol packet types inside IP tunnels, creating a virtual point-to-point link to various brands of routers at remote points over an Internet Protocol (IP) internetwork. IP-IP is an IP tunneling protocol that encapsulates one IP packet in another IP packet. To encapsulate IP packet in an IP packet, an outer header is added with SRC, the entry point of the tunnel and the destination point, the exit point of the tunnel, etc.

As such, in order to establish the tunnel, packet 2105c's header is changed to include a GRE/IP header where the SRC is SMTS 240 and the DST is gateway module 255. Hence, the tunnel start point and end point are defined in this GRE/IP header. Furthermore, the MAC header is replaced and the SRC is changed to SMTS 240 and the DST is changed to layer-2/3 switch 247. The IP header remains the same, and the UDP header also remains the same.

Layer-2/3 switch 247 receives packet 2105c and changes the MAC SRC and DST to Layer-2/3 switch 247 and acceleration modules 650, respectively (packet 2105d). All other aspects of packet 2105c's header and payload remain the same. In one embodiment, acceleration modules 650 store the IP header information in a storage memory in order to preserve the header. The IP header may be stored in a hash table or any other storage construct. The acceleration of the payload occurs and the IP header is retrieved from the storage memory and replaced in packet 2105e's header along with the payload. The SRC and DST are changed to acceleration module 650 and Layer-2/3 switch 250, respectively.

Packet 2105e passes through gateway module 255 (i.e., packet 2105f), or may proceed directly to point A (e.g., the Internet, an HSIP, etc.). Before travelling to the Internet, packet 2105g's header has the GRE/IP header removed, indicating that the packet is out of the packet encapsulation protocol tunnel. As can be seen from packets 2105a and 2105g, the IP header, the TCP header, and the payload are preserved. Also, accounting occurs after the gateway module 255 and the full payload (or bandwidth consumption) is properly accounted for. Thus, no revenue is lost due to compression.

Furthermore, packet header preservation occurs such that, for example, the IP Communications Assistance for Law Enforcement Act (CALEA) requirements are maintained. Since CALEA required that the source and the destination of each packet is able to be traced, this header preservation provides such traceability. Additionally, in one embodiment, gateway module 255 may include traffic shaping functionally. Traffic shaping on packets within the tunnel is not possible. Further, one benefit of being able to do acceleration in the tunnel is that it is merely a "bump in the wire." Since packets coming out of the gateway module 255 are the same as the packets that left the CPE, the MAC-PHY transformations that occurred are transparent and therefore, external shapers can be used to enforce network QoS, policies, etc.

In a further embodiment, network 2100 provides the ability for temporarily stripping away the tunnel encapsulation, acceleration, tracking, shaping, accounting, etc. of the packets, and then putting the tunnel encapsulation back on. The process is transparent to the customer and the network components. For example, if gateway module 255 received an ITP packet, gateway module 255 would not know what to do with the packet. In other words, the packet would not have the correct header or payload information which gateway module 255 was expecting. Accordingly, significant benefits are achieved.

Figure 22:
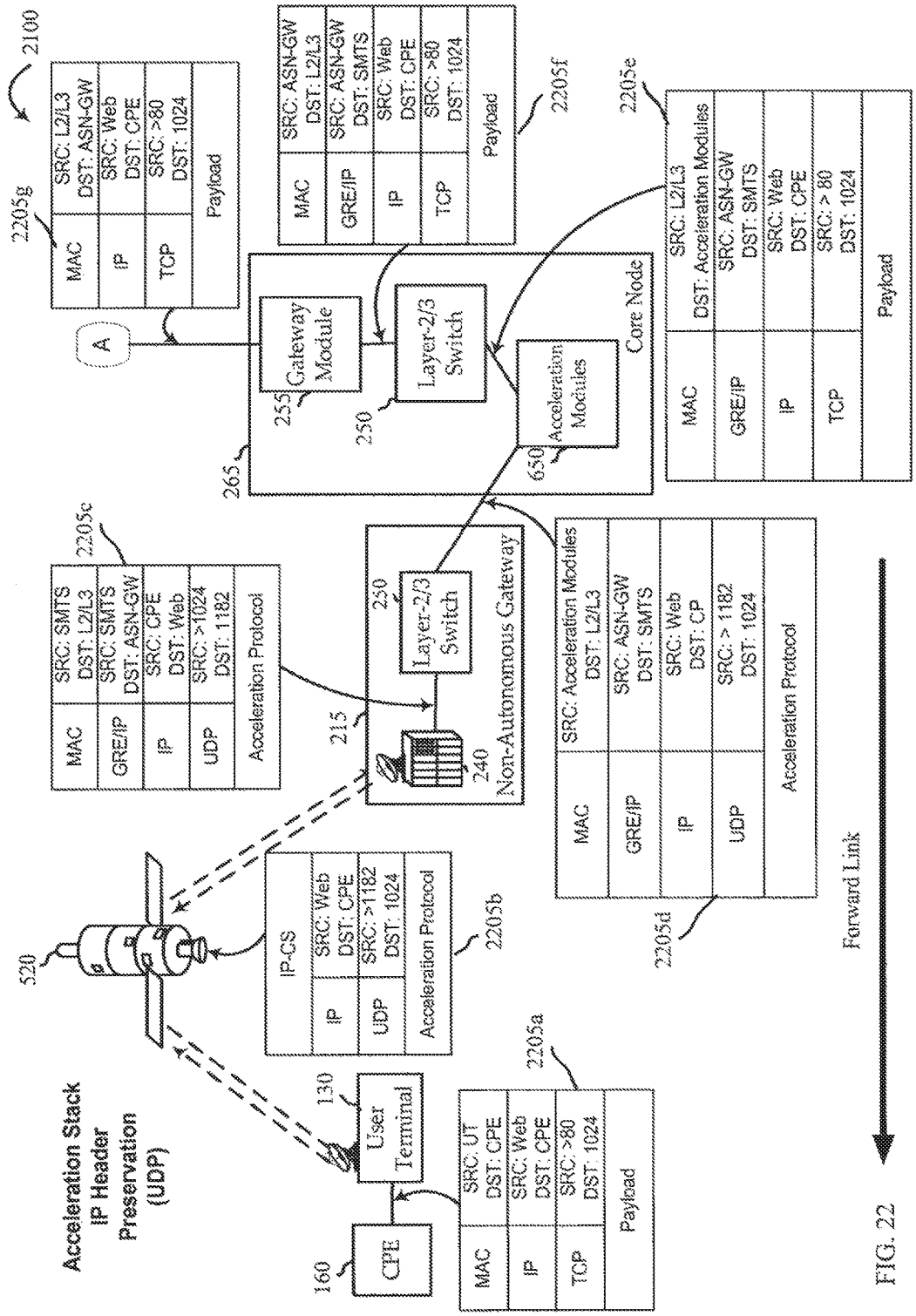
FIG. 22, the diagram illustrates the forward link portion of the network of FIG. 21, according to various embodiments.

Turning now to FIG. 22, the diagram illustrates the forward link portion of network 2100. As can be seen from the packet 2205(*a-g*) headers, the same or similar process described with respect to FIG. 21 is shown, with each of the SRCs and DSTs being swapped (i.e., in order to direct the packets to move back through network 2100).

Figure 23A:
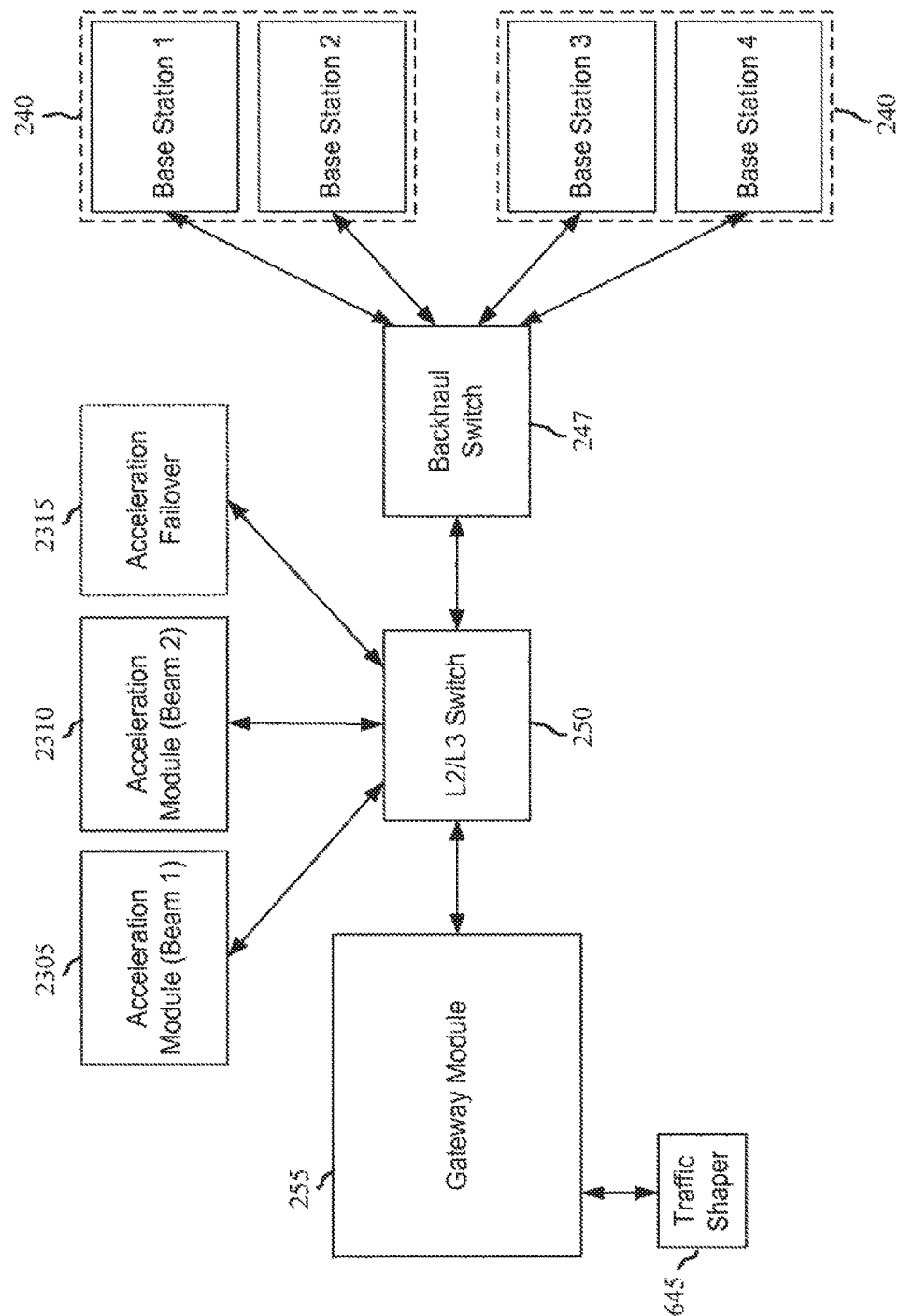
FIG. 23A shows a block diagram of a network flow for implementing acceleration through a network tunnel, according to various embodiments.
Figure 23B:
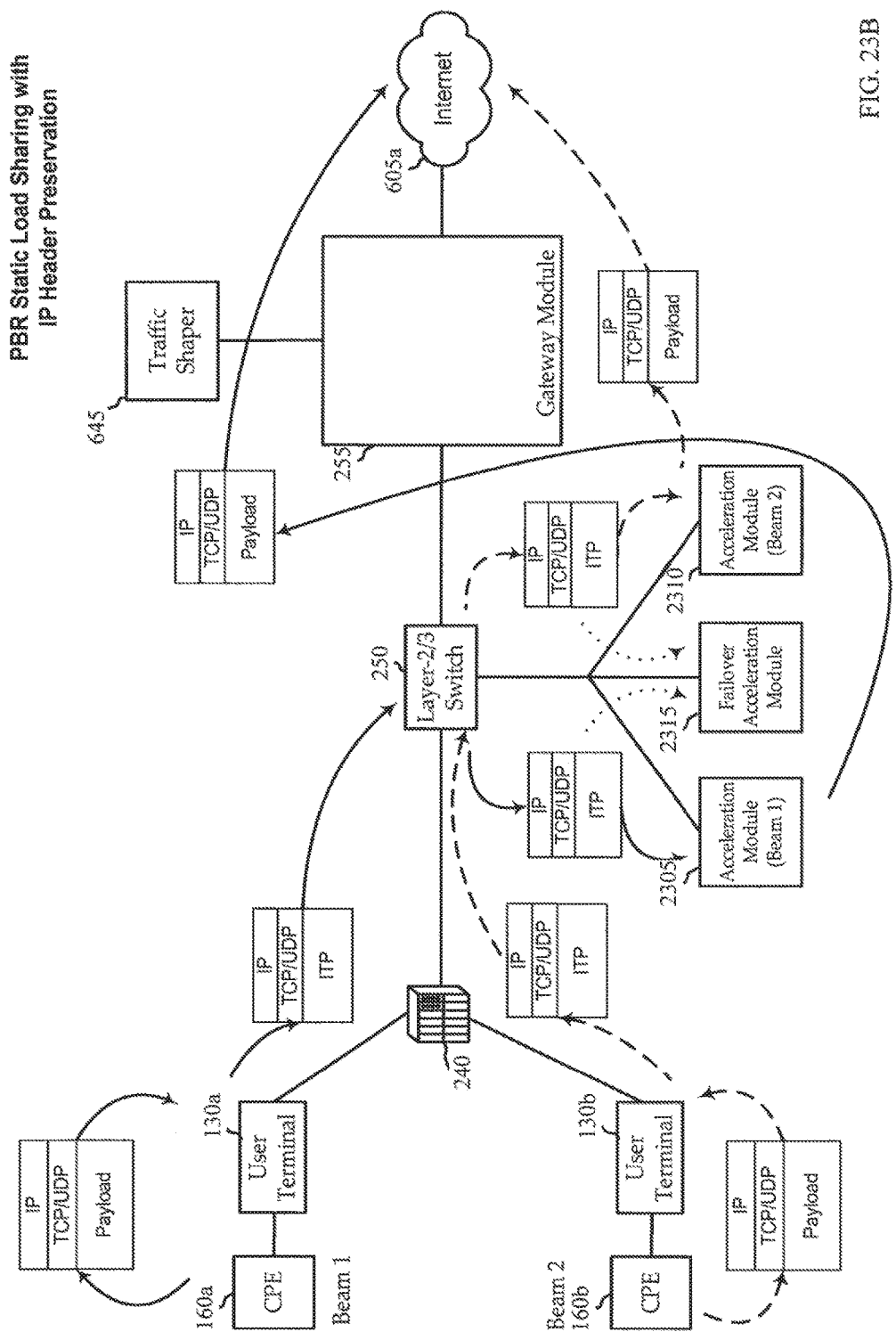
FIG. 23B shows a block diagram of a network flow for implementing acceleration through a network tunnel, according to various embodiments.

FIGS. 23A and 23B show block diagrams of one embodiment of flow for implementing acceleration through a tunnel, according to various embodiments of the invention. FIG. 23A relates to networks 700-a and 700-b as shown in FIGS. 7A-7B. In one embodiment, the acceleration shown in FIGS. 23A and 23B may be implemented by either one of networks 700-a or 700-b. For example, FIG. 23B shows Policy Based Routing (PBR) static load sharing with IP header preservation. In this example, SMTS 240 supports two beams (beam 1 and 2). Furthermore, CPE 160a is supported by beam 1 and CPE 160b is supported by beam 2. Additionally, each beam is supported by an acceleration module and a failover acceleration module 2315. Beam 1 is supported by acceleration module 2305 and beam 2 is supported by acceleration module 2310.

Similar to FIGS. 21 and 22, packets from CPEs 160a and 160b flow through the network and enter a packet encapsulation tunnel between SMTS 240 and gateway module 255. The solid lined arrows represent the packet flow from CPE 160a's packets, and the dashed lines represent packet flow for CPE 160b's packets. Based in part on the encapsulation tunnel keys associated with each of CPE 160a and 160b, the packets are directed to acceleration modules 2305 and 2310, respectively. Furthermore, if one or more of acceleration module 2305 and 2310 fail, then failover acceleration module 2315 is directed to provide acceleration for the packets for the beam of the failed acceleration module. For example, when the layer-2/3 switch 250 detects a link failure to acceleration module 2305, or if a health check on the application status fails, then traffic is directed to the failover acceleration module 2315.

Figure 24:
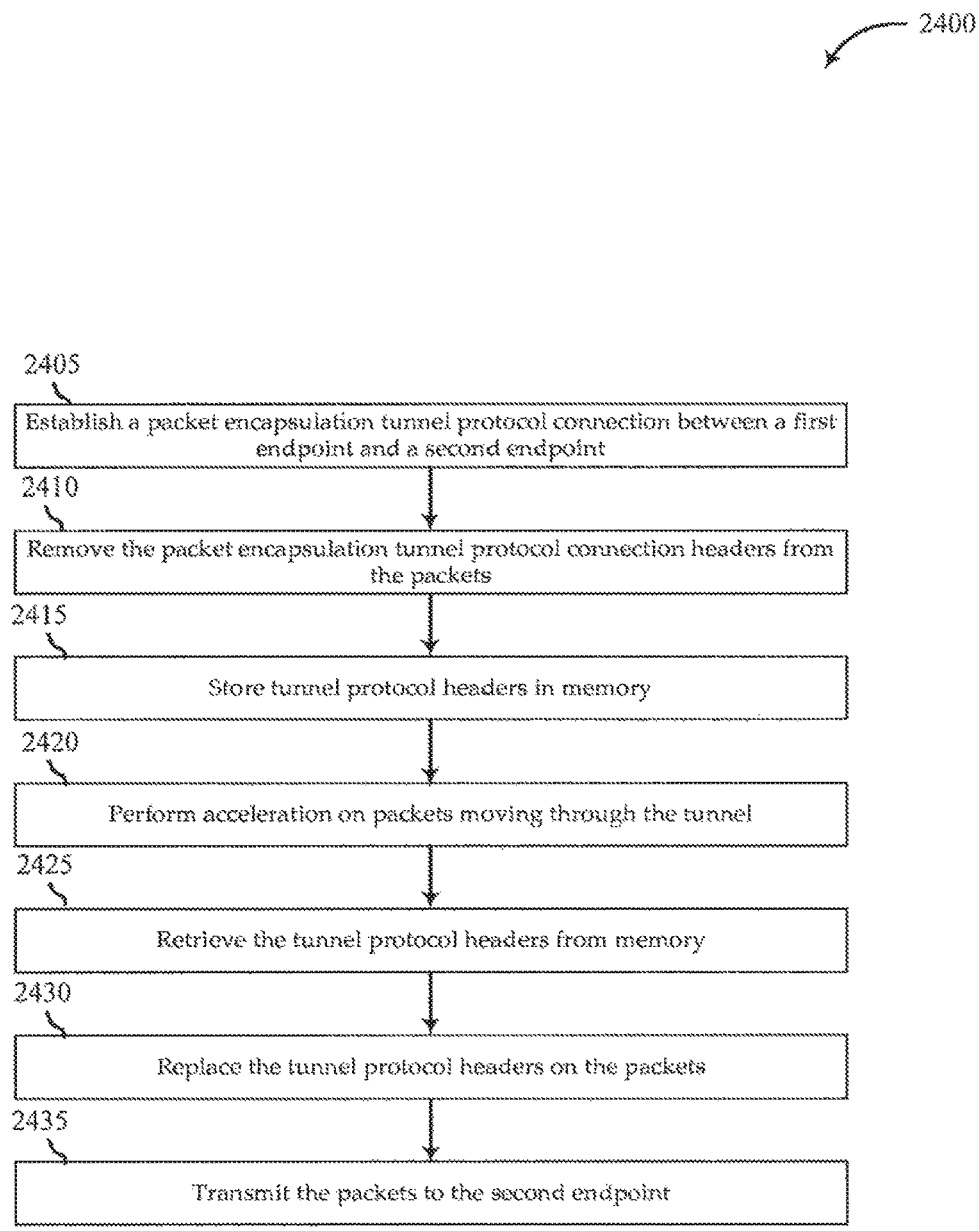
FIG. 24 shows a flow diagram of a method for implementing acceleration through a network tunnel, according to various embodiments.

FIG. 24 shows a flow diagram of a method 2400 for implementing acceleration through a tunnel, according to various embodiments. At process block 2405, a packet encapsulation tunnel connection between a first network endpoint and a second network endpoint is established. The packet encapsulation protocol may be, for example, a GRE tunnel, an IP-IP tunnel, etc. One problem with tunnels is that since the tunnel packet header encapsulates the IP packet (as if the IP packet is in an envelope), determining what is inside the tunneled packet is difficult or impossible, without pulling the packet out of the encapsulation. Accordingly, aspects of method 2400 pull the packets out of the tunnel encapsulation, accelerate the packet data, and then put the packets back into the encapsulation.

At process block 2410, the packet encapsulation tunnel protocol header may be removed from the packets and stored in a storage memory (process block 2415). Once the packet has been "removed" from the tunneling, acceleration, shaping, compression, etc., are performed on the packet payload data (process block 2420). In one embodiment, the packet may be stored in a hash table, which may be used to map each tunnel key to each packet.

Once acceleration and the like is performed, at process block 2425, the tunnel header may be retrieved and replaced in the packet (process block 2430). As such, the packet is able to continue being transmitted until the packet reaches its destination at the second endpoint (process block 2435).

Figure 25:
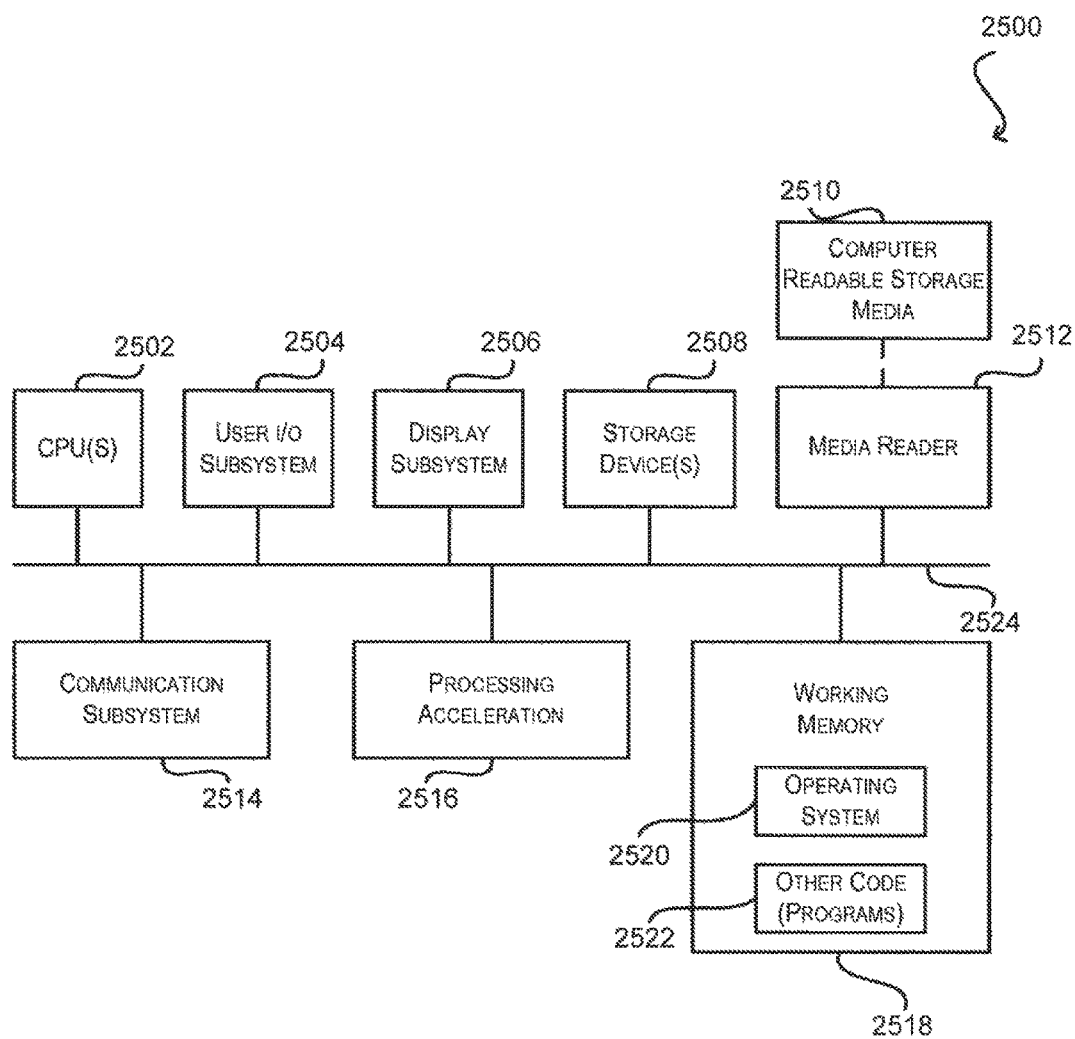
FIG. 25 is a simplified block diagram illustrating the physical components of a computer system that may be used in accordance with various embodiments.

FIG. 25 is a simplified block diagram illustrating the physical components of a computer system 2500 that may be used in accordance with an embodiment of the present invention. This diagram is merely an example, which should not unduly limit the scope of the claims. One of ordinary skill in the art would recognize many variations, alternatives, and modifications.

In various embodiments, computer system 2500 may be used to implement any of the computing devices of the present invention. As shown in FIG. 25, computer system 2500 comprises hardware elements that may be electrically coupled via a bus 2524. The hardware elements may include one or more central processing units (CPUs) 2502, one or more input devices 2504 (e.g., a mouse, a keyboard, etc.), and one or more output devices 2506 (e.g., a display device, a printer, etc.). For example, the input devices 2504 are used to receive user inputs for procurement related search queries. Computer system 2500 may also include one or more storage devices 2508. By way of example, storage devices 2508 may include devices such as disk drives, optical storage devices, and solid-state storage devices such as a random access memory (RAM) and/or a read-only memory (ROM), which can be programmable, flash-updateable and/or the like. In an embodiment, various databases are stored in the storage devices 2508. For example, the central processing unit 2502 is configured to retrieve data from a database and process the data for displaying on a GUI.

Computer system 2500 may additionally include a computer-readable storage media reader 2512, a communications subsystem 2514 (e.g., a modem, a network card (wireless or wired), an infra-red communication device, etc.), and working memory 2518, which may include RAM and ROM devices as described above. In some embodiments, computer system 2500 may also include a processing acceleration unit 2516, which can include a digital signal processor (DSP), a special-purpose processor, and/or the like.

Computer-readable storage media reader 2512 can further be connected to a computer-readable storage medium 2510, together (and, optionally, in combination with storage devices 2508) comprehensively representing remote, local, fixed, and/or removable storage devices plus storage media for temporarily and/or more permanently containing computer-readable information. Communications system 2514 may permit data to be exchanged with network and/or any other computer.

Computer system 2500 may also comprise software elements, shown as being currently located within working memory 2518, including an operating system 2520 and/or other code 2522, such as an application program (which may be a client application, Web browser, mid-tier application, RDBMS, etc.). In a particular embodiment, working memory 2518 may include executable code and associated data structures for one or more of design-time or runtime components/services. It should be appreciated that alternative embodiments of computer system 2500 may have numerous variations from that described above. For example, customized hardware might also be used and/or particular elements might be implemented in hardware, software (including portable software, such as applets), or both. Further, connection to other computing devices such as network input/output devices may be employed. In various embodiments, the behavior of the view functions described throughout the present application is implemented as software elements of the computer system 2500.

In one set of embodiments, the techniques described herein may be implemented as program code executable by a computer system (such as a computer system 2500) and may be stored on machine-readable media. Machine-readable media may include any appropriate media known or used in the art, including storage media and communication media, such as (but not limited to) volatile and non-volatile, removable and non-removable media implemented in any method or technology for storage and/or transmission of information such as machine-readable instructions, data structures, program modules, or other data, including RAM, ROM, EEPROM, flash memory or other memory technology, CD-ROM, digital versatile disk (DVD) or other optical storage, magnetic cassettes, magnetic tape, magnetic disk storage or other magnetic storage devices, or any other medium which can be used to store or transmit the desired information and which can be accessed by a computer.

While the principles of the disclosure have been described above in connection with specific apparatuses and methods, it is to be clearly understood that this description is made only by way of example and not as limitation on the scope of the disclosure. Further, while the invention has been described with respect to exemplary embodiments, one skilled in the art will recognize that numerous modifications are possible. For example, the methods and processes described herein may be implemented using hardware components, software components, and/or any combination thereof. Further, while various methods and processes described herein may be described with respect to particular structural and/or functional components for ease of description, methods of the invention are not limited to any particular structural and/or functional architecture but instead can be implemented on any suitable hardware, firmware and/or software configuration. Similarly, while various functionality is ascribed to certain system components, unless the context dictates otherwise, this functionality can be distributed among various other system components in accordance with different embodiments of the invention.

Moreover, while the procedures comprised in the methods and processes described herein are described in a particular order for ease of description, unless the context dictates otherwise, various procedures may be reordered, added, and/or omitted in accordance with various embodiments of the invention. Moreover, the procedures described with respect to one method or process may be incorporated within other described methods or processes; likewise, system components described according to a particular structural architecture and/or with respect to one system may be organized in alternative structural architectures and/or incorporated within other described systems. Hence, while various embodiments are described with—or without—certain features for ease of description and to illustrate exemplary features, the various components and/or features described herein with respect to a particular embodiment can be substituted, added and/or subtracted from among other described embodiments, unless the context dictates otherwise. Consequently, although the invention has been described with respect to exemplary embodiments, it will be appreciated that the invention is intended to cover all modifications and equivalents within the scope of the following claims.

What is claimed is:

1. A satellite communication system, comprising:
   a first core node of a ground segment network, the first core node comprising at least one switch, a first service processor, and an interface in communication with a second network that is external to the ground segment network;
   a first gateway comprising a first satellite modem termination system and a first network interface coupled with the at least one switch of the first core node, the first gateway in communication with a satellite configured to relay first signals between the first gateway and a first plurality of user terminals within a first spot beam of the satellite, the first gateway utilizing at least one service provided by the first service processor of the first core node for providing communication services between the first plurality of user terminals and an entity within the second network; and a second gateway coupled with the at least one switch of the first core node, the second gateway in communication with the satellite, the satellite configured to relay second signals between the second gateway and a second plurality of user terminals within a second spot beam of the satellite, the second gateway utilizing the at least one service provided by the at least one service processor of the first core node for providing communication services between the second plurality of user terminals and the entity within the second network.

2. The system of claim 1, further comprising:
a second core node coupled with the first core node via the ground segment network, the second core node coupled with at least one of the first gateway or the second gateway.

3. The system of claim 2, wherein the second core node comprises a second service processor providing the at least one service, and wherein, upon detection of a failure of the first service processor of the first core node, the first and second gateways utilize the at least one service provided by the second service processor for providing communications between the first and second pluralities of user terminals and the entity within the second network.

4. The system of claim 1, wherein the first gateway and the second gateway are associated with a same subnet of the ground segment network.

5. The system of claim 1, wherein the first satellite modem termination system generates a plurality of data packets from the first signals.

6. The system of claim 5, wherein the first network interface:
generates packet headers for each of the plurality of data packets, each of the packet headers comprising a medium access control (MAC) header associated with a subnet of the ground segment network;
generates virtual tagging tuples for the plurality of data packets based on an association between the one or more of the first plurality of user terminals and one or more entities associated with entity destinations on the subnet of the ground segment network; and
transmits the virtually tagged data packets to the entity destinations within the subnet of the ground segment network based on each of the virtual tagging tuples associated with each of the virtually tagged data packets.

7. The system of claim 6, wherein the virtual tagging tuples are associated with a reserved portion of a link capacity of the ground segment network.

8. The system of claim 5, wherein the first satellite modem termination system encapsulates the plurality of data packets according to an encapsulation tunneling protocol, and wherein an end point for the encapsulation is the first core node.

9. The system of claim 1, wherein the at least one service comprises one or more of an authentication service, an accounting service, a provisioning service, a peering service, a content delivery service, a network management service, a logging service, a dynamic host configuration protocol (DHCP) service, a domain name system (DNS) service, a file transfer protocol (FTP) service, a synchronization service, or a public key infrastructure (PKI) service.

10. The system of claim 1, wherein at least one of the first plurality of user terminals and an interface node of the ground segment network for the entity are associated with a same subnet of the ground segment network.

11. A method for providing end-to-end connectivity via a ground segment network of a satellite communications system, the method comprising:
receiving, by a first gateway of the ground segment network, first signals from one or more user terminals of a first plurality of user terminals, the first signals associated with a first spot beam of a satellite and relayed by the satellite to the first gateway, the first gateway coupled with a first core node of the ground segment network;
demodulating, at the first gateway, the first signals relayed from the satellite to generate a first plurality of data packets;
communicating the first plurality of data packets to an entity external to the ground segment network via the first core node, wherein the communicating utilizes at least one service provided by the first core node for providing communication services between the first plurality of user terminals and entities not within the ground segment network;
receiving, by a second gateway of the ground segment network, second signals from one or more user terminals of a second plurality of user terminals, the second signals associated with a second spot beam of the satellite and relayed by the satellite to the second gateway, the second gateway coupled with the first core node of the ground segment network;
demodulating, at the second gateway, the second signals relayed from the satellite to generate a second plurality of data packets; and
communicating the second plurality of data packets to the entity external to the ground segment network via the first core node, wherein the communicating utilizes the at least one service provided by the first core node for providing communication services between the second plurality of user terminals and the entities not within the ground segment network.

12. The method of claim 11, further comprising:
detecting a failure of the first core node to provide the at least one service;
communicating the first plurality of data packets to the entity external to the ground segment network via a second core node, wherein the communicating utilizes the at least one service provided by the second core node for providing communication services between the first plurality of user terminals and entities not within the ground segment network.

13. The method of claim 11, wherein the first gateway and the second gateway are associated with a same subnet of the ground segment network.

14. The method of claim 11, further comprising:
generating, by the first gateway, packet headers for each of the first plurality of data packets, each of the packet headers comprising a medium access control (MAC) header associated with a subnet of the ground segment network;
generating, by the first gateway, virtual tagging tuples for the first plurality of data packets based on an association between the one or more of the first plurality of user terminals and one or more entities associated with entity destinations on the subnet of the ground segment network; and
transmitting the virtually tagged data packets to the entity destinations within the subnet of the ground segment network based on each of the virtual tagging tuples associated with each of the virtually tagged data packets.

15. The method of claim 14, wherein the virtual tagging tuples are associated with a reserved portion of a link capacity of the ground segment network.

16. The method of claim 14, wherein the first gateway encapsulates the first plurality of data packets according to an encapsulation tunneling protocol, and wherein an end point for the encapsulation is the first core node.

17. The method of claim 11, wherein the at least one service comprises one or more of an authentication service, an accounting service, a provisioning service, a peering service, a content delivery service, a network management service, a logging service, a dynamic host configuration protocol (DHCP) service, a domain name system (DNS) service, a file transfer protocol (FTP) service, a synchronization service, or a public key infrastructure (PKI) service.

18. The method of claim 11, wherein at least one of the first plurality of user terminals and an interface node of the ground segment network for the entity are associated with a same subnet of the ground segment network.

* * * * *